US012666290B2

(12) United States Patent
Abotabl et al.

(10) Patent No.: US 12,666,290 B2
(45) Date of Patent: Jun. 23, 2026

(54) ENERGY DETECTION THRESHOLDS FOR HALF-DUPLEX AND FULL-DUPLEX COMMUNICATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ibrahim, San Diego, CA (US); Krishna Kiran Mukkavilli, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 528 days.

(21) Appl. No.: 18/081,472

(22) Filed: Dec. 14, 2022

(65) Prior Publication Data

US 2024/0205713 A1 Jun. 20, 2024

(51) Int. Cl.
*H04W 24/10* (2009.01)
*H04B 17/318* (2015.01)
*H04L 5/14* (2006.01)

(52) U.S. Cl.
CPC .......... *H04W 24/10* (2013.01); *H04B 17/318* (2015.01); *H04L 5/14* (2013.01)

(58) Field of Classification Search
CPC .............. H04W 24/10; H04W 74/0808; H04B 17/318; H04L 5/14
See application file for complete search history.

(56) References Cited

U.S. PATENT DOCUMENTS

| | | | | |
|---|---|---|---|---|
| 11,277,865 B2 * | 3/2022 | Zhang | ...................... | H04B 7/08 |
| 2014/0016524 A1 * | 1/2014 | Choi | ......................... | H04L 5/14 |
| | | | | 370/281 |
| 2015/0071062 A1 * | 3/2015 | Cheng | ................... | H04W 52/42 |
| | | | | 370/230 |

(Continued)

OTHER PUBLICATIONS

AT&T: "Channel Access Mechanisms for NR from 52.6-71GHz", 3GPP TSG RAN WG1 #101, R1-2004288, 3rd Generation Partnership Project, Mobile Competence Centre, 650, Route Des Lucioles, F-06921 Sophia-Antipolis Cedex, France, vol. RAN WG1, No. e-Meeting, May 25, 2020-Jun. 5, 2020, May 15, 2020, XP052345667.

(Continued)

*Primary Examiner* — Marcus Smith
*Assistant Examiner* — Raenita Ann Fenner
(74) *Attorney, Agent, or Firm* — QUALCOMM Incorporated

(57) ABSTRACT

A wireless communication at a user equipment includes selecting one of a first energy detection threshold and a second energy detection threshold, detecting an energy level, determining that the energy level is less than the selected one of the first energy detection threshold and the second energy detection threshold, and transmitting data after determining that the energy level is less than the selected one of the first energy detection threshold and the second energy detection threshold. In some examples, the first energy detection threshold is for a first duplex mode of operation (e.g., a half-duplex mode of operation), and the second energy detection threshold is for a second duplex mode of operation (e.g., a full-duplex mode of operation).

20 Claims, 27 Drawing Sheets

(56) References Cited

U.S. PATENT DOCUMENTS

| | | | | |
|---|---|---|---|---|
| 2016/0323885 A1* | 11/2016 | Kazmi | .................. | H04W 76/27 |
| 2016/0381706 A1* | 12/2016 | Huang | ............. | H04W 74/0808 |
| | | | | 370/329 |
| 2017/0273109 A1* | 9/2017 | Babaei | .................. | H04W 52/42 |
| 2020/0229206 A1* | 7/2020 | Badic | ..................... | G05D 1/225 |
| 2020/0313837 A1* | 10/2020 | Vejlgaard | ............ | H04W 72/541 |
| 2021/0076384 A1* | 3/2021 | MolavianJazi | ... | H04W 74/0833 |
| 2021/0314780 A1* | 10/2021 | Tomeba | ............... | H04W 16/14 |
| 2022/0124799 A1* | 4/2022 | Hu | ........................ | H04L 5/0048 |
| 2022/0279577 A1* | 9/2022 | Zhang | ............. | H04W 74/0808 |
| 2022/0338255 A1 | 10/2022 | Abotabl et al. | | |
| 2023/0232446 A1* | 7/2023 | Jiang | .................... | H04W 74/02 |
| | | | | 370/329 |

OTHER PUBLICATIONS

International Search Report and Written Opinion—PCT/US2023/
036486—ISA/EPO—Feb. 2, 2024.

* cited by examiner

600

| SLOT FORMAT COMBINATION ID | SLOT FORMAT + DU SPLIT |
|---|---|
| 1 | 602 |
| 2 | 604 |
| 3 | 606 |
| 4 | 608 |

614
612
610
618
616

PUSCH
UL
PUSCH
UL
PUSCH
DL
DL DATA
PUSCH

DL DATA
DL DATA
DL DATA
PUSCH

DL DATA
GUARD BAND
PUSCH UL PUSCH
GUARD BAND
DL DATA DL DATA
PUSCH
DL DATA

DL DATA
DL DATA DL DATA
GUARD BAND
PUSCH UL PUSCH
GUARD BAND
DL DATA DL DATA
PUSCH

PUSCH
DL DATA DL DATA
PUSCH UL PUSCH
DL DATA DL DATA
PUSCH

Slot 1    Slot 2    Slot 3    Slot 4

800

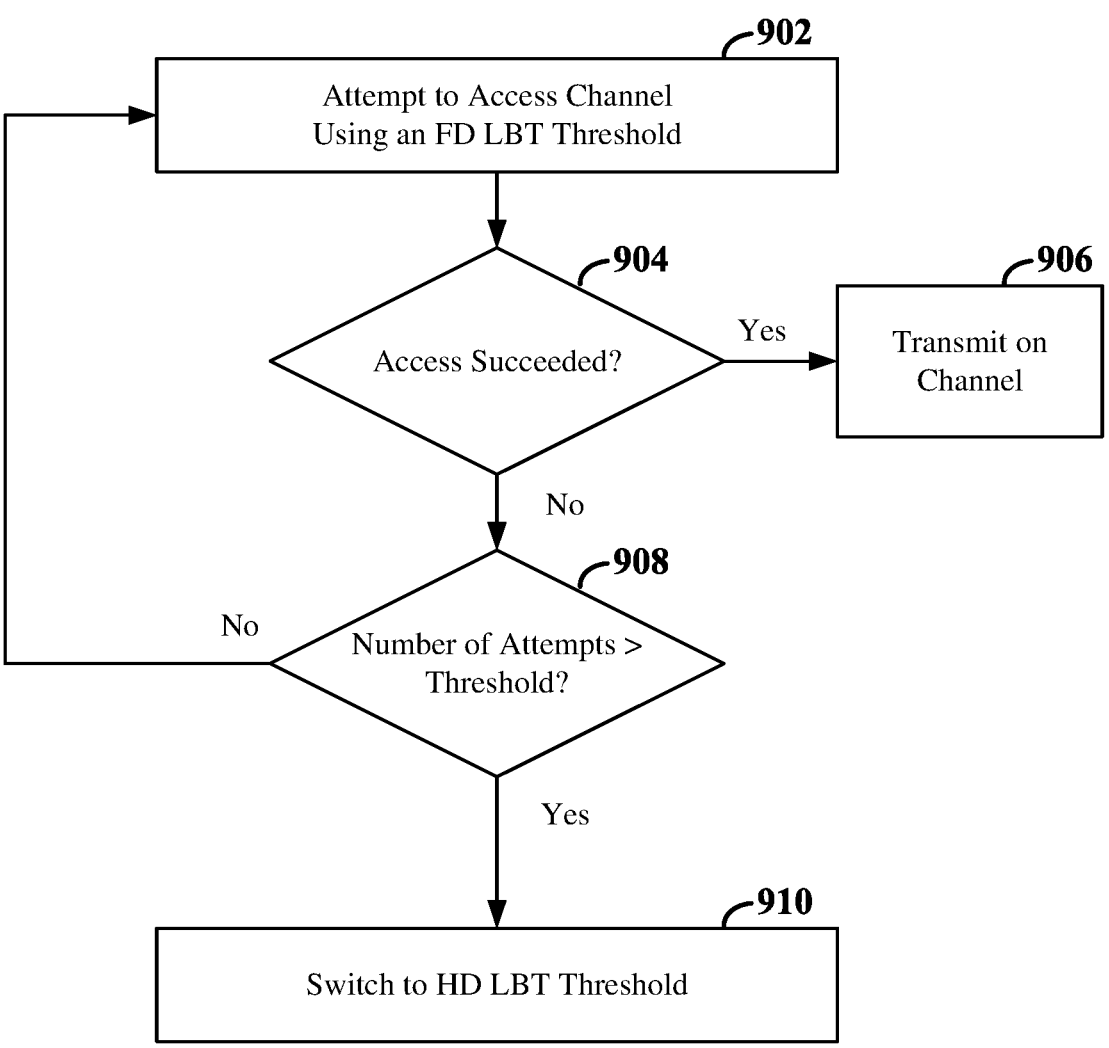
FIG. 9

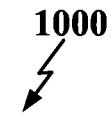
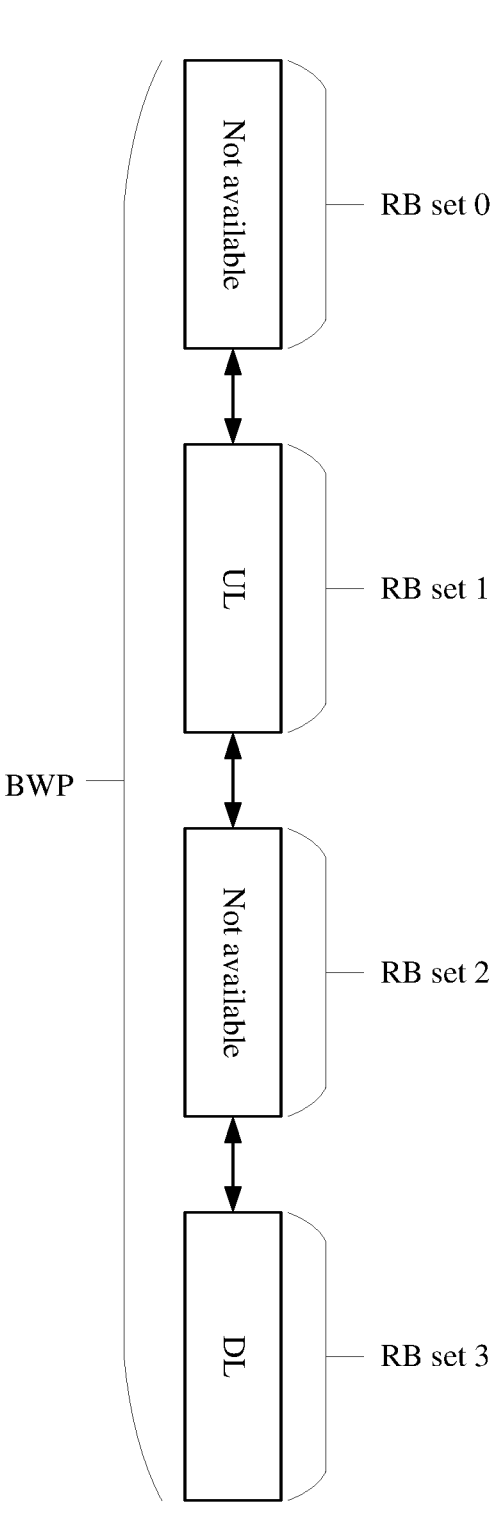
FIG. 10

1200

1202

Base Station

1206

Specify Frequency
Gap Threshold

Frequency Gap Threshold

1208

Slot Format Information

1210

1204

UE

1212

Determine Frequency
Gap

1214

Compare Determined
Frequency Gap to
Frequency Gap
Threshold

1216

Select HD LBT
Threshold if
Determined
Frequency Gap>
Frequency Gap
Threshold

1218

Perform LBT
Operation Using HD
LBT Threshold

1600

1700

1800

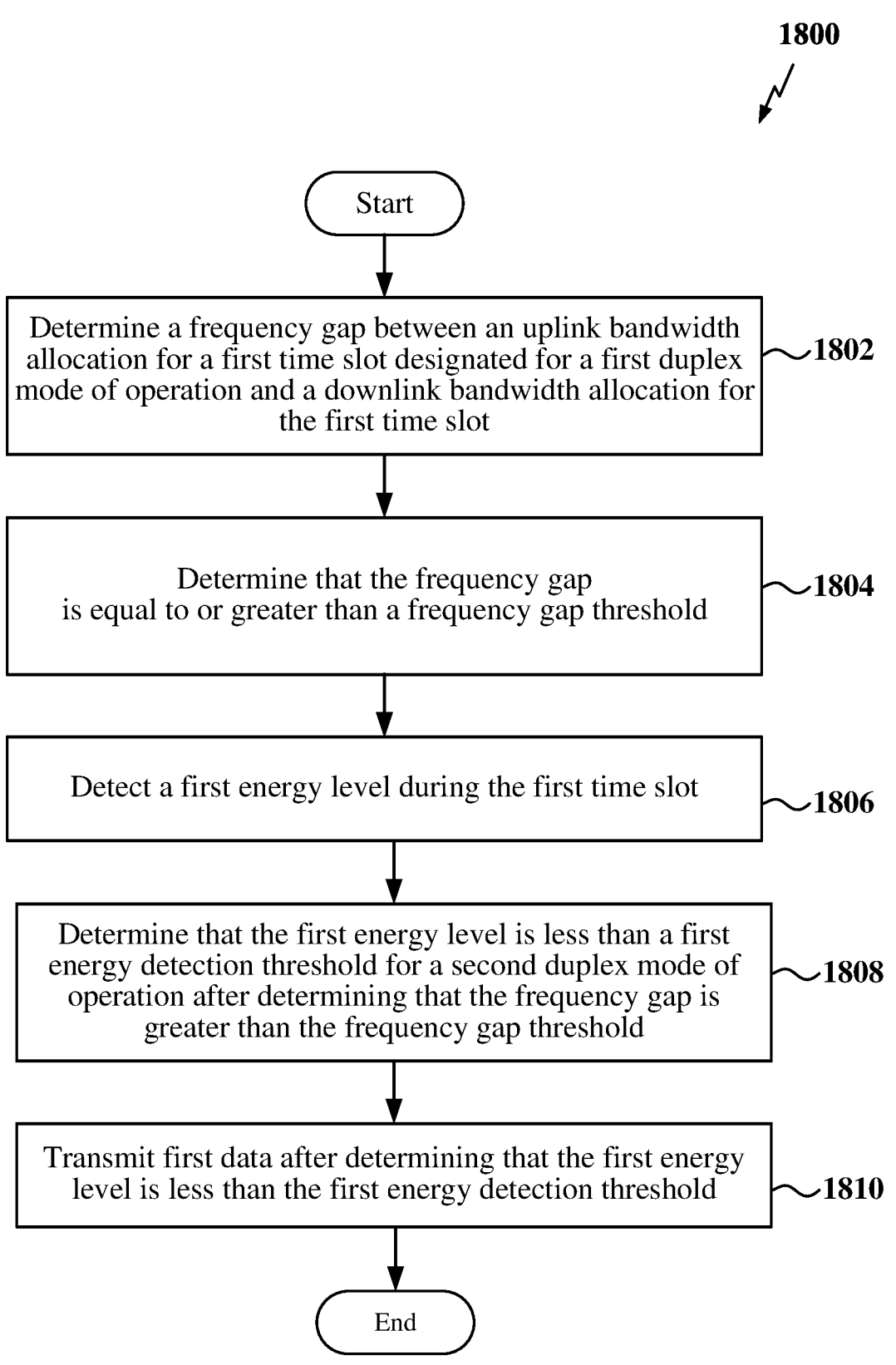

Start

Determine a frequency gap between an uplink bandwidth allocation for a first time slot designated for a first duplex mode of operation and a downlink bandwidth allocation for the first time slot          1802

Determine that the frequency gap is equal to or greater than a frequency gap threshold          1804

Detect a first energy level during the first time slot          1806

Determine that the first energy level is less than a first energy detection threshold for a second duplex mode of operation after determining that the frequency gap is greater than the frequency gap threshold          1808

Transmit first data after determining that the first energy level is less than the first energy detection threshold          1810

End

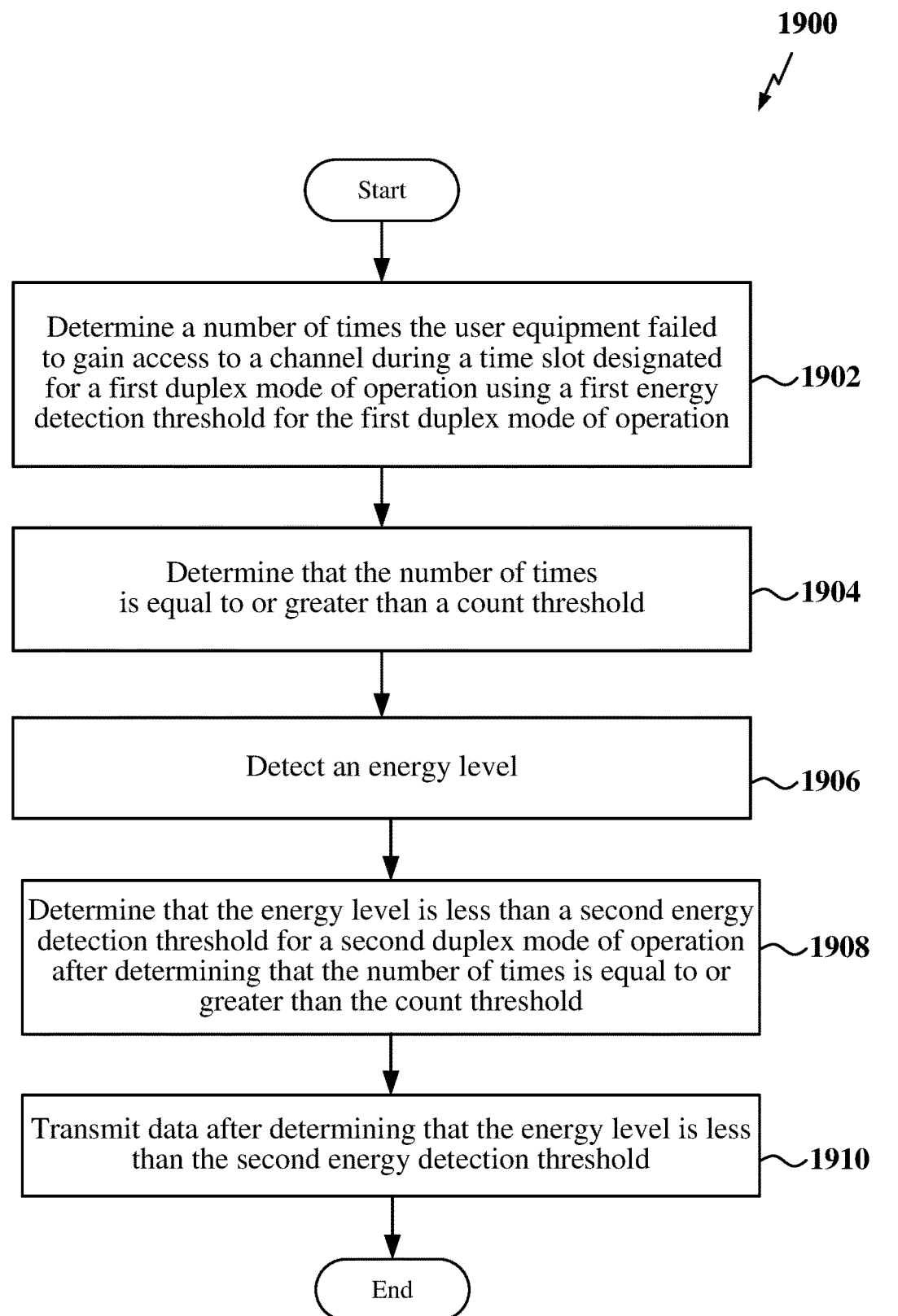

Start

Determine a number of times the user equipment failed to gain access to a channel during a time slot designated for a first duplex mode of operation using a first energy detection threshold for the first duplex mode of operation ～1902

Determine that the number of times is equal to or greater than a count threshold ～1904

Detect an energy level ～1906

Determine that the energy level is less than a second energy detection threshold for a second duplex mode of operation after determining that the number of times is equal to or greater than the count threshold ～1908

Transmit data after determining that the energy level is less than the second energy detection threshold ～1910

End

FIG. 19

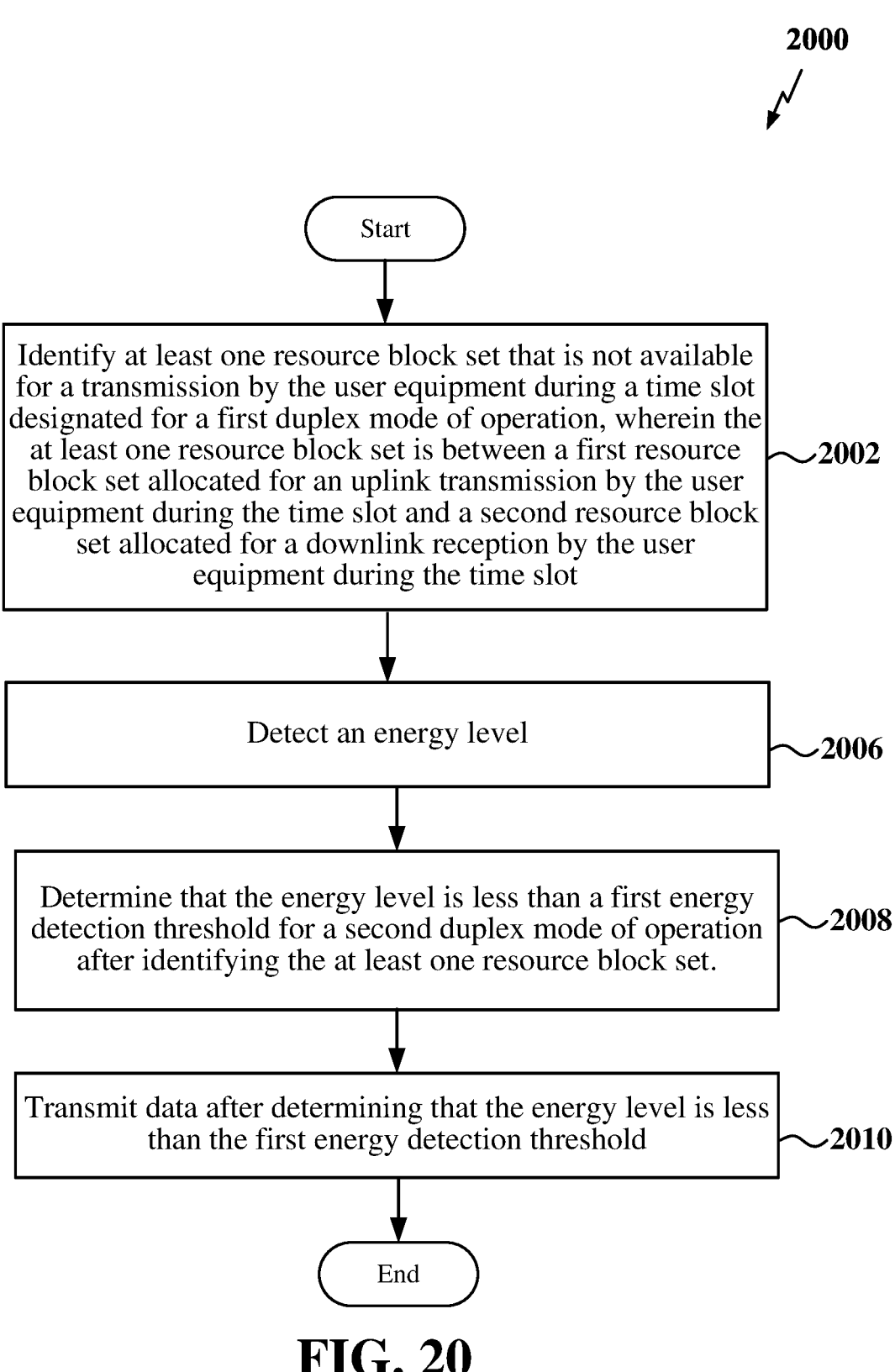

2000

Start

Identify at least one resource block set that is not available for a transmission by the user equipment during a time slot designated for a first duplex mode of operation, wherein the at least one resource block set is between a first resource block set allocated for an uplink transmission by the user equipment during the time slot and a second resource block set allocated for a downlink reception by the user equipment during the time slot ~2002

Detect an energy level ~2006

Determine that the energy level is less than a first energy detection threshold for a second duplex mode of operation after identifying the at least one resource block set. ~2008

Transmit data after determining that the energy level is less than the first energy detection threshold ~2010

End

Start

Specify a first energy detection threshold
for a full-duplex mode of operation          ～2402

Specify a second energy detection threshold
for the full-duplex mode of operation          ～2404

Transmit the first energy detection threshold and the second          ～2406
energy detection threshold to a user equipment.

End

2500

Start

Specify a frequency gap threshold for a user equipment to determine whether to use a first energy detection threshold for a first duplex mode of operation during a time slot designated for a second duplex mode of operation ~2502

Transmit the frequency gap threshold to the user equipment ~2504

End

2700

Start

Specify a resource block count threshold for a user equipment to determine whether to use a first energy detection threshold for a first duplex mode of operation during a first time slot designated for a second duplex mode of operation
~2702

Transmit the resource block count threshold to the user equipment
~2704

End

ENERGY DETECTION THRESHOLDS FOR HALF-DUPLEX AND FULL-DUPLEX COMMUNICATION

TECHNICAL FIELD

Aspects of the present disclosure relate generally to wireless communication and, more particularly, to energy detection thresholds for half-duplex and full-duplex communication.

INTRODUCTION

In wireless communication systems, such as those specified under standards for 5G New Radio (NR), a base station and a user equipment (UE) exchange signals using various duplex modes. The duplex modes include half-duplex and full-duplex. In half-duplex communication, one of the UE and the base station transmits at a time. In full-duplex communication, the UE and the base station can transmit at the same time. An example of half-duplex communication is time division duplex (TDD) communication. In 5G NR TDD, uplink signaling (e.g., from a UE to a base station) and downlink signaling (e.g., from the base station to the UE) are separately scheduled in time. Thus, uplink and downlink communications do not occur simultaneously. However, uplink and downlink communications may be transmitted on the same frequency bands (e.g., on the same carrier). An example of full-duplex communication is frequency division duplex (FDD) communication. In 5G NR FDD, uplink signaling and downlink signaling are simultaneously scheduled in time. However, uplink signaling and downlink signaling may be transmitted on different frequency bands (e.g., on different and spaced apart carriers). Another example of full-duplex communication is in-band full-duplex, in which uplink signaling and downlink signaling may be transmitted simultaneously on the same frequency band and/or overlapping frequency bands.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A first aspect relates to a method for wireless communication at a user equipment. The method includes selecting one of a first energy detection threshold and a second energy detection threshold, detecting an energy level, determining that the energy level is less than the selected one of the first energy detection threshold and the second energy detection threshold, and transmitting data after determining that the energy level is less than the selected one of the first energy detection threshold and the second energy detection threshold.

A second aspect relates to a user equipment. The user equipment includes a transceiver, a memory, and a processor communicatively coupled to the transceiver and the memory. The processor and the memory are configured to cause the user equipment to select one of a first energy detection threshold and a second energy detection threshold, detect an energy level using the transceiver, determine that the energy level is less than the selected one of the first energy detection threshold and the second energy detection threshold, and transmit data via the transceiver after determining that the energy level is less than the selected one of the first energy detection threshold and the second energy detection threshold.

A third aspect relates to a user equipment. The user equipment includes means for selecting one of a first energy detection threshold and a second energy detection threshold, means for detecting an energy level, means for determining that the energy level is less than the selected one of the first energy detection threshold and the second energy detection threshold, and means for transmitting data after determining that the energy level is less than the selected one of the first energy detection threshold and the second energy detection threshold.

A fourth aspect relates to a computer-readable medium including instructions stored therein. The instructions are executable by a processor of a user equipment to select one of a first energy detection threshold and a second energy detection threshold, detect an energy level, determine that the energy level is less than the selected one of the first energy detection threshold and the second energy detection threshold, and transmit data after determining that the energy level is less than the selected one of the first energy detection threshold and the second energy detection threshold.

A fifth aspect relates to a method for wireless communication at a user equipment. The method includes selecting one of a first energy detection threshold and a second energy detection threshold, detecting an energy level, comparing the energy level to the selected one of the first energy detection threshold and the second energy detection threshold, and transmitting data if the energy level is less than the selected one of the first energy detection threshold and the second energy detection threshold.

A sixth aspect relates to a user equipment. The user equipment includes a transceiver, a memory, and a processor communicatively coupled to the transceiver and the memory. The processor and the memory are configured to cause the user equipment to select one of a first energy detection threshold and a second energy detection threshold, detect an energy level, compare the energy level to the selected one of the first energy detection threshold and the second energy detection threshold, and transmit data via the transceiver if the energy level is less than the selected one of the first energy detection threshold and the second energy detection threshold.

A seventh aspect relates to a user equipment. The user equipment includes means for selecting one of a first energy detection threshold and a second energy detection threshold, means for detecting an energy level, means for comparing the energy level to the selected one of the first energy detection threshold and the second energy detection threshold, and means for transmitting data if the energy level is less than the selected one of the first energy detection threshold and the second energy detection threshold.

An eighth aspect relates to a computer-readable medium including instructions stored therein. The instructions are executable by a processor of a user equipment to select one of a first energy detection threshold and a second energy detection threshold, detect an energy level, compare the energy level to the selected one of the first energy detection threshold and the second energy detection threshold, and transmit data if the energy level is less than the selected one of the first energy detection threshold and the second energy detection threshold.

A ninth aspect relates to a method for wireless communication at a base station. The method includes specifying a first energy detection threshold for a first duplex mode of operation, specifying a second energy detection threshold for a second duplex mode of operation, and transmitting the first energy detection threshold and the second energy detection threshold to a user equipment.

A tenth aspect relates to a base station. The base station includes a transceiver, a memory, and a processor communicatively coupled to the transceiver and the memory. The processor and the memory are configured to cause the base station to specify a first energy detection threshold for a first duplex mode of operation, specify a second energy detection threshold for a second duplex mode of operation, and transmit the first energy detection threshold and the second energy detection threshold via the transceiver to a user equipment.

An eleventh aspect relates to a base station. The base station includes means for specifying a first energy detection threshold for a first duplex mode of operation, means for specifying a second energy detection threshold for a second duplex mode of operation, and means for transmitting the first energy detection threshold and the second energy detection threshold to a user equipment.

A twelfth aspect relates to a computer-readable medium including instructions stored therein. The instructions are executable by a processor of a base station to specify a first energy detection threshold for a first duplex mode of operation, specify a second energy detection threshold for a second duplex mode of operation, and transmit the first energy detection threshold and the second energy detection threshold to a user equipment.

A thirteenth aspect relates to a method for wireless communication at a user equipment. The method includes selecting a full-duplex energy detection threshold from among a first energy detection threshold for a full-duplex mode of operation and a second energy detection threshold for the full-duplex mode of operation, detecting a first energy level during a first time slot scheduled for the full-duplex mode of operation, determining that the first energy level is less than the full-duplex energy detection threshold, and transmitting first data during the first time slot using the full-duplex mode of operation after determining that the first energy level is less than the full-duplex energy detection threshold.

A fourteenth aspect relates to a user equipment. The user equipment includes a transceiver, a memory, and a processor communicatively coupled to the transceiver and the memory. The processor and the memory are configured to cause the user equipment to select a full-duplex energy detection threshold from among a first energy detection threshold for a full-duplex mode of operation and a second energy detection threshold for the full-duplex mode of operation, detect a first energy level during a first time slot scheduled for the full-duplex mode of operation, determine that the first energy level is less than the full-duplex energy detection threshold, and transmit first data via the transceiver during the first time slot using the full-duplex mode of operation after determining that the first energy level is less than the full-duplex energy detection threshold.

A fifteenth aspect relates to a user equipment. The user equipment includes means for selecting a full-duplex energy detection threshold from among a first energy detection threshold for a full-duplex mode of operation and a second energy detection threshold for the full-duplex mode of operation, means for detecting an energy level during a time slot scheduled for the full-duplex mode of operation, means for determining that the energy level is less than the full-duplex energy detection threshold, and means for transmitting data during the time slot using the full-duplex mode of operation after determining that the energy level is less than the full-duplex energy detection threshold.

A sixteenth aspect relates to a computer-readable medium including instructions stored therein. The instructions are executable by a processor of a user equipment to select a full-duplex energy detection threshold from among a first energy detection threshold for a full-duplex mode of operation and a second energy detection threshold for the full-duplex mode of operation, detect an energy level during a time slot scheduled for the full-duplex mode of operation, determine that the energy level is less than the full-duplex energy detection threshold, and transmit data during the time slot using the full-duplex mode of operation after determining that the energy level is less than the full-duplex energy detection threshold.

A seventeenth aspect relates to a method for wireless communication at a base station. The method includes specifying a first energy detection threshold for a full-duplex mode of operation, specifying a second energy detection threshold for the full-duplex mode of operation, and transmitting the first energy detection threshold and the second energy detection threshold to a user equipment.

An eighteenth aspect relates to a base station. The base station includes a transceiver, a memory, and a processor communicatively coupled to the transceiver and the memory. The processor and the memory are configured to cause the base station to specify a first energy detection threshold for a full-duplex mode of operation, specify a second energy detection threshold for the full-duplex mode of operation, and transmit the first energy detection threshold and the second energy detection threshold via the transceiver to a user equipment.

A nineteenth aspect relates to relates to a base station. The base station includes means for specifying a first energy detection threshold for a full-duplex mode of operation, means for specifying a second energy detection threshold for the full-duplex mode of operation, and means for transmitting the first energy detection threshold and the second energy detection threshold to a user equipment.

A twentieth aspect relates to computer-readable medium including instructions stored therein. The instructions are executable by a processor of a base station to specify a first energy detection threshold for a full-duplex mode of operation, specify a second energy detection threshold for the full-duplex mode of operation, and transmit the first energy detection threshold and the second energy detection threshold to a user equipment.

A twenty-first aspect relates to a method for wireless communication at a user equipment. The method includes determining a frequency gap between an uplink bandwidth allocation for a first time slot designated for a first duplex mode of operation and a downlink bandwidth allocation for the first time slot, determining that the frequency gap is greater than a frequency gap threshold, detecting a first energy level during the first time slot, determining that the first energy level is less than a first energy detection threshold for a second duplex mode of operation after determining that the frequency gap is greater than the frequency gap threshold, and transmitting first data after determining that the first energy level is less than the first energy detection threshold.

A twenty-second aspect relates to a user equipment. The user equipment includes a transceiver, a memory, and a processor communicatively coupled to the transceiver and the memory. The processor and the memory are configured to cause the user equipment to determine a frequency gap between an uplink bandwidth allocation for a first time slot designated for a first duplex mode of operation and a downlink bandwidth allocation for the first time slot, determine that the frequency gap is greater than a frequency gap threshold, detect a first energy level during the first time slot, determine that the first energy level is less than a first energy detection threshold for a second duplex mode of operation after determining that the frequency gap is greater than the frequency gap threshold, and transmit first data after determining that the first energy level is less than the first energy detection threshold.

A twenty-third aspect relates to a user equipment. The user equipment includes means for determining a frequency gap between an uplink bandwidth allocation for a time slot designated for a first duplex mode of operation and a downlink bandwidth allocation for the time slot, means for determining that the frequency gap is greater than a frequency gap threshold, means for detecting an energy level during the time slot, means for determining that the energy level is less than an energy detection threshold for a second duplex mode of operation after determining that the frequency gap is greater than the frequency gap threshold, and means for transmitting data after determining that the energy level is less than the energy detection threshold.

A twenty-fourth aspect relates to a computer-readable medium including instructions stored therein. The instructions are executable by a processor of a user equipment to determine a frequency gap between an uplink bandwidth allocation for a time slot designated for a first duplex mode of operation and a downlink bandwidth allocation for the time slot, determine that the frequency gap is greater than a frequency gap threshold, detect an energy level during the time slot, determine that the energy level is less than an energy detection threshold for a second duplex mode of operation after determining that the frequency gap is greater than the frequency gap threshold, and transmit data after determining that the energy level is less than the energy detection threshold.

A twenty-fifth aspect relates to a method for wireless communication at a user equipment. The method includes comparing a frequency gap to a frequency gap threshold, wherein the frequency gap is between an uplink bandwidth allocation for a time slot and a downlink bandwidth allocation for the time slot, and detecting an energy level. The method also includes, if the frequency gap is greater than the frequency gap threshold, comparing the energy level to a first energy detection threshold, and transmitting data during the time slot if the energy level is less than the first energy detection threshold. The method further includes, if the frequency gap is less than the frequency gap threshold, comparing the energy level to a second energy detection threshold, and transmitting the data during the time slot if the energy level is less than the second energy detection threshold.

A twenty-sixth aspect relates to a user equipment. The user equipment includes a transceiver, a memory, and a processor communicatively coupled to the transceiver and the memory. The processor and the memory are configured to cause the user equipment to compare a frequency gap to a frequency gap threshold, wherein the frequency gap is between an uplink bandwidth allocation for a time slot and a downlink bandwidth allocation for the time slot, and detect an energy level. The processor and the memory are configured to cause the user equipment to, if the frequency gap is greater than the frequency gap threshold, compare the energy level to a first energy detection threshold, and transmit data during the time slot if the energy level is less than the first energy detection threshold. The processor and the memory are configured to cause the user equipment to, if the frequency gap is less than the frequency gap threshold, compare the energy level to a second energy detection threshold, and transmit the data during the time slot if the energy level is less than the second energy detection threshold.

A twenty-seventh aspect relates to a method for wireless communication at a base station. The method includes specifying a frequency gap threshold for a user equipment to determine whether to use a first energy detection threshold for a first duplex mode of operation during a time slot designated for a second duplex mode of operation, and transmitting the frequency gap threshold to the user equipment.

A twenty-eighth aspect relates to a base station. The base station includes a transceiver, a memory, and a processor communicatively coupled to the transceiver and the memory. The processor and the memory are configured to cause the base station to specify a frequency gap threshold for a user equipment to determine whether to use a first energy detection threshold for a first duplex mode of operation during a time slot designated for a second duplex mode of operation, and transmit the frequency gap threshold via the transceiver to the user equipment A twenty-nineth aspect relates to a base station. The base station includes means for specifying a frequency gap threshold for a user equipment to determine whether to use a first energy detection threshold for a first duplex mode of operation during a time slot designated for a second duplex mode of operation, and means for transmitting the frequency gap threshold to the user equipment.

A thirtieth aspect relates to a computer-readable medium including instructions stored therein. The instructions are executable by a processor of a base station to specify a frequency gap threshold for a user equipment to determine whether to use a first energy detection threshold for a first duplex mode of operation during a time slot designated for a second duplex mode of operation, and transmit the frequency gap threshold to the user equipment.

A thirty-first aspect relates to a method for wireless communication at a user equipment. The method includes determining a number of times the user equipment failed to gain access to a channel designated for a first duplex mode of operation using a first energy detection threshold for the first duplex mode of operation, determining that the number of times is equal to or greater than a count threshold, detecting an energy level, determining that the energy level is less than a second energy detection threshold for a second duplex mode of operation after determining that the number of times is equal to or greater than the count threshold, and transmitting data after determining that the energy level is less than the second energy detection threshold.

A thirty-second aspect relates to a user equipment. The user equipment includes a transceiver, a memory, and a processor communicatively coupled to the transceiver and the memory. The processor and the memory are configured to cause the user equipment to determine a number of times the user equipment failed to gain access to a channel designated for a first duplex mode of operation using a first energy detection threshold for the first duplex mode of operation, determine that the number of times is equal to or greater than a count threshold, detect an energy level, determine that the energy level is less than a second energy detection threshold for a second duplex mode of operation after determining that the number of times is equal to or greater than the count threshold, and transmit data after determining that the energy level is less than the second energy detection threshold.

A thirty-third aspect relates to a user equipment. The user equipment includes means for determining a number of times the user equipment failed to gain access to a channel during a time slot designated for a first duplex mode of operation using a first energy detection threshold for the first duplex mode of operation, means for determining that the number of times is equal to or greater than a count threshold, means for detecting an energy level, means for determining that the energy level is less than a second energy detection threshold for a second duplex mode of operation after determining that the number of times is equal to or greater than the count threshold, and means for transmitting data after determining that the energy level is less than the second energy detection threshold.

A thirty-fourth aspect relates to a computer-readable medium including instructions stored therein. The instructions are executable by a processor of a user equipment to determine a number of times the user equipment failed to gain access to a channel during a time slot designated for a first duplex mode of operation using a first energy detection threshold for the first duplex mode of operation, determine that the number of times is equal to or greater than a count threshold, detect an energy level, determine that the energy level is less than a second energy detection threshold for a second duplex mode of operation after determining that the number of times is equal to or greater than the count threshold, and transmit data after determining that the energy level is less than the second energy detection threshold.

A thirty-fifth aspect relates to a method for wireless communication at a base station. The method includes specifying a count threshold for a user equipment to determine whether to use an energy detection threshold for a first duplex mode of operation during a time slot designated for a second duplex mode of operation, and transmitting the count threshold to the user equipment.

A thirty-sixth aspect relates to a base station. The base station includes a transceiver, a memory, and a processor communicatively coupled to the transceiver and the memory. The processor and the memory are configured to cause the base station to specify a count threshold for a user equipment to determine whether to use an energy detection threshold for a first duplex mode of operation during a time slot designated for a second duplex mode of operation, and transmit the count threshold via the transceiver to the user equipment.

A thirty-seventh aspect relates to a base station. The base station includes means for specifying a count threshold for a user equipment to determine whether to use an energy detection threshold for a first duplex mode of operation during a time slot designated for a second duplex mode of operation, and means for transmitting the count threshold to the user equipment.

A thirty-eighth aspect relates to a computer-readable medium including instructions stored therein. The instructions are executable by a processor of a base station to specify a count threshold for a user equipment to determine whether to use an energy detection threshold for a first duplex mode of operation during a time slot designated for a second duplex mode of operation, and transmit the count threshold to the user equipment.

A thirty-ninth aspect relates to a method for wireless communication at a user equipment. The method includes identifying at least one resource block set that is not available for a transmission by the user equipment during a time slot designated for a first duplex mode of operation, wherein the at least one resource block set is between a first resource block set allocated for an uplink transmission by the user equipment during the time slot and a second resource block allocated for a downlink reception by the user equipment during the time slot, detecting an energy level, determining that the energy level is less than a first energy detection threshold for a second duplex mode of operation after identifying the at least one resource block set, and transmitting data after determining that the energy level is less than the first energy detection threshold.

A fortieth aspect relates to a method for wireless communication at a user equipment. The method includes determining a number of resource blocks that are not available for a transmission by the user equipment during a time slot designated for a first duplex mode of operation, wherein the resource blocks are between a first resource block set allocated for an uplink transmission by the user equipment during the time slot and a second resource block allocated for a downlink reception by the user equipment during the time slot, determining the number of resource blocks is greater than a threshold quantity, detecting an energy level, determining that the energy level is less than an energy detection threshold for a second duplex mode of operation after determining the number of resource blocks is greater than the threshold quantity, and transmitting data after determining that the energy level is less than the energy detection threshold.

A forty-first aspect relates to a user equipment. The user equipment includes a transceiver, a memory, and a processor communicatively coupled to the transceiver and the memory. The processor and the memory are configured to cause the user equipment to identify at least one resource block set that is not available for a transmission by the user equipment during a time slot designated for a first duplex mode of operation, wherein the at least one resource block set is between a first resource block set allocated for an uplink transmission by the user equipment during the time slot and a second resource block set allocated for a downlink reception by the user equipment during the time slot, detect an energy level, determine that the energy level is less than a first energy detection threshold for a second duplex mode of operation after identifying the at least one resource block set, and transmit data after determining that the energy level is less than the first energy detection threshold.

A forty-second aspect relates to a user equipment. The user equipment includes a transceiver, a memory, and a processor communicatively coupled to the transceiver and the memory. The processor and the memory are configured to cause the user equipment to determine a number of resource blocks that are not available for a transmission by the user equipment during a time slot designated for a first duplex mode of operation, wherein the resource blocks are between a first resource block set allocated for an uplink transmission by the user equipment during the time slot and a second resource block allocated for a downlink reception by the user equipment during the time slot, determine the number of resource blocks is greater than a threshold quantity, detect an energy level, determine that the energy level is less than a first energy detection threshold for a second duplex mode of operation after determining the number of resource blocks is greater than the threshold quantity, and transmit data after determining that the energy level is less than the first energy detection threshold.

A forty-third aspect relates to a user equipment. The user equipment includes means for identifying at least one resource block set that is not available for a transmission by the user equipment during a time slot designated for a first duplex mode of operation, wherein the at least one resource block set is between a first resource block set allocated for an uplink transmission by the user equipment during the time slot and a second resource block set allocated for a downlink reception by the user equipment during the time slot, means for detecting an energy level, means for determining that the energy level is less than an energy detection threshold for a second duplex mode of operation after identifying the at least one resource block set, and means for transmitting data after determining that the energy level is less than the energy detection threshold.

A forty-fourth aspect relates to a computer-readable medium including instructions stored therein. The instructions are executable by a processor of a user equipment to identify at least one resource block set that is not available for a transmission by the user equipment during a time slot designated for a first duplex mode of operation, wherein the at least one resource block set is between a first resource block set allocated for an uplink transmission by the user equipment during the time slot and a second resource block set allocated for a downlink reception by the user equipment during the time slot, detect an energy level, determine that the energy level is less than an energy detection threshold for a second duplex mode of operation after identifying the at least one resource block set, and transmit data after determining that the energy level is less than the energy detection threshold.

A forty-five aspect relates to method for wireless communication at a base station. The method includes specifying a resource block count threshold for a user equipment to determine whether to use an energy detection threshold for a first duplex mode of operation during a time slot designated for a second duplex mode of operation, transmitting the resource block count threshold to the user equipment.

A forty-sixth aspect relates to a method for wireless communication at a base station. The method includes specifying a resource block count threshold for a user equipment to determine whether to use an energy detection threshold for a first duplex mode of operation during a time slot designated for a second duplex mode of operation, and transmitting the resource block count threshold to the user equipment.

A forty-seventh aspect relates to a base station. The base station a transceiver, a memory, and a processor communicatively coupled to the transceiver and the memory. The processor and the memory are configured to cause the base station to specify a resource block count threshold for a user equipment to determine whether to use an energy detection threshold for a first duplex mode of operation during a time slot designated for a second duplex mode of operation, and transmit the resource block count threshold via the transceiver to the user equipment.

A forty-eighth aspect relates to a base station. The base station means for specifying a resource block count threshold for a user equipment to determine whether to use an energy detection threshold for a first duplex mode of operation during a time slot designated for a second duplex mode of operation, and means for transmitting the resource block count threshold to the user equipment.

A forty-ninth aspect relates to a computer-readable medium including instructions stored therein. The instructions are executable by a processor of a base station to specify a resource block count threshold for a user equipment to determine whether to use an energy detection threshold for a first duplex mode of operation during a time slot designated for a second duplex mode of operation, and transmit the resource block count threshold to the user equipment.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

FIG. 9 is a flow chart of an example process for selecting an LBT threshold according to some aspects.

FIG. 10 is a diagram illustrating an example of LBT resource block sets according to some aspects.

FIG. 18 is a flow chart of an example process for selecting an energy detection threshold according to a frequency gap according to some aspects.

FIG. 19 is a flow chart of an example process for selecting an energy detection threshold according to an access failure count according to some aspects.

FIG. 20 is a flow chart of an example process for selecting an energy detection threshold according to an unavailable resource block count according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence-enabled devices, etc.). While some examples may or may not be specifically directed to use cases or applications, a wide assortment of applicability of described innovations may occur. Implementations may range a spectrum from chip-level or modular components to non-modular, nonchip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
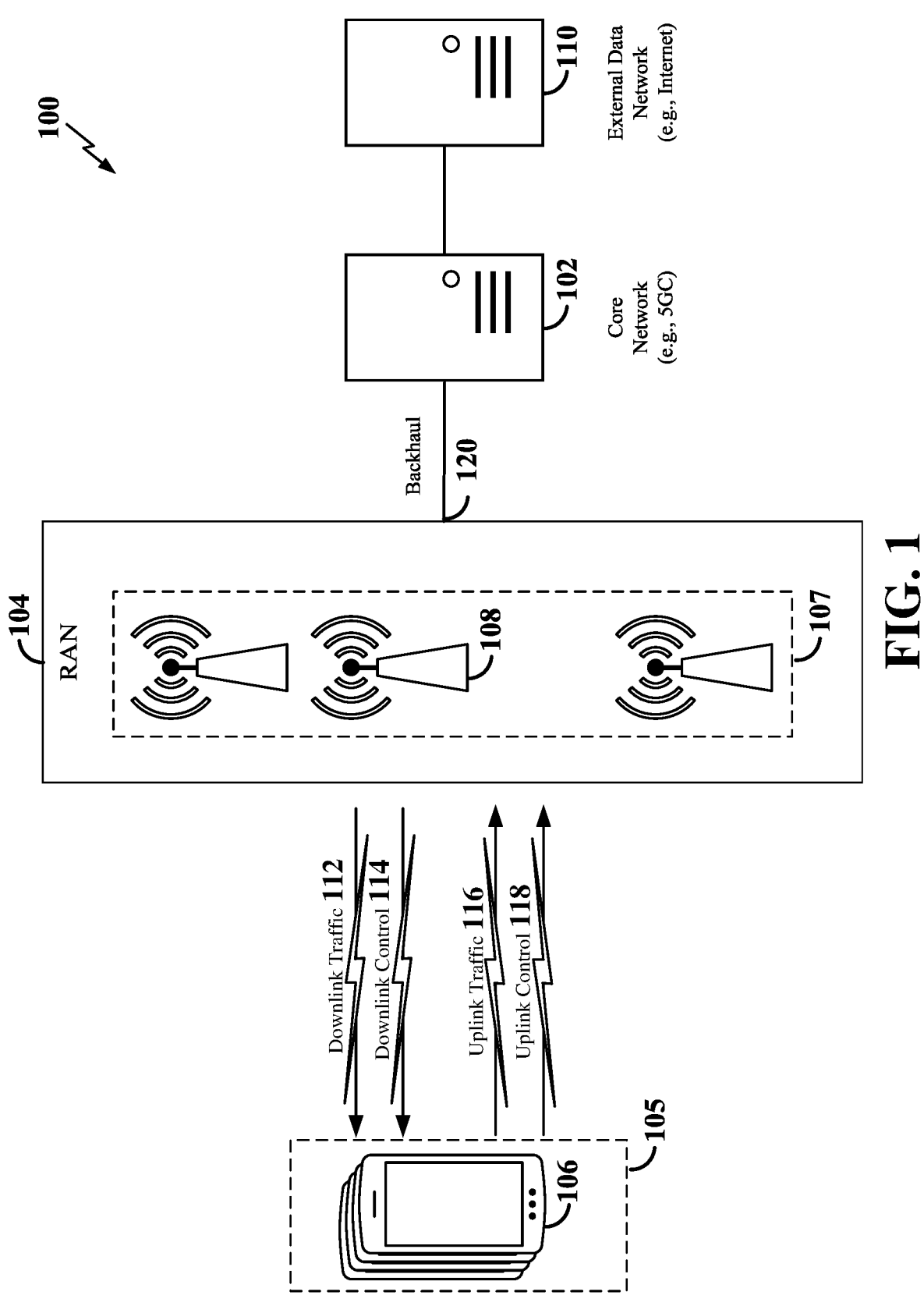
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 105. The at least one scheduled entity 105 may include at least one user equipment (UE) 106, as shown in the example in FIG. 1. However, it is to be understood that the at least one scheduled entity 105 is not limited to a UE. The RAN 104 includes at least one scheduling entity 107. The at least one scheduling entity 107 may include at least one base station (BS) 108, as shown in the example in FIG. 1. However, it is to be understood that the at least one scheduling entity 107 is not limited to a base station. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated in FIG. 1, the RAN 104 may include a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be co-located or non-co-located. The TRPs may communicate on the same carrier frequency or different carrier frequencies within the same frequency band or different frequency bands.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services. A UE need not necessarily have a capability to move, and may be stationary in some examples.

UEs may include a number of hardware structural components sized, shaped, and arranged to help in communication. Such components may include antennas, antenna arrays, RF chains, amplifiers, one or more processors, etc. electrically coupled to each other. For example, some non-limiting examples of a UE may include a mobile device, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A UE may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A UE may additionally be a digital home or smart home device such as a home audio, video, and/or multimedia device, an appliance, a vending machine, intelligent lighting, a home security system, a smart meter, etc. A UE may additionally be a smart energy device, a security device, a solar panel or solar array, a municipal infrastructure device controlling electric power (e.g., a smart grid), lighting, water, etc. A UE may additional be an industrial automation and enterprise device, a logistics controller agricultural equipment, military defense equipment, vehicles, aircraft, ships, and weaponry, etc. Still further, a UE may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (e.g., UE 106), as described further below.

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 107 (e.g., base station 108).

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 107 (e.g., base station 108) may broadcast downlink traffic 112 to one or more scheduled entities 105 (e.g., UEs 106). Broadly, the scheduling entity 107 is a node or device responsible for scheduling traffic in a wireless communication network, including the downlink traffic 112 and, in some examples, uplink traffic 116 from one or more scheduled entities 105 to the scheduling entity 107. On the other hand, the scheduled entity 105 is a node or device that receives downlink control information 114, including but not limited to scheduling information (e.g., a grant), synchronization or timing information, or other control information from another entity in the wireless communication network such as the scheduling entity 107.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
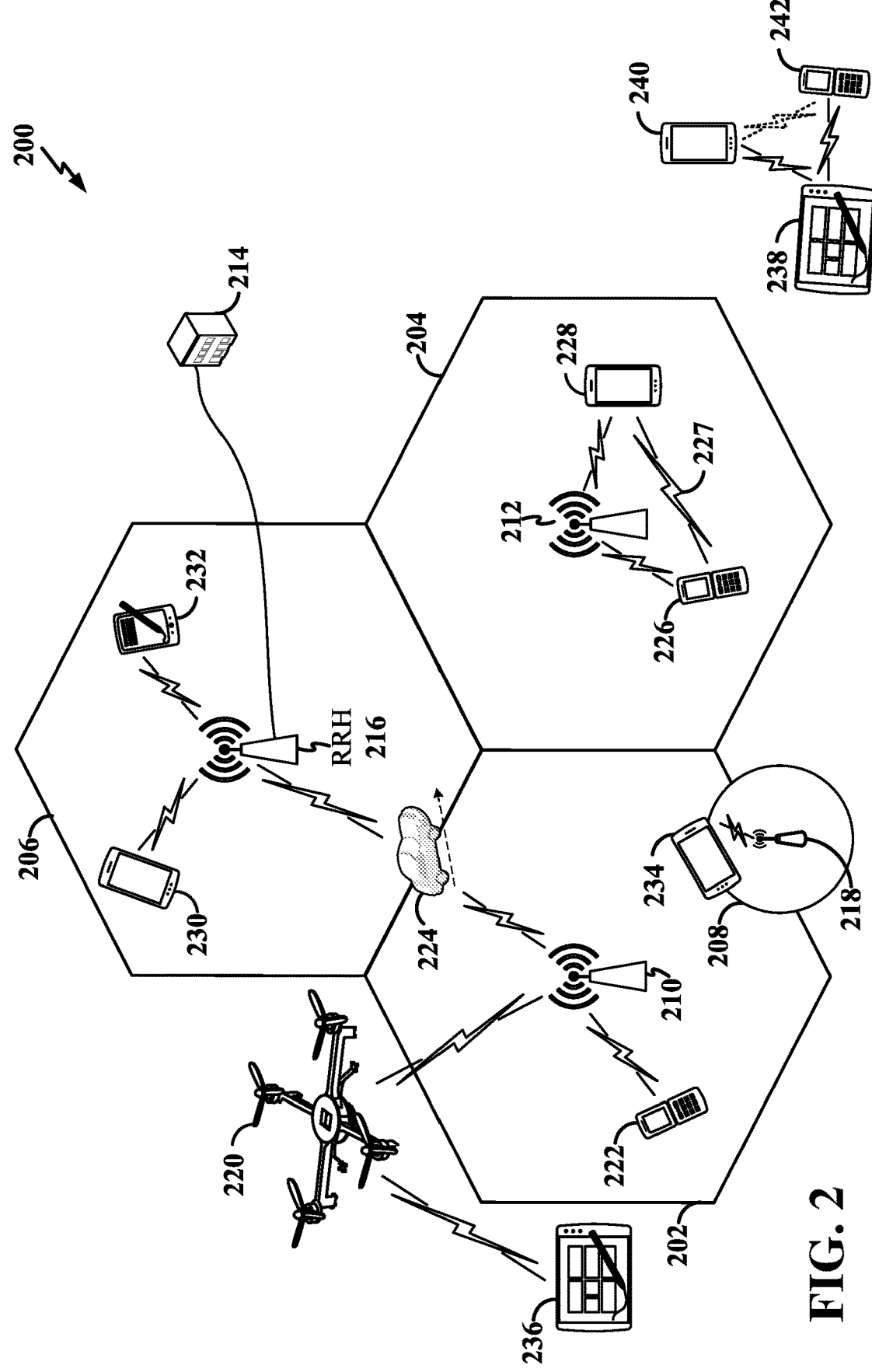
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204, respectively, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, and 218 provide wireless access points to a core network for any number of UEs. In some examples, the base stations 210, 212, 214, and/or 218 may be the same as the base stations 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UEs 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS. That is, in some examples, a cell may not necessarily be stationary, and the geographic area of the cell may move according to the location of a mobile base station such as a UAV 220.

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., cell 202) to the geographic area corresponding to a neighbor cell (e.g., cell 206). When the signal strength or quality from the neighbor cell (e.g., cell 206) exceeds that of its serving cell (e.g., cell 202) for a given amount of time, the UE 224 may transmit a reporting message to its serving base station (e.g., base station 210) indicating this condition. In response, the UE 224 may receive a handover command, and the UE may undergo a cell handover (e.g., from the cell 202 to the cell 206).

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the radio access network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In some examples, two or more UEs (e.g., UEs 226 and 228) within the coverage area of a serving base station (e.g., base station 212) may communicate with both the serving base station using cellular signals and with each other using direct link signals (e.g., sidelink signals 227) without relaying that communication through the base station. In an example of a V2X network within the coverage area of the base station 212, the base station 212 and/or one or both of the UEs 226 and 228 may function as scheduling entities to schedule sidelink communication between UEs 226 and 228.

Figure 3:
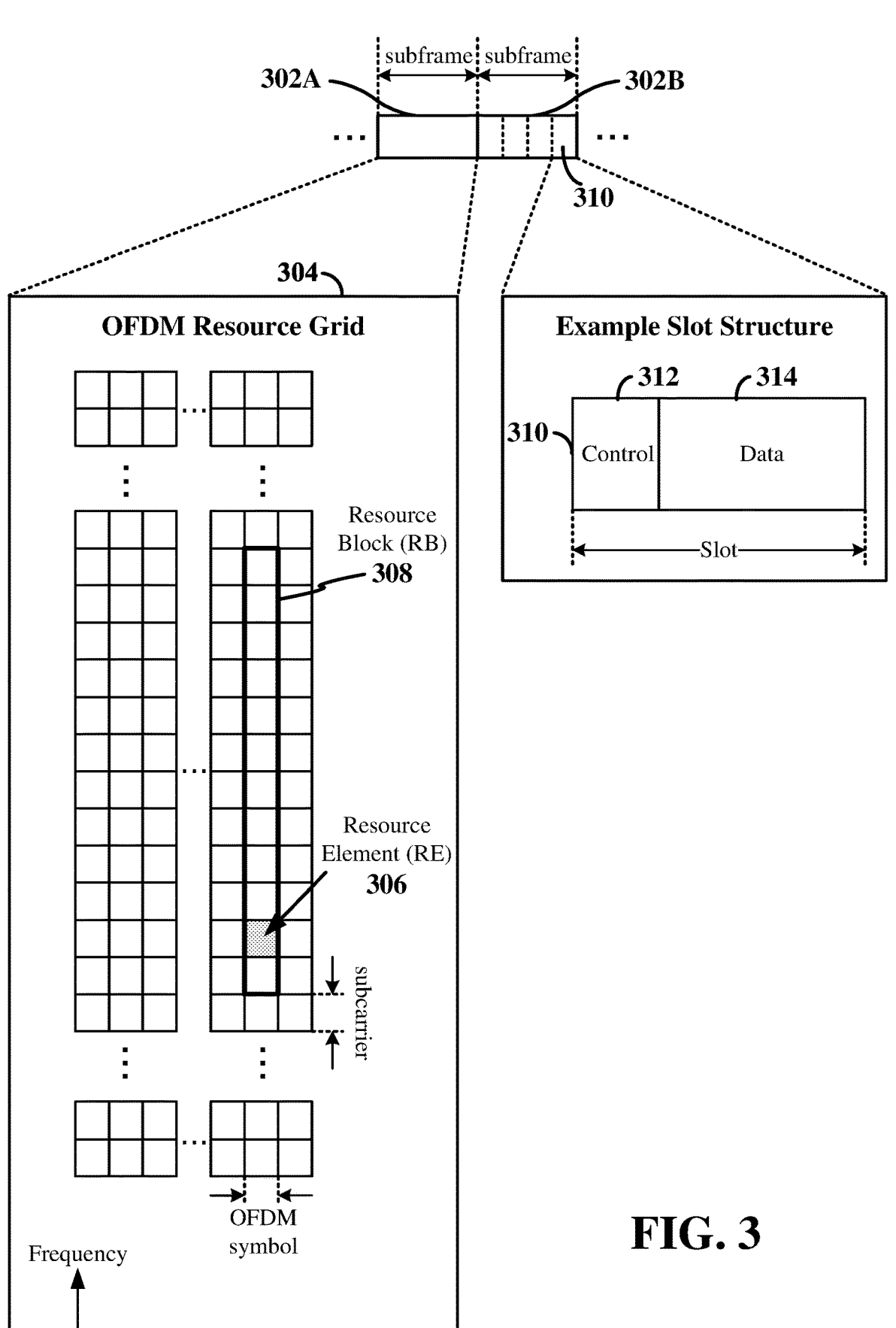
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid 304. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers. 5G NR supports a scalable numerology where different numerologies may be used for different radio frequency spectrums, different bandwidths, and the like. For example, sub-carrier spacings (SCSs) of 15 kHz, 30 kHz, 60 kHz, etc., may be used in different scenarios.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and may include a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which includes any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands or bandwidth parts (BWPs). Each BWP may include two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may include one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, a slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

In a DL transmission (e.g., over the Uu interface), the transmitting device (e.g., the scheduling entity) may allocate one or more REs 306 (e.g., within a control region 312) to carry DL control information including one or more DL control channels, such as a PBCH; and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS).

The PDCCH may carry downlink control information (DCI) including but not limited to power control commands, scheduling information, a grant, and/or an assignment of REs for DL and UL transmissions. The PHY carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission (e.g., over the Uu interface), the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1 to 3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4A:
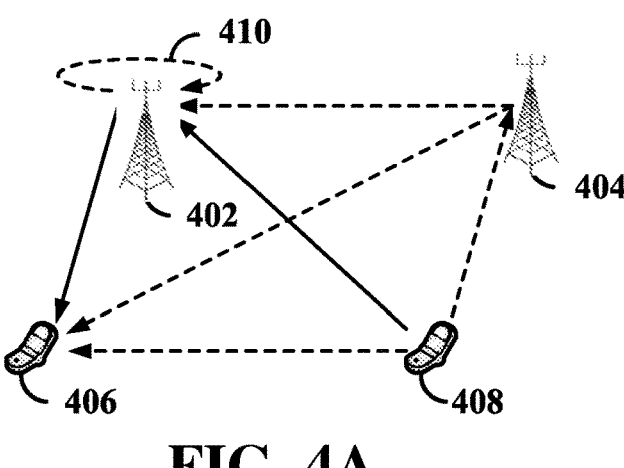
FIGS. 4A, 4B, and 4C are schematic illustrations of example sources of interference according to some aspects.
Figure 4B:
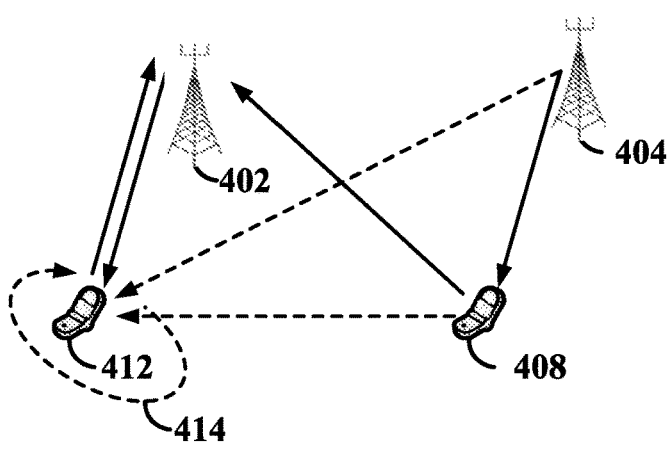
Figure 4C:
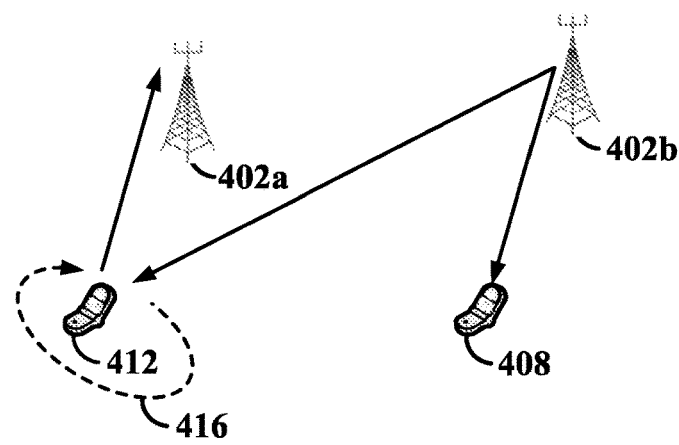

FIGS. 4A, 4B, and 4C are schematic illustrations of a wireless communication network 400 and different sources of interference for a half-duplex UE 406, a first full-duplex UE 412, a second full-duplex UE 408, and different gNB configurations according to some aspects of the disclosure. The UE 406, 408, or 412 may correspond to any of the UEs or scheduled entities shown in in any of FIGS. 1, 2, 7, 11, 12, 13, 14, and 15.

In FIG. 4A, a full-duplex gNB 402 (e.g., a scheduling entity) is transmitting to the half-duplex UE 406. During the time of the transmission from the full-duplex gNB 402 to the half-duplex UE 406, the full-duplex gNB 402 is receiving, at its receiver (not shown), self-interference 410 from its own transmission to the half-duplex UE 406 as well as interference from a neighboring gNB 404 and an uplink transmission from a second full-duplex UE 408. The half-duplex UE 406 is also receiving interference from the second full-duplex UE 408 and the neighboring gNB 404. Because it is a half-duplex UE, the half-duplex UE 406 is not transmitting during the time of the transmission from the full-duplex gNB 402 to the half-duplex UE 406, and therefore, the half-duplex UE 406 receives no self-interference. The full-duplex gNB 402 and neighboring gNB 404 may each correspond to any of the base stations or scheduling entities shown in any of FIGS. 1, 2, 7, 11, 12, 13, 14, and 22.

In FIG. 4B, the full-duplex gNB 402 is transmitting a downlink transmission to the first full-duplex UE 412. During the time of the transmission of the downlink transmission from the full-duplex gNB 402 to the first full-duplex UE 412, the full-duplex gNB 402 is receiving, at its receiver (not shown), a simultaneous uplink transmission from the first full-duplex UE 412. At the same time as the just mentioned simultaneous downlink and uplink transmissions, the first full-duplex UE 412 is receiving, at its receiver (not shown), self-interference 414 from its own transmission to the full-duplex gNB 402 as well as interference from the neighboring gNB 404 and interference from the second full-duplex UE 408.

FIG. 4C illustrates a full-duplex gNB configured as a multi-TRP base station including a first TRP 402a and a second TRP 402b. The first TRP 402a is receiving an uplink transmission from the first full-duplex UE 412. During the time of the transmission of the uplink transmission to the first TRP 402a, the first full-duplex UE 412 is also receiving a transmission from the second TRP 402b. In addition to the transmission received from the second TRP 418b, the first full-duplex UE 412 is also receiving, at its receiver (not shown), self-interference 416 from its own transmission to the first TRP 402a.

Conventionally, different frequency bands may be allocated for the transmissions of FIGS. 4A to 4C to mitigate the above interference. For the half-duplex UE 406 of FIG. 4A, interference may be mitigated if the interference from the neighboring gNB 404 and second full-duplex UE 408 are at frequencies other than those occupied by the downlink transmission from the full-duplex gNB 402 to the half-duplex UE 406. Similarly, for the first full-duplex UE 412 of FIGS. 4B and 4C, interference may be mitigated if the self-interference 416 from the first full-duplex UE 412, interference from the neighboring gNB 404, and/or interference from the second full-duplex UE 408 are at frequencies other than those occupied by the downlink transmission from the full-duplex gNB 402 to the half-duplex UE 406.

Various aspects of the disclosure may be applicable to FD operation with simultaneous uplink transmissions and downlink transmissions in FR2 and/or other frequency bands, which may be referred to herein as "FD mode." FD mode may include SBFD in flexible TDD, but may also include FDD in paired spectrum, SBFD in unpaired spectrum, partially overlapped frequency spectrum FD, fully overlapped frequency spectrum FD, in-band FD, or other types of full-duplex operation.

This FD capability may be implemented at a base station (e.g., a gNB), a UE, or both. For example, a UE may transmit uplink signals from one panel and receive downlink signals at another panel.

In some aspects, full-duplex performance may depend on beam separation and/or other factors. For example, a first pair of beams that has more spatial separation than a second pair of beams may have less self interference than the second pair of beams.

In some aspects, FD capability may improve (e.g., reduce) latency. For example, in contrast with half-duplex communication where only some of the slots are reserved for uplink transmission, in FD communication a UE might not need to wait for an available uplink slot to transmit uplink information, thereby reducing the latency for the uplink transmission. As another example, a UE may receive downlink signals in slots that are dedicated as uplink-only slots, thereby reducing the latency for the downlink transmission.

In some aspects, FD capability may improve spectrum efficiency (e.g., per cell, per UE, etc.). For example, in FD communication, the same time slots and/or frequency resources may be used concurrently for uplink and downlink transmissions. Here, the downlink frequency band(s) and the uplink frequency band(s) in FD communication may be fully overlapped, partially overlapped, or separated with a guard band in between.

Figure 5B:
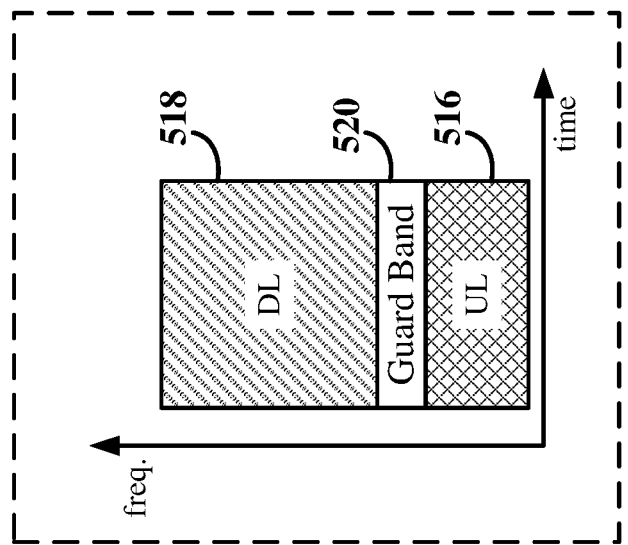
FIGS. 5A and 5B are diagrams illustrating example frequency domain allocations according to some aspects.
Figure 5A:
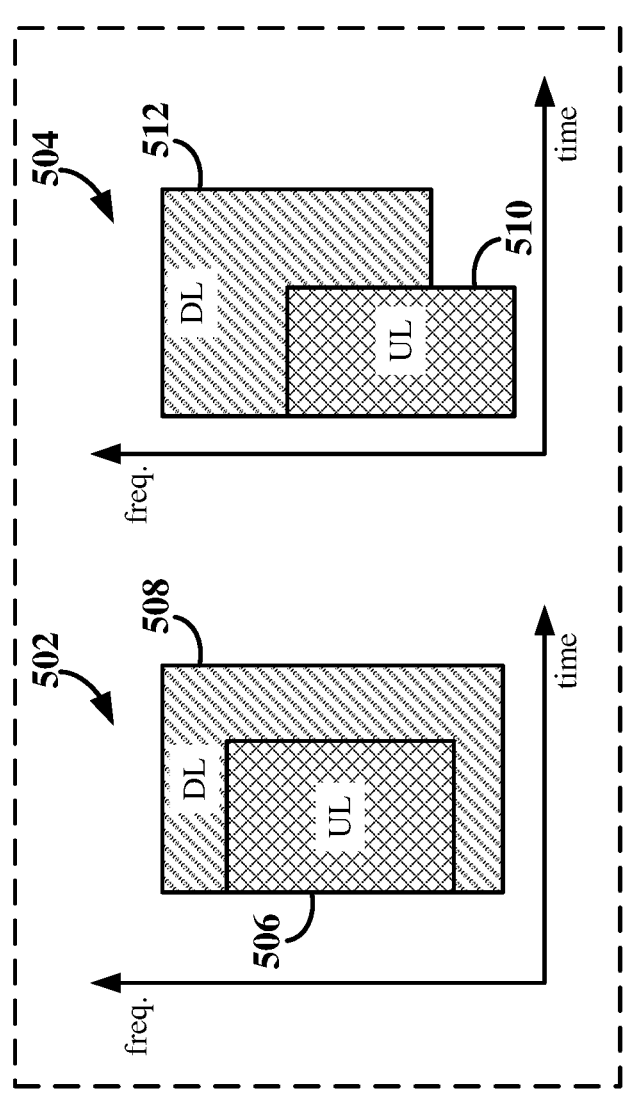

FIGS. 5A and 5B illustrate examples two modes of full-duplex operation. FIG. 5A illustrates an example of in-band full-duplex (IBFD) where the frequency spectrum for the UL and the DL overlap at least in part. FIG. 5B illustrates an example of sub-band FDD where the frequency spectrums for the UL and the DL are in the same band, but do not overlap. Sub-band FDD may be referred to as flexible duplex.

In the examples shown in FIG. 5A, time is illustrated along the horizontal axis while frequency is illustrated along the vertical axis. A first example 502 of overlapping frequency spectrum is depicted on the left while a second example 504 is depicted on the right. In the first example 502, the UL time-frequency resources 506 completely overlap with a portion of the DL time-frequency resources 508. In the second example 504, the UL time-frequency resources 510 partially overlap with a portion of the DL time-frequency resources 512. Accordingly, a device, for example a base station and/or a scheduled entity, employing overlapping frequency spectrum may transmit and receive on the same time and frequency resources. That is, the device may transmit and receive at the same time(s) at the same frequency (or frequencies). The UL and DL share the same time and frequency resources. The overlap in time-frequency resources may be complete, as in the first example 502, or partial, as in the second example 504.

In the example shown in FIG. 5B, time is illustrated along the horizontal axis while frequency is illustrated along the vertical axis. Here, a device may transmit and receive at the same time but on different frequency resources in unpaired spectrum (e.g., within the same carrier bandwidth). The UL time-frequency resources 516 are separated from the DL time-frequency resources 518 by a guard band 520 (e.g., on the order of 5 RBs). Here, while the guard band 520 provides some frequency separation between the UL time-frequency resources 516 and the DL time-frequency resources 518, there may still be significant interference between the UL and the DL. This is in contrast with conventional FDD communication where the frequency separation between the UL and the DL is much larger and, as such, there typically is less interference between the UL and the DL.

Figure 6:
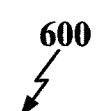
FIG. 6 is a diagram illustrating examples of slot formats according to some aspects.

FIG. 6 illustrates several examples of full-duplex slot formats. In this example, a first slot format 602 is identified by a first identifier (SlotFormatCombinationID 1), a second slot format 604 is identified by a second identifier (SlotFormatCombinationID 2), a third slot format 606 is identified by a third identifier (SlotFormatCombinationID 3), and a fourth slot format 608 is identified by a fourth identifier (SlotFormatCombinationID 4). For each slot format, four example slots are shown. Other full-duplex slot formats may be used in other examples.

FIG. 6 depicts transmission and reception that may be achieved, for example, at a UE through the use of two antenna panels of an antenna array. When the antenna array is simultaneously receiving a combination of DL data (e.g., DL data 610) and transmitting UL data (e.g., PUSCH 612) and UL control (e.g., PUCCH 614), a first panel of the antenna array may be configured for DL reception and second panel of the antenna array may be configured for UL transmission.

The different slot formats of FIG. 6 define different time-frequency resources for uplink transmissions and downlink transmission. For example, more bandwidth is allocated for a PUSCH 616 in fourth slot of the third slot format 606 than is allocated for a PUSCH 618 in fourth slot of the first slot format 602.

As discussed above, wireless communication may be conducted over unlicensed radio frequency (RF) spectrum (e.g., an unlicensed RF band) or shared RF spectrum in some scenarios. For example, a network operator may deploy cells that are configured to communicate on an unlicensed RF spectrum (e.g., in addition to cells operating on a licensed RF spectrum) to extend the coverage of the network or to provide additional services (e.g., higher throughput) to UEs operating within the network. As another example, a UE may be configured to communicate with another device (e.g., a BS or another UE) on an unlicensed RF spectrum.

In some scenarios, devices that transmit over an unlicensed RF spectrum or shared RF spectrum may use a collision avoidance scheme to reduce the likelihood that multiple devices will transmit on the same RF spectrum at the same time. One example of such a collision avoidance scheme is a listen-before-talk (LBT) procedure. In general, before a first device transmits on a particular RF spectrum, the first device may listen for any transmissions by any other devices on that RF spectrum. If the RF spectrum is currently being used, the first device may back-off for a period of time and then re-attempt transmission (e.g., by listening for other transmissions again). Carrier sense multiple access (CSMA) is one example of an LBT procedure. Other types of LBT procedures may be used as well.

NR operation in the unlicensed RF spectrum may be referred to as NR-U. Under NR-U, some transmissions may be subject to LBT. For example, a wireless device, such as a UE or a gNB, may perform a clear channel assessment (CCA), such as LBT, prior to gaining control of a wireless channel in an unlicensed RF spectrum or shared RF spectrum. A gNB may transmit, subject to LBT, a synchronization signal block (SSB) that carries synchronization signals and reference signals (e.g., discovery reference signals (DRSs)) for a UE to discover and synchronize with the gNB.

Different types of LBT procedures may be defined according to different categories. For example, Category 1 (Cat. 1) LBT specifies that LBT is not used. Category 2 (Cat. 2) LBT specifies the use of LBT without random back-off. Category 3 (Cat. 3) LBT specifies the use of LBT with random back-off with a fixed size contention window. Category 4 (Cat. 4) LBT specifies the use of LBT with random back-off with a variable size contention window.

The disclosure relates in some aspects to an energy detection threshold for a transmission on a wireless communication channel where access to the channel is gained through the use of a listen-before-talk (LBT) procedure. In some examples, the energy detection threshold is specified for a slot designated for full-duplex communication. A slot designated for full-duplex communication may be referred to as a full-duplex slot, while a slot designated for half-duplex communication may be referred to as a half-duplex slot.

Channel activity and detected energy may depend to a large extent on the slot type (e.g., whether the slot is a full-duplex slot or a half-duplex slot). For example, from a UE perspective, the detected energy in a half-duplex slot (e.g., UL slot) can be different (e.g., significantly different) from the detected energy in a full-duplex slot. Using different LBT threshold values for different slot types may significantly enhance the LBT and channel access process.

The disclosure relates in some aspects to defining separate half-duplex (HD) and full-duplex (FD) LBT thresholds. For example, different LBT threshold values may be configured for half-duplex and full-duplex operation. In this case, the UE is expected to be configured with an LBT threshold for full-duplex operation as well as an LBT threshold for the half-duplex operation. In some cases, an LBT threshold is related to the transmission power, for example, European Telecommunications Standards Institute (ETSI) adaptivity for Load Based Equipment (LBE) at 5 GHz gives the threshold as a function of the bandwidth and output power as set forth in Equation 1. In this case, the threshold may depend on the output power of the particular slot type as follows:

$$X_T(P_{out}) = -73 \text{ dBm} + 10^* \log 10(B) + (23 \text{ dBm} - P_{out}) \quad \text{EQUATION 1}$$

where $P_{out}$ is the output power, B is the bandwidth, and $X_T$ is the LBT threshold. In this example, the LBT increases logarithmically with bandwidth. Also, in this example, the LBT threshold decreases for higher output power. This is because transmission at a higher output power may have a greater likelihood of causing interference with another device. In this case, the reduced LBT threshold places a more stringent condition on the UE before the UE transmits on the channel. It is to be appreciated that the present disclosure is not limited to the exemplary constant values in Equation 1. For example, Equation 1 may be written more generally as Equation 2 below:

$$X_T(P_{out}) = -N \text{ dBm} + 10^* \log 10(B) + (M \text{ dBm} - P_{out}) \quad \text{EQUATION 2}$$

where N may be a first constant value and M may be a second constant value. It is also to be appreciated that the bandwidth term may be omitted in some implementations (e.g., to simplify the computation for the LBT threshold or in cases were the Bandwidth is approximately constant or varies by a small amount).

Figure 7:
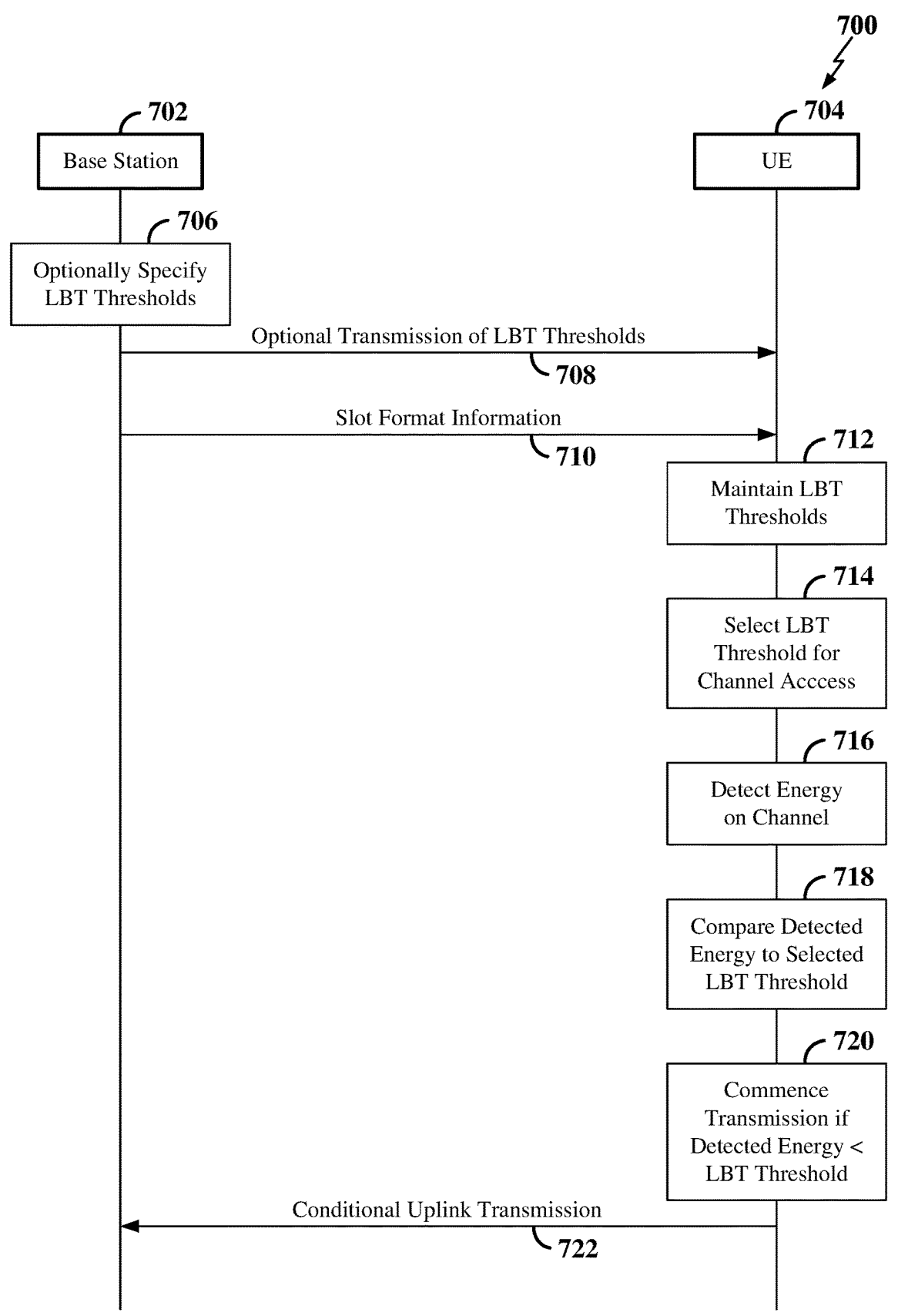
FIG. 7 is a signaling diagram illustrating an example of signaling associated with LBT threshold selection according to some aspects.

FIG. 7 is a signaling diagram 700 illustrating an example of LBT-related signaling in a wireless communication system including a base station (BS) 702 and a UE 704. In some examples, the BS 702 may correspond to any of the base stations or scheduling entities shown in any of FIGS. 1, 2, 4, 11, 12, 13, 14, and 22. In some examples, the UE 704 may correspond to any of the UEs or scheduled entities shown in any of FIGS. 1, 2, 4, 11, 12, 13, 14, and 15.

At block 706 of FIG. 7, the BS 702 may specify at least one HD LBT threshold for an HD mode of operation and at least one FD LBT threshold for an FD mode of operation.

At block 708, if the BS 702 specifies the LBT thresholds at block 706, the BS 702 may transmit the LBT thresholds to the UE 704. For example, the BS 702 may transmit the LBT thresholds in a radio resource control (RRC) message or another type of message. In another example, the LBT thresholds may already be stored on the UE 704 (e.g., the LBT thresholds may be preloaded onto the UE 704 and/or defined by a communication standard).

At block 710, the BS 702 transmits slot format information to the UE 704. In some examples, the slot format information may specify the slot format(s) for scheduled transmissions and/or receptions by the UE 704. In some examples, the slot format information may specify a slot format index associated with at least one frequency domain allocation.

At block 712, the UE 704 maintains LBT thresholds. In some examples, the LBT thresholds are specified by a communication standard (e.g., a 3GPP Technical Specification). In this case, the UE 704 may be pre-configured with the LBT thresholds (e.g., upon activation of the UE 704). In some examples, the UE 704 receives the LBT thresholds from the BS 702 at block 708.

At block 714, the UE 704 selects an LBT threshold to use for channel access from the LBT thresholds maintained by the UE 704. In some examples, the UE 704 determines, based on the slot format information received at block 710, that a particular slot is designated as an FD slot. In this case, the channel access is for an FD mode of operation during the slot. As discussed in more detail herein, the UE 704 may select an HD LBT threshold or an FD LBT threshold for the channel access (e.g., select the HD LBT if the slot format information indicates an HD slot and select the FD LBT if the slot format information indicates an FD slot).

At block 718, the UE 704 compares the energy detected at block 716 to the LBT threshold selected at block 714.

At block 716, the UE 704 detects energy (i.e., energy level) on the channel.

At block 720, the UE 704 may commence transmission on the slot of interest if the detected energy is less than the LBT threshold (e.g., the channel is deemed to be clear). If the detected energy is above the LBT threshold, the UE 704 may back off (e.g., for a period of time before reassessing whether the channel is clear).

At block 722, the UE 704 may thus transmit an uplink transmission during the slot if the transmission was commenced at block 720.

The disclosure relates in some aspects to using different FD LBT thresholds for different scenarios. For example, for every frequency domain allocation in a full-duplex slot or for every group of frequency domain allocation in a full-duplex slot, the UE may be configured with a threshold value that is used during the LBT operation.

These threshold values can be RRC configured or fixed by a specification in some examples. The threshold values may be a function of one or more of the DL bandwidth and UL bandwidth, the overlap (e.g., frequency overlap) between the DL and UL, and/or the guard-band configuration.

Figure 8:
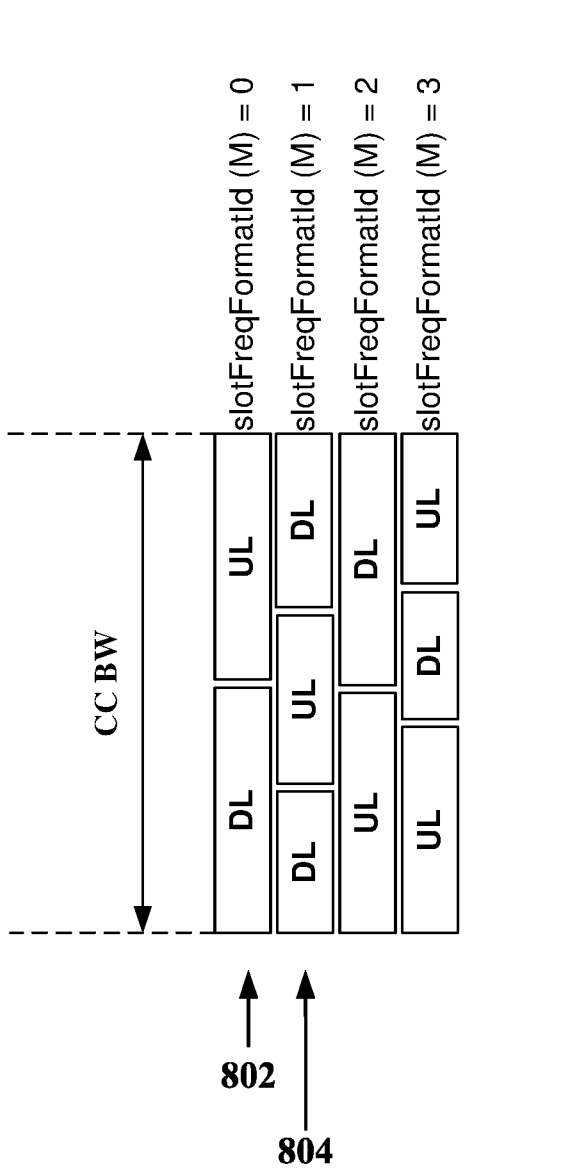
FIG. 8 is a diagram illustrating an example of slot format identifiers according to some aspects.

FIG. 8 illustrates an example of a mapping between different frequency domain allocations and a set of slot format indices (SlotFreqFormatID). For example, the frequency domain allocation shown in a first slot 802 is mapped to index 0, the frequency domain allocation shown in a second slot 804 is mapped to index 1, and so on. In some examples, different FD LBT thresholds may be mapped to different indices. In this way, the values of the thresholds may be better mapped to the expected channel activities for the different slot formats.

The disclosure relates in some aspects to conditioning use of an HD LBT threshold on the amount of frequency separation between an uplink frequency allocation and a downlink frequency allocation (e.g., for a slot). In a sub-band full-duplex slot, if there is a sufficient gap between the UL and DL (e.g., the guard band 520 of FIG. 5), the UE can fall-back to the half-duplex threshold. Thus, a UE may be configured with a guard-band threshold for a full-duplex slot. If the separation between an uplink frequency allocation and a downlink frequency allocation for the slot is greater than the guard-band threshold, the UE may use the half-duplex LBT threshold for the corresponding LBT operation.

The disclosure relates in some aspects to conditioning use of an HD LBT threshold on the number of times a UE has failed to gain access to a channel when the UE uses a full-duplex LBT threshold. After a specified number of attempts to access the channel in a full-duplex slot, the UE may resort to using a half-duplex LBT threshold. Thus, a UE may be configured with a threshold number of channel access attempts for a full-duplex slot. If the UE fails to access the channel after performing this number of access attempts, the UE may fall-back to a half-duplex LBT threshold for the corresponding LBT operation.

FIG. 9 is a flow chart illustrating an example LBT process 900 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the UE 1500 illustrated in FIG. 15. In some examples, the process 900 may be carried out by any suitable apparatus or means for carrying out the functions or algorithm described below.

At block 902, a UE attempts to access a channel using an FD LBT threshold. For example, the UE may detect energy on the channel and compare the detected energy to the FD LBT threshold. In this example, the attempt succeeds if the detected energy is lower than the FD LBT threshold, and fails if the detected energy is higher than the FD LBT.

At block 904, if the access succeeded (e.g., the detected energy was lower than the threshold level), the UE may transmit on the channel (block 906).

On the other hand, if the access failed (e.g., the detected energy was higher than the threshold level), the UE determines at block 908 whether the number of failed access attempts exceeds a threshold count. If the number of failed access attempts does not exceed the threshold count, the operational flow returns back to block 902 where the UE again attempts to gain access to the channel (e.g., after a back-off period).

If the number of failed access attempts exceeded the threshold count at block 908, the UE may switch to an HD LBT threshold for subsequent access attempts (e.g., for a period of time). For example, the UE may detect energy of the channel and compare the detected energy with the HD LBT. If the detected energy if lower than the HD LBT, then the UE may transmit on the channel.

The disclosure relates in some aspects to conditioning use of an HD LBT threshold on an RB set or LBT bandwidth configuration. FIG. 10 illustrates an example of such a resource configuration 1000. An RB set or LBT bandwidth is the unit in the frequency domain at which a node (e.g., a gNB or a UE) performs an LBT operation. In some examples, an RB set includes a set of RBs (e.g., a hundred or more RBs). In some examples, each RB may include a set of subcarriers (e.g., 12 subcarriers). If the gNB indicates to the UE that some RB sets are not available for transmission, there may be a relatively large gap between the DL and UL. In this case, the UE may elect to use a half-duplex threshold value for an LBT operation. For example, as shown in FIG. 10, RB set 2 between uplink RB set 1 and downlink RB set 3 is unavailable, resulting in a large gap between the UL and DL RB sets. In this case, the UE may deem that the full-duplex impact is low and use the half-duplex threshold to improve the likelihood of gaining access to the medium (e.g., channel). Here, the UE may be configured with a threshold (e.g., a number of RB sets) that constitute a guard band that the UE can use as a half-duplex threshold. If the number of unavailable RB sets is greater than this threshold, the UE may elect to use the half-duplex threshold.

Figure 11:
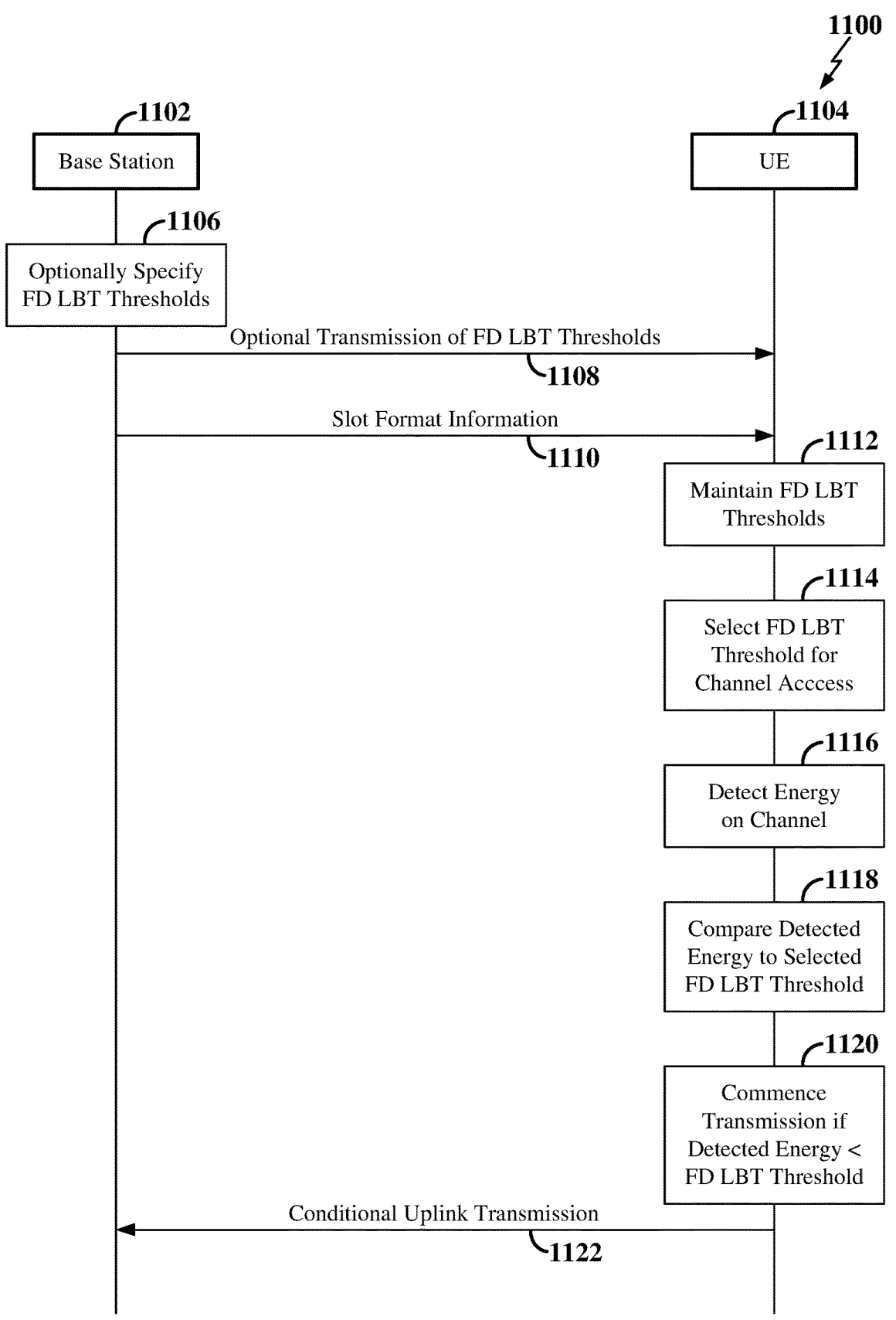
FIG. 11 is a signaling diagram illustrating another example of signaling associated with LBT threshold selection according to some aspects.

FIG. 11 is a signaling diagram 1100 illustrating an example of LBT-related signaling in a wireless communication system including a base station (BS) 1102 and a UE 1104. In some examples, the BS 1102 may correspond to any of the base stations or scheduling entities shown in any of FIGS. 1, 2, 4, 7, 12, 13, 14, and 22. In some examples, the UE 1104 may correspond to any of the UEs or scheduled entities shown in any of FIGS. 1, 2, 4, 7, 12, 13, 14, and 15.

At block 1106 of FIG. 11, the BS 1102 may specify multiple FD LBT thresholds for an FD mode of operation.

At block 1108, if the BS 1102 specifies the FD LBT thresholds at block 1106, the BS 1102 may transmit the FD LBT thresholds to the UE 1104.

At block 1110, the BS 1102 transmits slot format information to the UE 1104. In some examples, the slot format information may specify the slot format(s) for scheduled transmissions and/or receptions by the UE 1104. In some examples, the slot format information may specify a slot format index associated with at least one frequency domain allocation for FD slots.

At block 1112, the UE 1104 maintains FD LBT thresholds. In some examples, the FD LBT thresholds are specified by a communication standard (e.g., a 3GPP Technical Specification). In this case, the UE 1104 may be pre-configured with the FD LBT thresholds (e.g., upon activation of the UE 1104). In some examples, the UE 1104 receives the FD LBT thresholds from the BS 1102 at block 1108.

At block 1114, the UE 1104 selects an FD LBT threshold to use for channel access from the FD LBT thresholds maintained by the UE 1104. In some examples, the UE 1104 determines, based on the slot format information received at block 1110, that a particular slot is configured for a particular FD frequency domain allocation (e.g., as indicated by a slot format index received at block 1110). In this case, the UE 1104 may select the FD LBT threshold for the channel access that has been designated to be used for the FD frequency domain allocation. For example, the UE 1104 may select the FD LBT threshold that maps to the received slot format index (e.g., as indicated by a mapping between slot format indices and FD slot formats maintained by the UE 1104).

At block 1116, the UE 1104 detects energy on the channel.

At block 1118, the UE 1104 compares the energy detected at block 1116 to the FD LBT threshold selected at block 1114.

At block 1120, the UE 1104 may commence transmission on the slot of interest if the detected energy is less than the FD LBT threshold (e.g., the channel is deemed to be clear).

At block 1122, the UE 1104 may thus transmit an uplink transmission during the slot if the transmission was commenced at block 1120.

Figure 12:
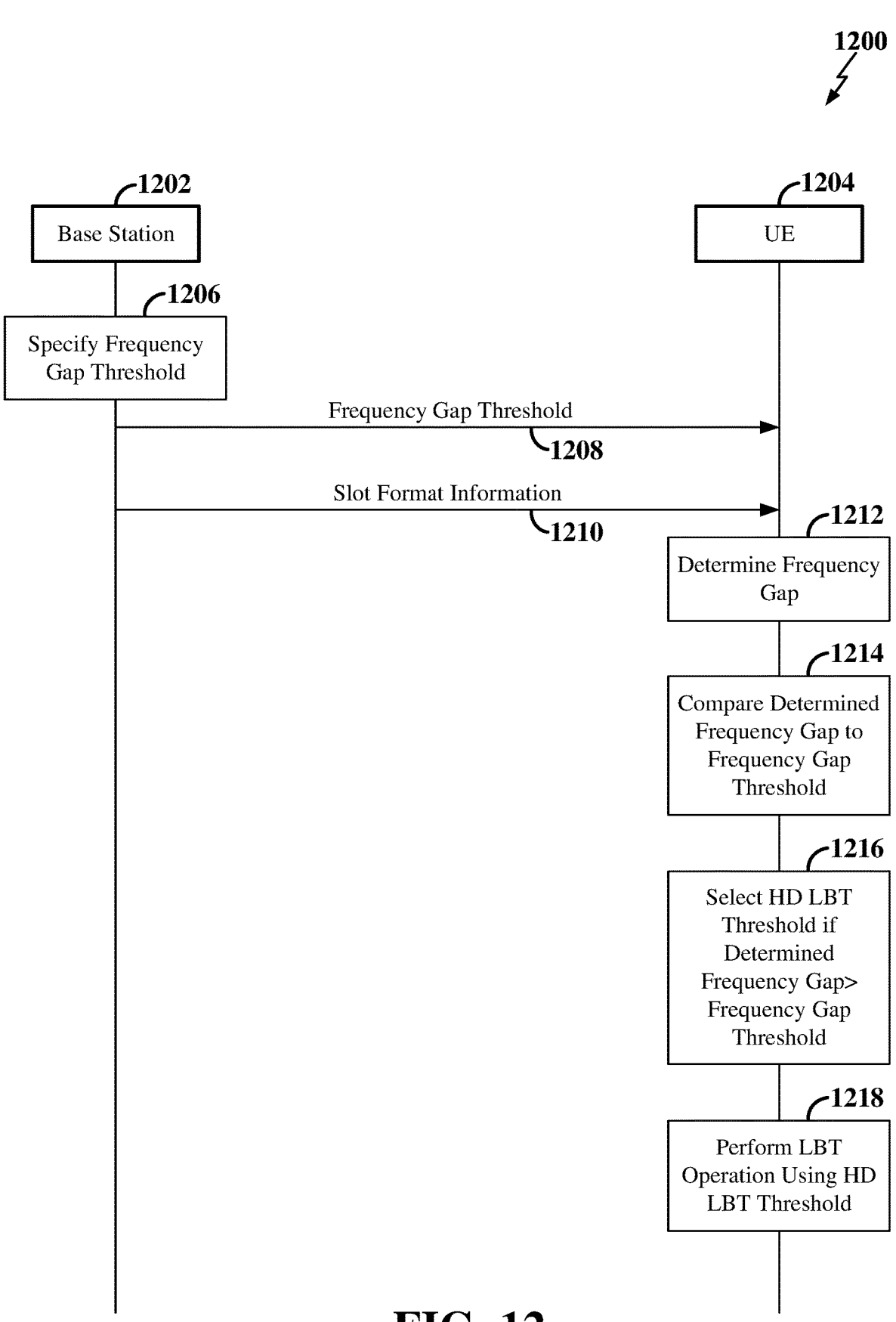
FIG. 12 is a signaling diagram illustrating another example of signaling associated with LBT threshold selection according to some aspects.

FIG. 12 is a signaling diagram 1200 illustrating an example of LBT-related signaling in a wireless communication system including a base station (BS) 1202 and a UE 1204. In some examples, the BS 1202 may correspond to any of the base stations or scheduling entities shown in any of FIGS. 1, 2, 4, 7, 11, 13, 14, and 22. In some examples, the UE 1204 may correspond to any of the UEs or scheduled entities shown in any of FIGS. 1, 2, 4, 7, 11, 13, 14, and 15.

At block 1206 of FIG. 12, the BS 1202 specifies a frequency gap threshold for an FD mode of operation.

At block 1208, the BS 1202 transmits the frequency gap threshold to the UE 1204. For example, the BS 1202 may transmit the frequency gap threshold in a radio resource control (RRC) message or another type of message. In another example, the frequency gap threshold may already be stored on the UE 1204 (e.g., the frequency gap threshold may be preloaded onto the UE 1204 and/or defined by a communication standard).

At block 1210, the BS 1202 transmits slot format information to the UE 1204. In some examples, the slot format information may specify the slot format(s) for scheduled transmissions and/or receptions by the UE 1204. In some examples, the slot format information may specify a slot format index associated with at least one frequency domain allocation.

At block 1212, upon determining that the slot is an FD slot (e.g., based on the slot format information), the UE 1204 determines the frequency gap (e.g., guard band) between the uplink resource allocation (e.g., bandwidth allocation) and the downlink resource allocation for a slot of interest.

At block 1214, the UE 1204 compares the frequency gap determined at step 1212 to the frequency gap threshold received at step 1208.

At block 1216, the UE 1204 selects an HD LBT threshold for an LBT channel access operation for the slot if the determined frequency gap is greater than the frequency gap threshold. Here, a higher level LBT threshold may be desirable when there is sufficient separation between the uplink frequency band and downlink frequency band.

At block 1218, the UE 1204 performs the LBT operation for the slot using the HD LBT threshold selected at block 1216. If the determined frequency gap is less than the frequency gap threshold at block 1216, then the UE 1204 may perform the LBT operation for the slot using an FD LBT threshold.

Figure 13:
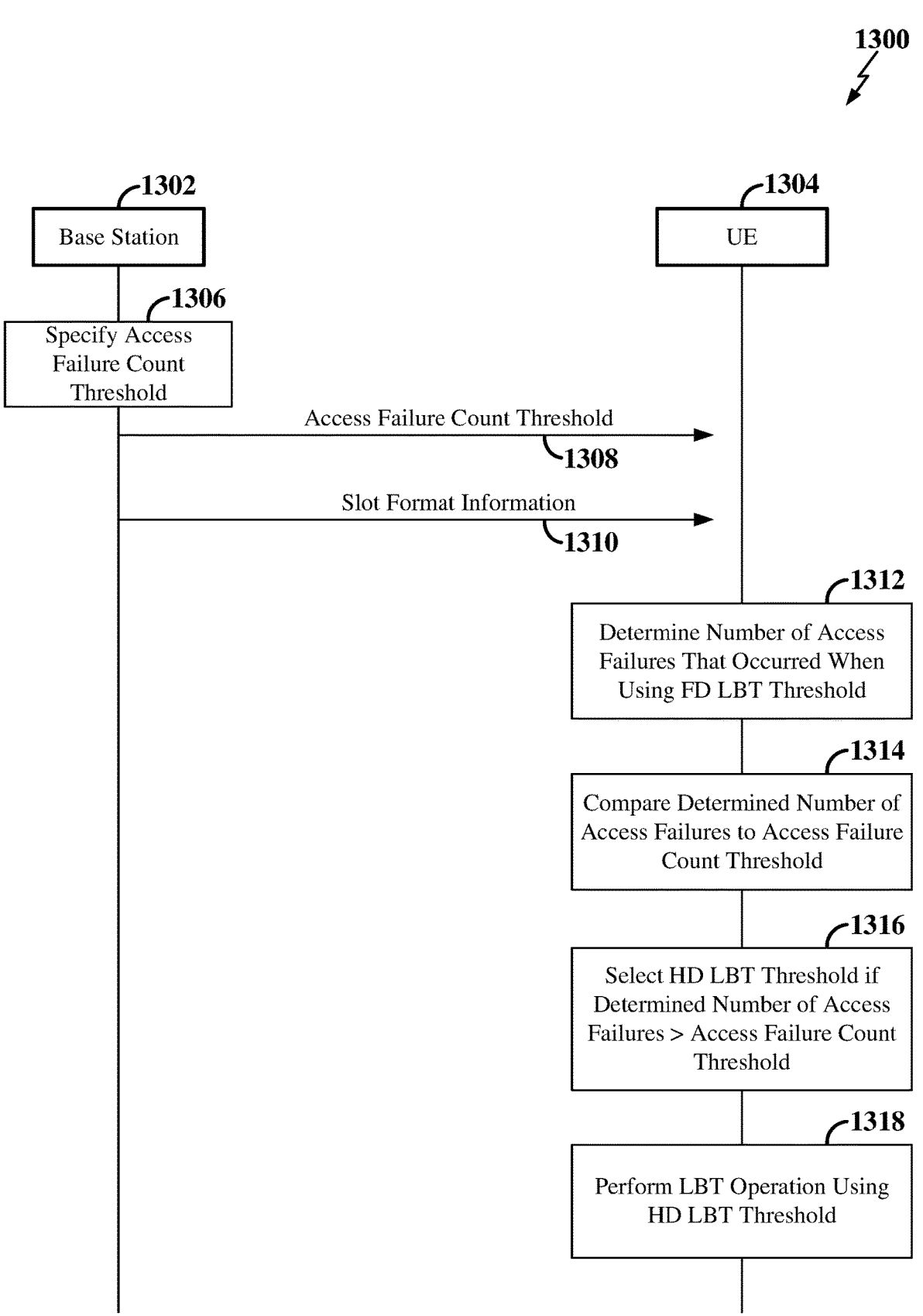
FIG. 13 is a signaling diagram illustrating another example of signaling associated with LBT threshold selection according to some aspects.

FIG. 13 is a signaling diagram 1300 illustrating an example of LBT-related signaling in a wireless communication system including a base station (BS) 1302 and a UE 1304. In some examples, the BS 1302 may correspond to any of the base stations or scheduling entities shown in any of FIGS. 1, 2, 4, 7, 11, 12, 14, and 22. In some examples, the UE 1304 may correspond to any of the UEs or scheduled entities shown in any of FIGS. 1, 2, 4, 7, 11, 12, 14, and 15.

At block 1306 of FIG. 13, the BS 1302 specifies an access failure count threshold for an FD mode of operation.

At block 1308, the BS 1302 transmits the access failure count threshold to the UE 1304. For example, the BS 1302 may transmit the access failure count threshold in a radio resource control (RRC) message or another type of message. In another example, the access failure count threshold may already be stored on the UE 1304 (e.g., the access failure count threshold may be preloaded onto the UE 1304 and/or defined by a communication standard).

At block 1310, the BS 1302 transmits slot format information to the UE 1304. In some examples, the slot format information may specify the slot format(s) for scheduled transmissions and/or receptions by the UE 1304. In some examples, the slot format information may specify a slot format index associated with at least one frequency domain allocation.

At block 1312, upon failing to access a channel (e.g., to transmit during an FD slot) using an LBT operation based on an FD LBT threshold, the UE 1304 determines the number of access failures. For example, the UE 1304 may maintain a count of the number of failed channel access attempts that occurred over a defined period of time.

At block 1314, the UE 1304 compares the number of access failures determined at block 1312 to the access failure count threshold received at block 1308.

At block 1316, the UE 1304 selects an HD LBT threshold for an LBT channel access operation for the slot if the determined number of access failures is equal to or greater than the access failure count threshold. For example, to ensure that the UE 1304 is able to transmit its data (e.g., particularly data with a high priority and/or a low latency requirement), the UE 1304 may elect to use a threshold with a higher threshold value for the LBT operation.

At block 1318, the UE 1304 performs the LBT operation for the slot using the HD LBT threshold selected at block 1316.

Figure 14:
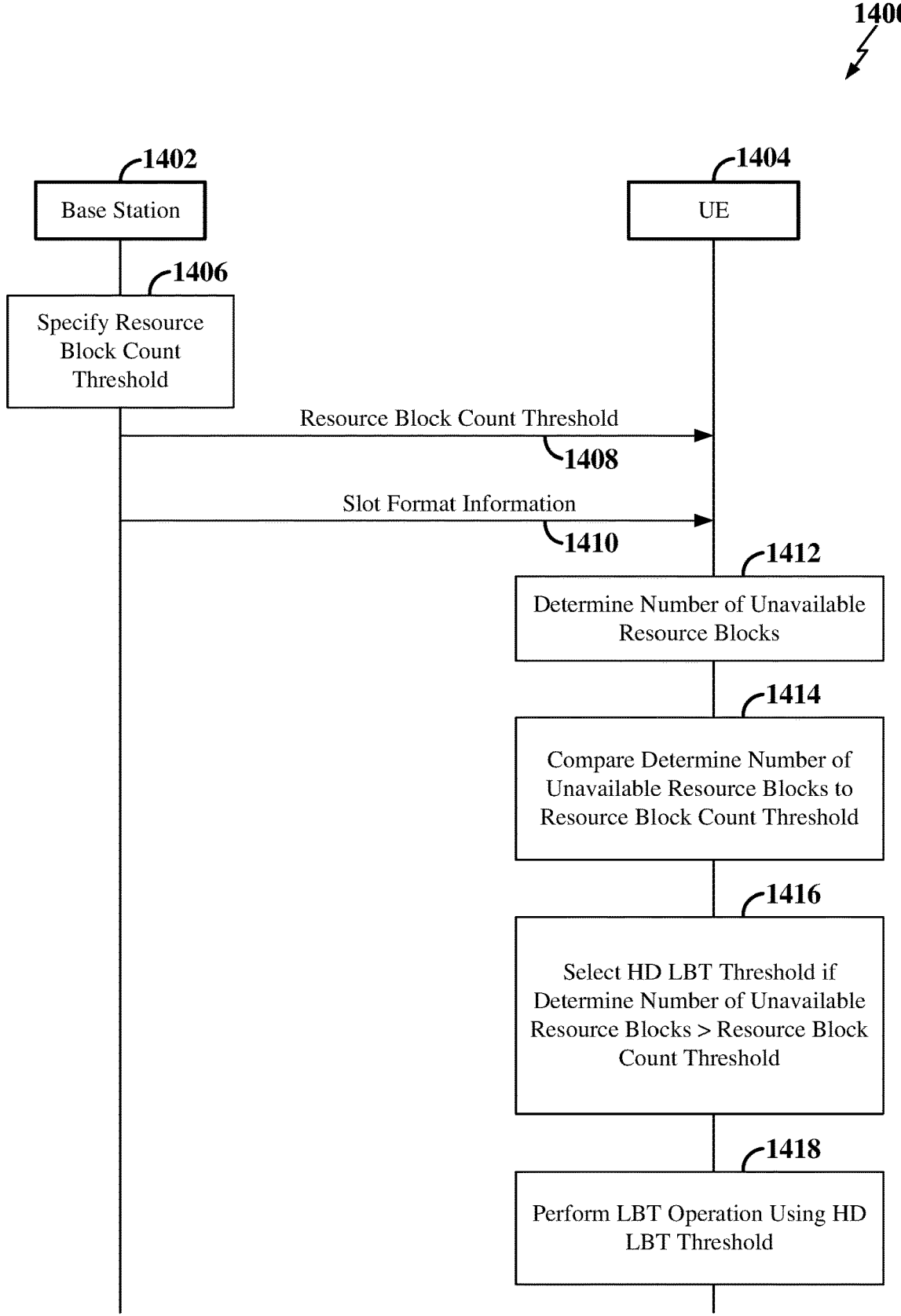
FIG. 14 is a signaling diagram illustrating another example of signaling associated with LBT threshold selection according to some aspects.

FIG. 14 is a signaling diagram 1400 illustrating an example of LBT-related signaling in a wireless communication system including a base station (BS) 1402 and a UE 1404. In some examples, the BS 1402 may correspond to any of the base stations or scheduling entities shown in any of FIGS. 1, 2, 4, 7, 11, 12, 13, and 21. In some examples, the UE 1404 may correspond to any of the UEs or scheduled entities shown in any of FIGS. 1, 2, 4, 7, 11, 12, 13, and 15.

At block 1406 of FIG. 14, the BS 1402 specifies a resource block count threshold for an FD mode of operation.

At block 1408, the BS 1402 transmits the resource block count threshold to the UE 1404. For example, the BS 1402 may transmit the resource block count threshold in a radio resource control (RRC) message or another type of message. In another example, the resource block count threshold may already be stored on the UE 1404 (e.g., the resource block count threshold may be preloaded onto the UE 1404 and/or defined by a communication standard).

At block 1410, the BS 1402 transmits slot format information to the UE 1404. In some examples, the slot format information may specify the slot format(s) for scheduled transmissions and/or receptions by the UE 1404. In some examples, the slot format information may specify a slot format index associated with at least one frequency domain allocation.

At block 1412, upon determining that the slot is an FD slot (e.g., based on the slot format information), the UE 1404 determines the number of unavailable resource blocks (e.g., the number of unavailable LBT RB sets) between an uplink resource allocation (e.g., an uplink LBT RB set) and the downlink resource allocation (e.g., a downlink LBT RB set) for a slot of interest.

At block 1414, the UE 1404 compares the number of unavailable resource blocks determined at step 1412 to the resource block count threshold received at block 1408.

At block 1416, the UE 1404 selects an HD LBT threshold for an LBT channel access operation for the slot if the determined number of unavailable resource blocks is greater than the resource block count threshold. Here, a higher level LBT threshold may be desirable when there is sufficient separation between the uplink frequency band and downlink frequency band.

At block 1418, the UE 1404 performs the LBT operation for the slot using the HD LBT threshold selected at block 1416.

Figure 15:
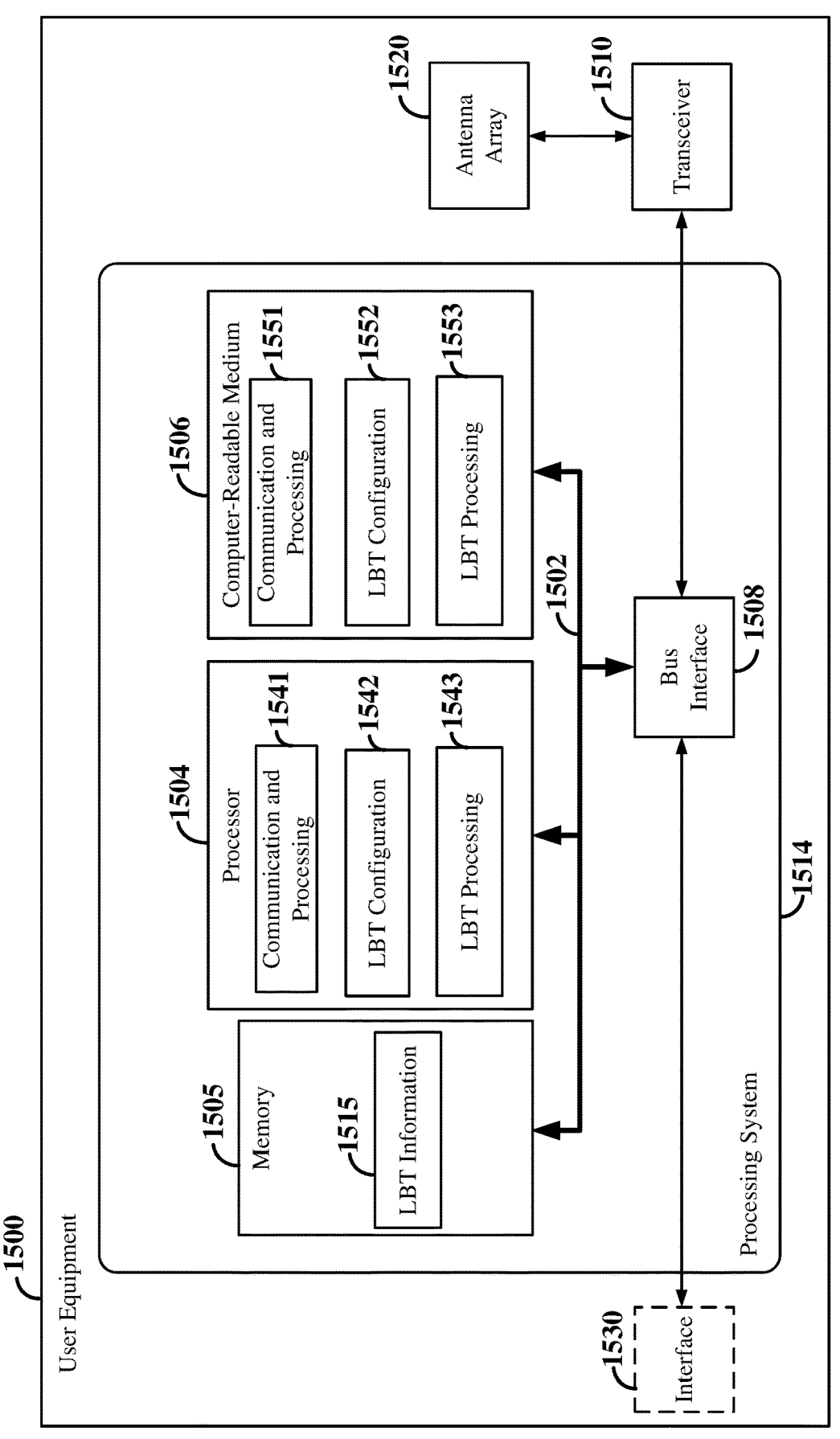
FIG. 15 is a block diagram illustrating an example of a hardware implementation for a user equipment employing a processing system according to some aspects.

FIG. 15 is a block diagram illustrating an example of a hardware implementation for a UE 1500 employing a processing system 1514. For example, the UE 1500 may be a device configured to wirelessly communicate with a base station, as discussed in any one or more of FIGS. 1-14. In some implementations, the UE 1500 may correspond to any of the UEs or scheduled entities shown in any of FIGS. 1, 2, 4, 7, 11, 12, 13, and 14.

In accordance with various aspects of the disclosure, an element, or any portion of an element, or any combination of elements may be implemented with the processing system 1514. The processing system 1514 may include one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1500 may be configured to perform any one or more of the functions described herein. That is, the processor 1504, as utilized in a UE 1500, may be used to implement any one or more of the processes and procedures described herein.

The processor 1504 may in some instances be implemented via a baseband or modem chip and in other implementations, the processor 1504 may include a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510 and between the bus 1502 and an interface 1530. The transceiver 1510 provides a communication interface or means for communicating with various other apparatus over a wireless transmission medium. In some examples, the UE may include two or more transceivers 1510, each configured to communicate with a respective network type (e.g., terrestrial or non-terrestrial). The interface 1530 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1530 may include a user interface (e.g., keypad, display, speaker, microphone, joystick). Of course, such a user interface is optional, and may be omitted in some examples, such as an IoT device.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1500 may be configured to perform any one or more of the operations described herein (e.g., as described above in conjunction with FIGS. 1 to 14 and as described below in conjunction with FIGS. 16 to 20). In some aspects of the disclosure, the processor 1504, as utilized in the UE 1500, may include circuitry configured for various functions.

The processor 1504 may include communication and processing circuitry 1541. The communication and processing circuitry 1541 may be configured to communicate with a base station, such as a gNB. The communication and processing circuitry 1541 may include one or more hardware components that provide the physical structure that performs various processes related to wireless communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. In some examples, the communication and processing circuitry 1541 may include two or more transmit/receive chains, each configured to process signals in a different RAT (or RAN) type. The communication and processing circuitry 1541 may further be configured to execute communication and processing software 1551 included on the computer-readable medium 1506 to implement one or more functions described herein.

In some examples, the communication and processing circuitry 1541 may be configured to receive and process downlink beamformed signals at a mm Wave frequency or a sub-6 GHz frequency via the transceiver 1510 and an antenna array 1520. For example, the communication and processing circuitry 1541 may be configured to receive a respective reference signal (e.g., SSB or CSI-RS) on each of a plurality of downlink beams from the base station during a downlink beam sweep via at least one first antenna panel of the antenna array 1520. The communication and processing circuitry 1541 may further be configured to transmit a beam measurement report to the base station.

In some examples, the communication and processing circuitry 1541 may further be configured to generate and transmit uplink beamformed signals at a mmWave frequency or a sub-6 GHz frequency via the transceiver 1510 and the antenna array 1520. For example, the communication and processing circuitry 1541 may be configured to transmit a respective reference signal (e.g., SRS or DMRS) on each of a plurality of uplink beams to the base station during an uplink beam sweep via at least one second antenna panel of the antenna array 1520.

The communication and processing circuitry 1541 may further be configured to generate and transmit a request to the base station. For example, the request may be included in a MAC-CE carried in a PUSCH, UCI in a PUCCH or PUSCH, a random access message, or an RRC message. The communication and processing circuitry 1541 may further be configured to generate and transmit a scheduling request (e.g., via UCI in a PUCCH) to the base station to receive an uplink grant for the PUSCH carrying the MAC-CE including the request for uplink beam refinement.

The communication and processing circuitry 1541 may further be configured to generate and transmit an uplink signal on one or more uplink transmit beams applied to the uplink signal. The uplink signal may include, for example, a PUCCH, PUSCH, SRS, DMRS, or PRACH.

The communication and processing circuitry 1541 may further be configured to control the antenna array 1520 and the transceiver 1510 to search for and identify a plurality of downlink transmit beams during a downlink beam sweep. The communication and processing circuitry 1541 may further be configured to obtain a plurality of beam measurements on each of a plurality of downlink receive beams via the antenna array 1520 for each of the identified downlink transmit beams. The communication and processing circuitry 1541 may further be configured to generate a beam measurement report for transmission to the base station using the communication and processing circuitry 1541.

The communication and processing circuitry 1541 may further be configured to identify one or more selected uplink beam(s) based on the beam measurements obtained from the downlink beam reference signals. In some examples, the communication and processing circuitry 1541 may be configured to compare the respective RSRP (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 1541 may be configured to generate one or more uplink transmit beams for transmission in an uplink beam sweep. Each uplink transmit beam may carry an uplink reference signal (e.g., an SRS) for measurement by the base station. The communication and processing circuitry 1541 may further be configured to identify the selected uplink transmit beam(s) selected by the base station based on the uplink beam measurements. For example, the communication and processing circuitry 1541 may be configured to receive an indication of the selected uplink transmit beam(s) from the base station.

In some implementations where the communication involves receiving information, the communication and processing circuitry 1541 may obtain information from a component of the UE 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may include functionality for a means for receiving. In some examples, the communication and processing circuitry 1541 may include functionality for a means for decoding.

In some implementations where the communication involves sending (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via radio frequency signaling or some other type of signaling suitable for the applicable communication medium). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may include functionality for a means for sending (e.g., a means for transmitting). In some examples, the communication and processing circuitry 1541 may include functionality for a means for encoding.

The processor 1504 may include LBT configuration circuitry 1542 configured to perform LBT configuration-related operations as discussed herein (e.g., one or more of the operations described in conjunction with FIG. 11). In some examples, the LBT configuration circuitry 1542 may include functionality for a means for selecting. In some examples, the LBT configuration circuitry 1542 may include functionality for a means for measuring. In some examples, the LBT configuration circuitry 1542 may include functionality for a means for determining a number of times. In some examples, the LBT configuration circuitry 1542 may include functionality for a means for identifying. The LBT configuration circuitry 1542 may further be configured to execute LBT configuration software 1552 included on the computer-readable medium 1506 to implement one or more functions described herein.

The processor 1504 may include LBT processing circuitry 1543 configured to perform LBT processing-related operations as discussed herein (e.g., one or more of the operations described in conjunction with FIG. 11). In some examples, the LBT processing circuitry 1543 may include functionality for a means for detecting. In some examples, the LBT processing circuitry 1543 may include functionality for a means for determining. In some examples, the LBT processing circuitry 1543 may include functionality for a means for transmitting. The LBT processing circuitry 1543 may further be configured to execute LBT processing software 1553 included on the computer-readable medium 1506 to implement one or more functions described herein.

Figure 16:
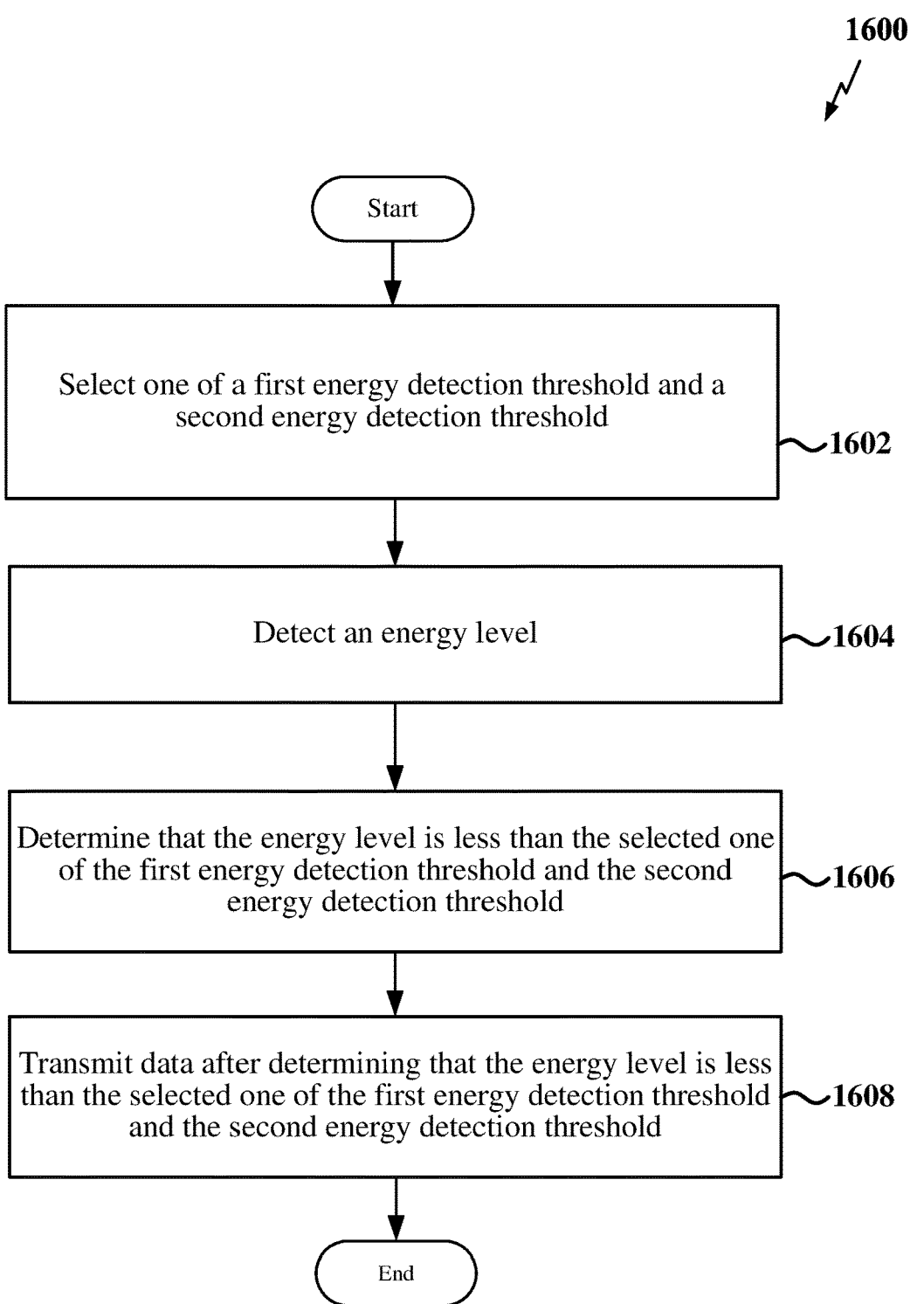
FIG. 16 is a flow chart of an example process for selecting an energy detection threshold according to some aspects.

FIG. 16 is a flow chart illustrating an example process 1600 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the UE 1500 illustrated in FIG. 15. In some examples, the process 1600 may be carried out by any suitable apparatus or means for carrying out the functions or algorithm described below.

At block 1602, a UE may select one of a first energy detection threshold and a second energy detection threshold. In some examples, the first energy detection threshold may be for a first duplex mode of operation and the second energy detection threshold may be for a second duplex mode of operation. For example, the LBT configuration circuitry 1542 together with the communication and processing circuitry 1541 and the transceiver 1510, shown and described above in connection with FIG. 15, may perform this operation.

In some examples, the first duplex mode of operation is a half-duplex mode of operation, and the second duplex mode of operation is a full-duplex mode of operation. In some examples, the first energy detection threshold is a first listen-before-talk (LBT) threshold for the half-duplex mode of operation, and the second energy detection threshold is a first LBT threshold for the full-duplex mode of operation.

In some examples, the first energy detection threshold is greater than the second energy detection threshold. In some examples, the second energy detection threshold is based on a transmit power for a time slot (e.g., based on Equation 1 or 2).

In some examples, the first energy detection threshold and the second energy detection threshold are specified by a communication standard. In some examples, the process 1600 may further include receiving the first energy detection threshold and the second energy detection threshold from a base station. For example, the UE may receive the first energy detection threshold and the second energy detection threshold in an RRC message or another type of message transmitted from the base station.

At block 1604, the UE may detect an energy level. In some examples, the energy level may be detected during a time slot. In some examples, the time slot is scheduled for the second duplex mode of operation (e.g., full-duplex mode of operation). In some examples, the time slot may have a length of 14 symbols (i.e., a duration approximately equal to 14 times the duration of one symbol). However, it is to be appreciated that the time slot is not limited to these examples. For example, the LBT processing circuitry 1543 together with the communication and processing circuitry 1541 and the transceiver 1510, shown and described above in connection with FIG. 15, may perform this operation.

At block 1606, the UE may determine that the energy level is less than the selected one of the first energy detection threshold and the second energy detection threshold. For example, the LBT processing circuitry 1543 together with the communication and processing circuitry 1541 and the transceiver 1510, shown and described above in connection with FIG. 15, may perform this operation.

At block 1608, the UE may transmit data after determining the energy level is less than the selected one of the first energy detection threshold and the second energy detection threshold. The UE may transmit the data during the time slot. In some examples, the UE may transmit the data within 25 microseconds or less from a time that the energy level is detected. In some examples, the UE may transmit the data within 16 microseconds or less from a time that the energy level is detected. In these examples, it may be desirable to transmit the data soon after the energy level is detected to reduce the probability that the channel becomes occupied between the time the energy level is detected and the transmission of the data. However, it is to be appreciated that the present disclosure is not limited to these examples. For example, the LBT processing circuitry 1543 together with the communication and processing circuitry 1541 and the transceiver 1510, shown and described above in connection with FIG. 15, may perform this operation.

In some examples, the second duplex mode of operation is a full-duplex mode of operation, and the second energy detection threshold is one of a plurality of energy detection thresholds defined for the full-duplex mode of operation. In some examples, different energy detection thresholds of the plurality of energy detection thresholds are designated for different frequency domain allocations.

In some examples, the process 1600 may further include determining a frequency gap between an uplink bandwidth allocation for a time slot and a downlink bandwidth allocation for the time slot, and determining the frequency gap is greater than a frequency gap threshold, wherein the selecting one of the first energy detection threshold and the second energy detection threshold may include selecting the first energy detection threshold after determining the frequency gap is greater than the frequency gap threshold. The time slot may be the exemplary time slot discussed above in connection with block 1604.

In some examples, the process 1600 may further include determining a number of times the user equipment failed to gain access to a channel using the second energy detection threshold, and determining the number of times is equal to or greater than a count threshold, wherein the selecting one of the first energy detection threshold and the second energy detection threshold may include selecting the first energy detection threshold after determining the number of times is equal to or greater than the count threshold.

In some examples, the process 1600 may further include identifying at least one resource block set that is not available for a transmission by the user equipment during a time slot, wherein the at least one resource block set is between a first resource block set allocated for an uplink transmission by the user equipment during the time slot and a second resource block set allocated for a downlink reception by the user equipment during the time slot, and wherein the selecting one of the first energy detection threshold and the second energy detection threshold may include selecting the first energy detection threshold after identifying the at least one resource block set (e.g., RB set 2 in FIG. 10). The time slot may be the exemplary time slot discussed above in connection with block 1604.

Figure 17:
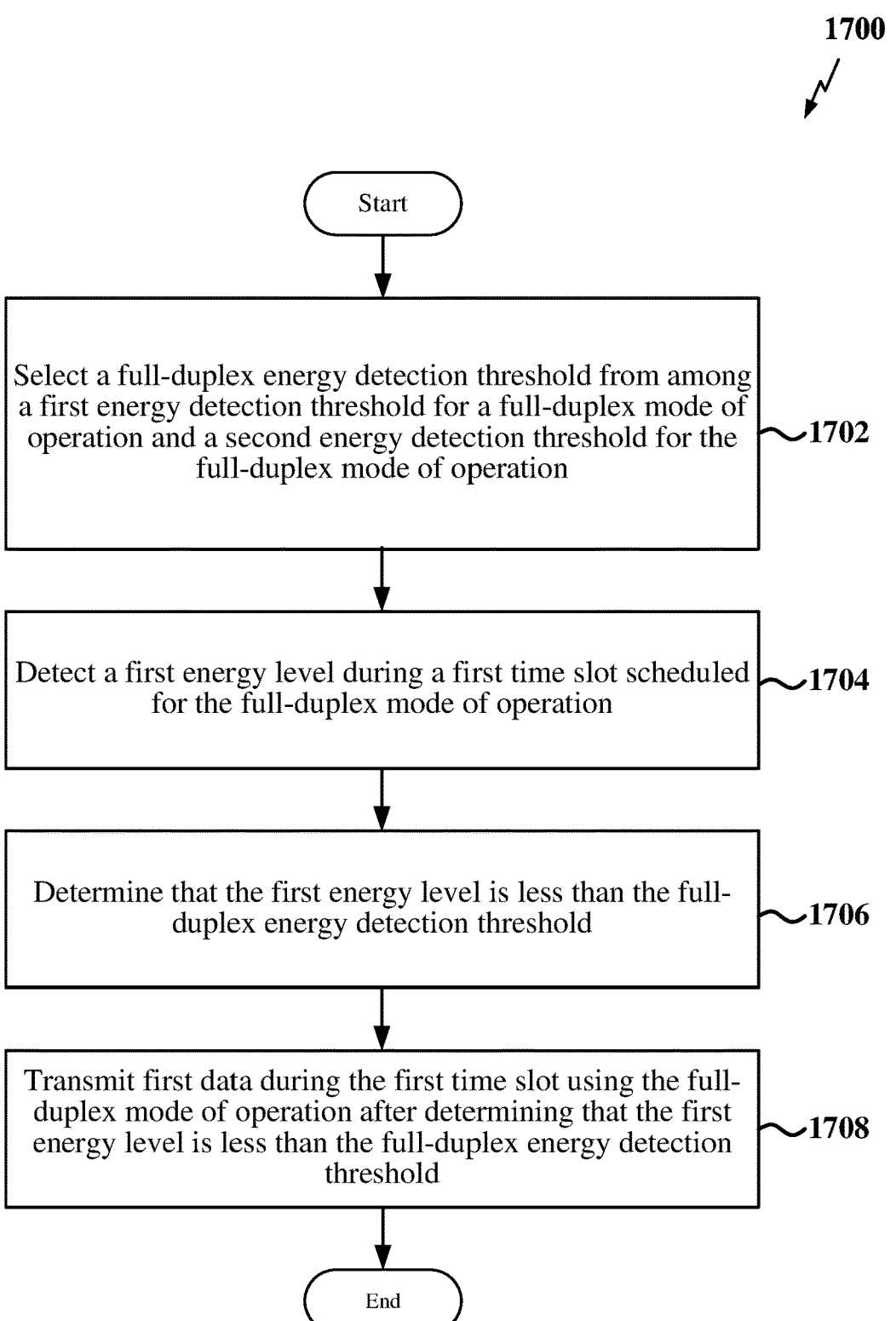
FIG. 17 is a flow chart of an example process for selecting a full-duplex energy detection threshold according to some aspects.

FIG. 17 is a flow chart illustrating an example process 1700 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the UE 1500 illustrated in FIG. 15. In some examples, the process 1700 may be carried out by any suitable apparatus or means for carrying out the functions or algorithm described below.

At block 1702, a UE may select a full-duplex energy detection threshold from among a first energy detection threshold for a full-duplex mode of operation and a second energy detection threshold for the full-duplex mode of operation. For example, the LBT configuration circuitry 1542 together with the communication and processing circuitry 1541 and the transceiver 1510, shown and described above in connection with FIG. 15, may perform this operation.

In some examples, the first energy detection threshold is a first listen-before-talk (LBT) threshold, and the second energy detection threshold is a second LBT threshold that is different from the first LBT threshold.

In some examples, the first energy detection threshold is designated for at least one first frequency domain allocation, and the second energy detection threshold is designated for at least one second frequency domain allocation.

In some examples, the first energy detection threshold and the second energy detection threshold are specified by a communication standard. In some examples, the process may further include receiving the first energy detection threshold and the second energy detection threshold from a base station.

At block 1704, the UE may detect a first energy level during a first time slot scheduled for the full-duplex mode of operation. For example, the LBT processing circuitry 1543 together with the communication and processing circuitry 1541 and the transceiver 1510, shown and described above in connection with FIG. 15, may perform this operation.

At block 1706, the UE may determine that the first energy level is less than the full-duplex energy detection threshold. For example, the LBT processing circuitry 1543 together with the communication and processing circuitry 1541 and the transceiver 1510, shown and described above in connection with FIG. 15, may perform this operation.

At block 1708, the UE may transmit first data during the first time slot using the full-duplex mode of operation after determining that the first energy level is less than the full-duplex energy detection threshold. For example, the LBT processing circuitry 1543 together with the communication and processing circuitry 1541 and the transceiver 1510, shown and described above in connection with FIG. 15, may perform this operation.

In some examples, the process may further include identifying a frequency domain allocation designated for the first time slot, wherein the selecting the full-duplex energy detection threshold is based on the frequency domain allocation designated for the first time slot. In some examples, the frequency domain allocation for the first time slot is based on at least one of an uplink bandwidth allocation for the first time slot and a downlink bandwidth allocation for the first time slot, an overlap of the uplink bandwidth allocation for the first time slot and the downlink bandwidth allocation for the first time slot, a guard band configuration for the first time slot, or a combination thereof.

In some examples, the process may further include detecting a second energy level during a second time slot scheduled for a half-duplex mode of operation, determining that the second energy level is less than a half-duplex energy detection threshold for the half-duplex mode of operation, and transmitting second data during the second time slot using the half-duplex mode of operation after determining that the second energy level is less than the half-duplex energy detection threshold.

FIG. 18 is a flow chart illustrating an example process 1800 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the UE 1500 illustrated in FIG. 15. In some examples, the process 1800 may be carried out by any suitable apparatus or means for carrying out the functions or algorithm described below.

At block 1802, a UE may determine a frequency gap between an uplink bandwidth allocation for a first time slot designated for a first duplex mode of operation (e.g., FD mode) and a downlink bandwidth allocation for the first time slot. For example, the LBT configuration circuitry 1542 together with the communication and processing circuitry 1541 and the transceiver 1510, shown and described above in connection with FIG. 15, may perform this operation.

At block 1804, the UE may determine that the frequency gap is equal to or greater than a frequency gap threshold (i.e., threshold frequency range). For example, the LBT configuration circuitry 1542 together with the communication and processing circuitry 1541 and the transceiver 1510, shown and described above in connection with FIG. 15, may perform this operation. In some examples, the frequency gap threshold is specified by a communication standard. In some examples, the process may further include receiving an indication of the frequency gap threshold from a base station.

At block 1806, the UE may detect a first energy level during the first time slot. For example, the LBT processing circuitry 1543 together with the communication and processing circuitry 1541 and the transceiver 1510, shown and described above in connection with FIG. 15, may perform this operation.

At block 1808, the UE may determine that the first energy level is less than a first energy detection threshold for a second duplex mode of operation after determining that the frequency gap is greater than the frequency gap threshold. For example, the first energy detection threshold may be a HD LBT threshold. For example, the LBT processing circuitry 1543 together with the communication and processing circuitry 1541 and the transceiver 1510, shown and described above in connection with FIG. 15, may perform this operation.

In some examples, the first duplex mode of operation is a full-duplex mode of operation, and the second duplex mode of operation is a half-duplex mode of operation. In some examples, the first energy detection threshold is a listen-before-talk (LBT) threshold.

At block 1810, first data is transmitted after determining that the first energy level is less than the first energy detection threshold. For example, the LBT processing circuitry 1543 together with the communication and processing circuitry 1541 and the transceiver 1510, shown and described above in connection with FIG. 15, may perform this operation.

In some examples, the process may further include detecting a second energy level during a second time slot scheduled for a full-duplex mode of operation, determining that the second energy level is less than a second energy detection threshold for the full-duplex mode of operation, and transmitting second data during the second time slot using the full-duplex mode of operation after determining that the second energy level is less than the second energy detection threshold.

In some examples, the second energy detection threshold is one of a plurality of energy detection thresholds defined for the full-duplex mode of operation. In some examples, different energy detection thresholds of the plurality of energy detection thresholds are designated for different frequency domain allocations.

FIG. 19 is a flow chart illustrating an example process 1900 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1900 may be carried out by the UE 1500 illustrated in FIG. 15. In some examples, the process 1900 may be carried out by any suitable apparatus or means for carrying out the functions or algorithm described below.

At block 1902, a UE may determine a number of times the user equipment failed to gain access to a channel designated for a first duplex mode of operation using a first energy detection threshold for the first duplex mode of operation. For example, the LBT configuration circuitry 1542 together with the communication and processing circuitry 1541 and the transceiver 1510, shown and described above in connection with FIG. 15, may perform this operation.

At block 1904, the UE may determine that the number of times is greater than a count threshold (i.e., threshold quantity). For example, the LBT configuration circuitry 1542 together with the communication and processing circuitry 1541 and the transceiver 1510, shown and described above in connection with FIG. 15, may perform this operation.

In some examples, the count threshold is specified by a communication standard. In some examples, the process may further include receiving an indication of the count threshold from a base station.

At block 1906, the UE may detect an energy level. For example, the LBT processing circuitry 1543 together with the communication and processing circuitry 1541 and the transceiver 1510, shown and described above in connection with FIG. 15, may perform this operation.

At block 1908, the UE determines that the energy level is less than a second energy detection threshold for a second duplex mode of operation after determining that the number of times is equal to or greater than the count threshold. For example, the LBT processing circuitry 1543 together with the communication and processing circuitry 1541 and the transceiver 1510, shown and described above in connection with FIG. 15, may perform this operation.

At block 1910, the UE transmits data after determining that the energy level is less than the second energy detection threshold. For example, the LBT processing circuitry 1543 together with the communication and processing circuitry 1541 and the transceiver 1510, shown and described above in connection with FIG. 15, may perform this operation.

In some examples, the first duplex mode of operation is a full-duplex mode of operation, and the second duplex mode of operation is a half-duplex mode of operation. In some examples, the first energy detection threshold is different from the second energy detection threshold. In some examples, the first energy detection threshold is a first listen-before-talk (LBT) threshold for the full-duplex mode of operation, and the second energy detection threshold is a first LBT threshold for the half-duplex mode of operation.

In some examples, the first duplex mode of operation is a full-duplex mode of operation, and the first energy detection threshold is one of a plurality of energy detection thresholds defined for the full-duplex mode of operation. In some examples, different energy detection thresholds of the plurality of energy detection thresholds are designated for different frequency domain allocations.

FIG. 20 is a flow chart illustrating an example process 2000 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 2000 may be carried out by the UE 1500 illustrated in FIG. 15. In some examples, the process 2000 may be carried out by any suitable apparatus or means for carrying out the functions or algorithm described below.

At block 2002, a UE may identify at least one resource block set that is not available for a transmission by the user equipment during a time slot designated for a first duplex mode of operation, wherein the at least one resource block set is between a first resource block set allocated for an uplink transmission by the user equipment during the time slot and a second resource block set allocated for a downlink reception by the user equipment during the time slot. For example, the LBT configuration circuitry 1542 together with the communication and processing circuitry 1541 and the transceiver 1510, shown and described above in connection with FIG. 15, may perform this operation.

In some examples, identifying at least one resource block set may include receiving an indication from a base station that the at least one resource block set (e.g., RB set 2 in FIG. 10) is not available for the transmission by the user equipment during the first time slot.

At block 2004, the UE may detect an energy level. For example, the LBT configuration circuitry 1542 together with the communication and processing circuitry 1541 and the transceiver 1510, shown and described above in connection with FIG. 15, may perform this operation.

At block 2006, the UE determines that the energy level is less than a first energy detection threshold for a second duplex mode of operation after identifying the at least one resource block set. For example, the LBT configuration circuitry 1542 together with the communication and processing circuitry 1541 and the transceiver 1510, shown and described above in connection with FIG. 15, may perform this operation.

At block 2008, the UE transmit data after determining that the energy level is less than the first energy detection threshold. For example, the LBT configuration circuitry 1542 together with the communication and processing circuitry 1541 and the transceiver 1510, shown and described above in connection with FIG. 15, may perform this operation.

In some examples, the first duplex mode of operation is a full-duplex mode of operation, and the second duplex mode of operation is a half-duplex mode of operation. In some examples, the first energy detection threshold is a first listen-before-talk (LBT) threshold for the half-duplex mode of operation.

In some examples, the first energy detection threshold is different from a second energy detection threshold for the second duplex mode of operation. In some examples, the first duplex mode of operation is a full-duplex mode of operation, and the second energy detection threshold is one of a plurality of energy detection thresholds defined for the full-duplex mode of operation. In some examples, different energy detection thresholds of the plurality of energy detection thresholds are designated for different frequency domain allocations.

Figure 21:
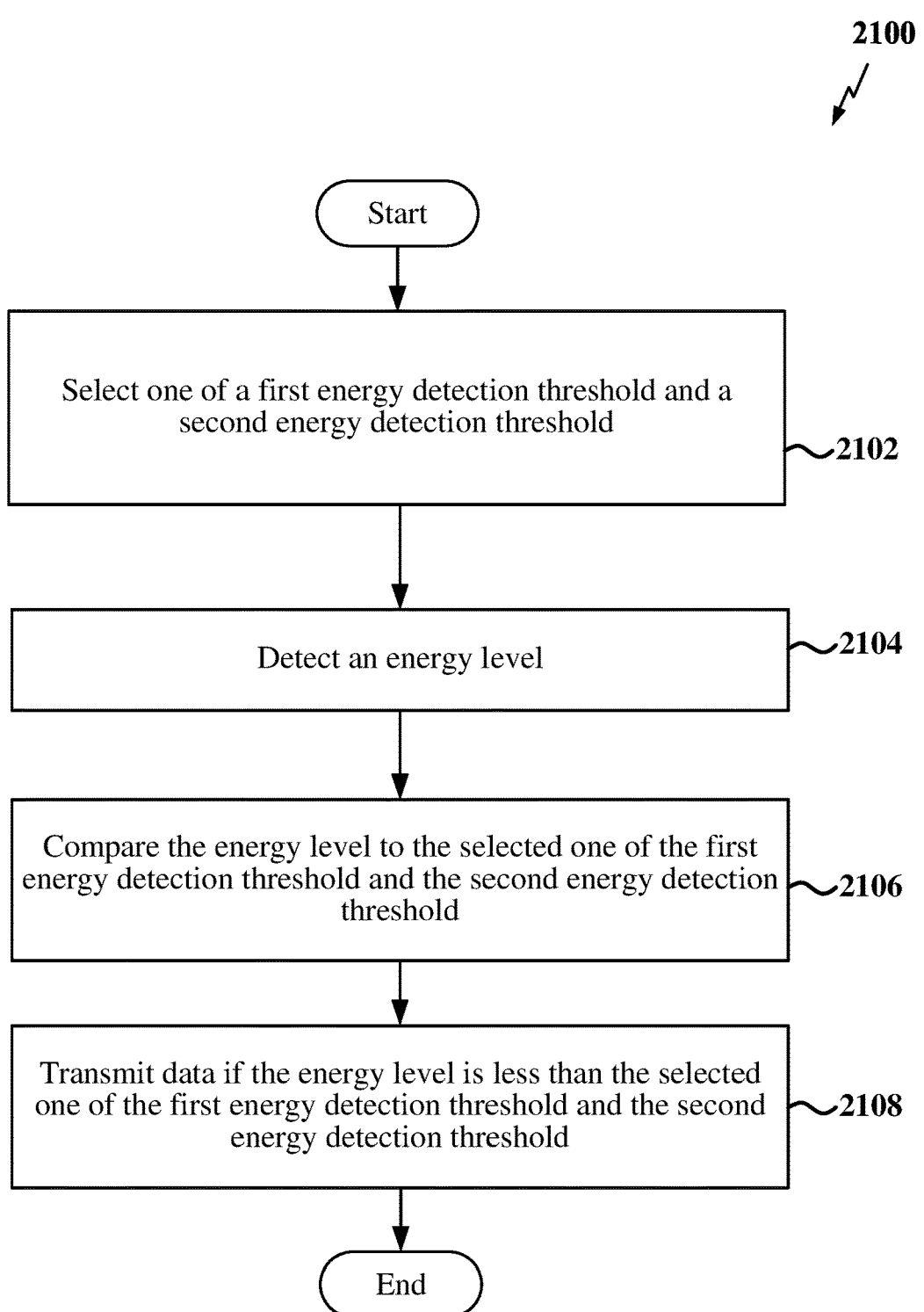
FIG. 21 is a flow chart of an example process for selecting an energy detection threshold according to some aspects.

In some examples, a process for wireless communication at a user equipment may include determining a number of resource blocks that are not available for a transmission by the user equipment during a time slot designated for a first duplex mode of operation (e.g., FD mode) wherein the resource blocks are between a first resource block set allocated for an uplink transmission by the user equipment during the time slot and a second resource block allocated for a downlink reception by the user equipment during the time slot. For example, the LBT configuration circuitry 1542 together with the communication and processing circuitry 1541 and the transceiver 1510, shown and described above in connection with FIG. 15, may perform this operation. The process may also include determining the number of resource blocks is greater than a threshold quantity. The threshold quantity (i.e., resource block count threshold) may be a number of resource blocks (e.g., a number of resource blocks providing a sufficient frequency gap to use a half-duplex energy detection threshold). For example, the LBT configuration circuitry 1542 together with the communication and processing circuitry 1541 and the transceiver 1510, shown and described above in connection with FIG. 15, may perform this operation. The process may further include detecting an energy level, determining that the energy level is less than an energy detection threshold for a second duplex mode of operation after determining the number of resource blocks is greater than a threshold quantity, and transmitting data after determining that the energy level is less than the energy detection threshold. For example, the LBT configuration circuitry 1542 together with the communication and processing circuitry 1541 and the transceiver 1510, shown and described above in connection with FIG. 15, may perform these operations. In some examples, the first duplex mode of operation is a full-duplex mode of operation, and the second duplex mode of operation is a half-duplex mode of operation FIG. 21 is a flow chart illustrating an example process 2100 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 2100 may be carried out by the UE 1500 illustrated in FIG. 15. In some examples, the process 2100 may be carried out by any suitable apparatus or means for carrying out the functions or algorithm described below.

At block 2102, a UE may select one of a first energy detection threshold and a second energy detection threshold. In some examples, the first energy detection threshold may be for a first duplex mode of operation and the second energy detection threshold may be for a second duplex mode of operation. For example, the LBT configuration circuitry 1542 together with the communication and processing circuitry 1541 and the transceiver 1510, shown and described above in connection with FIG. 15, may perform this operation.

In some examples, the first duplex mode of operation is a half-duplex mode of operation, and the second duplex mode of operation is a full-duplex mode of operation. In some examples, the first energy detection threshold is a first listen-before-talk (LBT) threshold for the half-duplex mode of operation, and the second energy detection threshold is a first LBT threshold for the full-duplex mode of operation.

In some examples, the first energy detection threshold is greater than the second energy detection threshold. In some examples, the second energy detection threshold is based on a transmit power for the time slot.

In some examples, the first energy detection threshold and the second energy detection threshold are specified by a communication standard. In some examples, the process 2100 may further include receiving the first energy detection threshold and the second energy detection threshold from a base station. For example, the UE may receive the first energy detection threshold and the second energy detection threshold in an RRC message or another type of message transmitted from the base station.

At block 2104, the UE may detect an energy level. In some examples, the UE may detect the energy during a time slot. In some examples, the time slot is scheduled for the second duplex mode of operation (e.g., full-duplex mode of operation). For example, the LBT processing circuitry 1543 together with the communication and processing circuitry 1541 and the transceiver 1510, shown and described above in connection with FIG. 15, may perform this operation.

At block 2106, the UE may compare the energy level to the selected one of the first energy detection threshold and the second energy detection threshold. For example, if the UE selects the first energy detection threshold at block 2102, then the UE compares the energy level to the first energy detection threshold. If the UE selects the second energy detection threshold at block 2102, then the UE compares the energy level to the second energy detection threshold. For example, the LBT processing circuitry 1543 together with the communication and processing circuitry 1541 and the transceiver 1510, shown and described above in connection with FIG. 15, may perform this operation.

At block 2108, the UE may transmit data if the energy level is less than the selected one of the first energy detection threshold and the second energy detection threshold based on the comparison. In some examples, the UE may transmit the data during the time slot. In some examples, the UE may transmit the data within 25 microseconds or less from a time that the energy level is detected. In some examples, the UE may transmit the data within 16 microseconds or less from a time that the energy level is detected. However, it is to be appreciated that the present disclosure is not limited to these examples. For example, the LBT processing circuitry 1543 together with the communication and processing circuitry 1541 and the transceiver 1510, shown and described above in connection with FIG. 15, may perform this operation.

In some examples, the second duplex mode of operation is a full-duplex mode of operation, and the second energy detection threshold is one of a plurality of energy detection thresholds defined for the full-duplex mode of operation. In some examples, different energy detection thresholds of the plurality of energy detection thresholds are designated for different frequency domain allocations.

In some examples, the process 2100 may further include backing off transmission of the data during the time slot if the energy level is above the selected one of the first energy detection threshold and the second energy detection threshold. For example, the user equipment may back off transmission of the data for a back-off time period (e.g., fixed size contention window or a variable size contention window), during which time the user equipment does not transmit the data.

In some examples, the process 2100 may further include determining a frequency gap between an uplink bandwidth allocation for the time slot and a downlink bandwidth allocation for the time slot, and comparing the frequency gap to a frequency gap threshold, wherein the selecting one of the first energy detection threshold and the second energy detection threshold may include selecting the first energy detection threshold if the frequency gap is greater than the frequency gap threshold. The process 2100 may also include selecting the second energy detection threshold if the frequency gap is less than the frequency gap threshold.

In some examples, the process 2100 may further include determining a number of times the user equipment failed to gain access to a channel using the second energy detection threshold, and comparing the number of times to a count threshold, wherein the selecting one of the first energy detection threshold and the second energy detection threshold may include selecting the first energy detection threshold if the number of times is equal to or greater than the count threshold. The process 2100 may also include selecting the second energy detection threshold if the number of times is less than the count threshold.

In some examples, the process 2100 may further include identifying at least one resource block set that is not available for a transmission by the user equipment during the time slot, wherein the at least one resource block is between a first resource block set allocated for an uplink transmission by the user equipment during the time slot and a second resource block set allocated for a downlink reception by the user equipment during the time slot, and wherein the selecting one of the first energy detection threshold and the second energy detection threshold may include selecting the first energy detection threshold after identifying the at least one resource block set.

Figure 22:
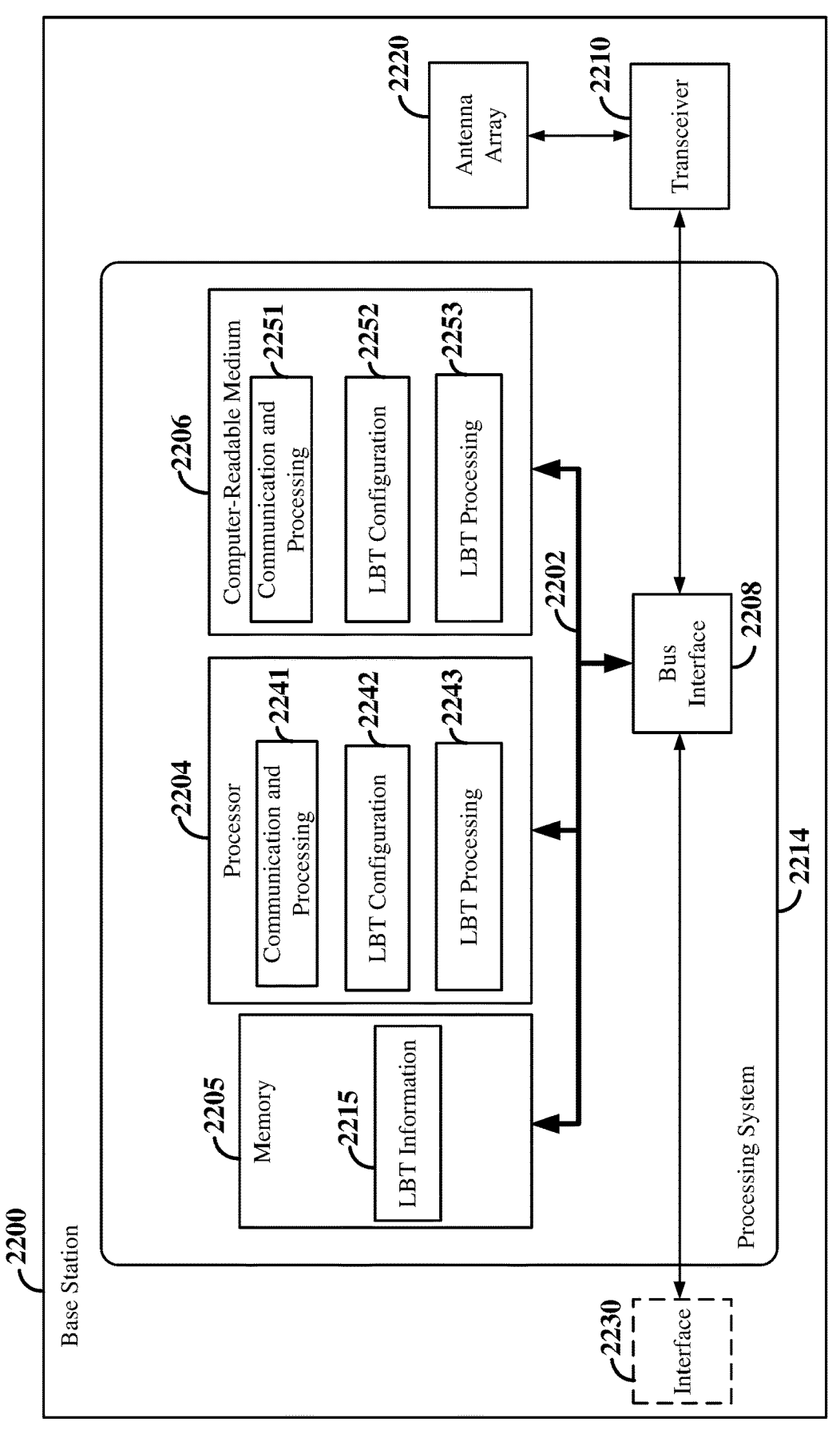
FIG. 22 is a block diagram illustrating an example of a hardware implementation for a base station employing a processing system according to some aspects.

FIG. 22 is a conceptual diagram illustrating an example of a hardware implementation for base station (BS) 2200 employing a processing system 2214. In some implementations, the BS 2200 may correspond to any of the BSs (e.g., gNBs,) or scheduling entities shown in any of FIGS. 1, 2, 4, 7, 11, 12, 13, and 14.

In accordance with various aspects of the disclosure, an element, or any portion of an element, or any combination of elements may be implemented with the processing system 2214. The processing system may include one or more processors 2204. The processing system 2214 may be substantially the same as the processing system 1514 illustrated in FIG. 15, including a bus interface 2208, a bus 2202, memory 2205, a processor 2204, and a computer-readable medium 2206. Furthermore, the BS 2200 may include an interface 2230 (e.g., a network interface) that provides a means for communicating with at least one other apparatus within a core network and with at least one radio access network.

The BS 2200 may be configured to perform any one or more of the operations described herein (e.g., as described above in conjunction with FIGS. 1-15 and as described below in conjunction with FIGS. 22-26). In some aspects of the disclosure, the processor 2204, as utilized in the BS 2200, may include circuitry configured for various functions.

The processor 2204 may be configured to generate, schedule, and modify a resource assignment or grant of time-frequency resources (e.g., a set of one or more resource elements). For example, the processor 2204 may schedule time-frequency resources within a plurality of time division duplex (TDD) and/or frequency division duplex (FDD) subframes, slots, and/or mini-slots to carry user data traffic and/or control information to and/or from multiple UEs.

The processor 2204 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources indicated in a request for uplink beam refinement received from a UE. The processor 2204 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 2204 may further be configured to schedule resources that may be utilized by the UE to transmit the request. For example, the uplink beam refinement request resources may include resources scheduled for transmission of a PUCCH, PUSCH, PRACH occasion or RRC message. In some examples, the processor 2204 may be configured to schedule PUSCH resources for the uplink beam refinement request in response to receiving a scheduling request from the UE.

The processor 2204 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

In some aspects of the disclosure, the processor 2204 may include communication and processing circuitry 2241. The communication and processing circuitry 2144 may be configured to communicate with a UE. The communication and processing circuitry 2241 may include one or more hardware components that provide the physical structure that performs various processes related to communication (e.g., signal reception and/or signal transmission) as described herein. The communication and processing circuitry 2241 may further include one or more hardware components that provide the physical structure that performs various processes related to signal processing (e.g., processing a received signal and/or processing a signal for transmission) as described herein. The communication and processing circuitry 2241 may further be configured to execute communication and processing software 2251 included on the computer-readable medium 2206 to implement one or more functions described herein.

In some examples, the communication and processing circuitry 2241 may be configured to receive and process uplink beamformed signals at a mmWave frequency or a sub-6 GHz frequency via the transceiver 2210 and an antenna array 2220. For example, the communication and processing circuitry 2241 may be configured to receive a respective reference signal (e.g., SRS or DMRS) on each of a plurality of uplink beams from the UE during an uplink beam sweep.

In some examples, the communication and processing circuitry 2241 may further be configured to generate and transmit downlink beamformed signals at a mmWave frequency or a sub-6 GHz frequency via the transceiver 2210 and the antenna array 2220. For example, the communication and processing circuitry 2241 may be configured to transmit a respective downlink reference signal (e.g., SSB or CSI-RS) on each of a plurality of downlink beams to the UE during a downlink beam sweep via at least one first antenna panel of the antenna array 2220. The communication and processing circuitry 2241 may further be configured to receive a beam measurement report from the UE.

The communication and processing circuitry 2241 may further be configured to receive a request from the UE. For example, the request may be included in a MAC-CE carried in a PUSCH, UCI in a PUCCH or PUSCH, a random access message, or an RRC message. The communication and processing circuitry 2241 may further be configured to receive a scheduling request (e.g., via UCI in a PUCCH) from the UE for an uplink grant for the PUSCH carrying the MAC-CE including the request for uplink beam refinement.

The communication and processing circuitry 2241 may further be configured to receive an uplink signal on one or more uplink receive beams via one or more uplink transmit beams applied to the uplink signal. For example, the communication and processing circuitry 2241 may be configured to receive the uplink signal on one or more uplink receive beams via at least one second antenna panel of the antenna array 2220. The uplink signal may include, for example, a PUCCH, PUSCH, SRS, DMRS, or PRACH.

The communication and processing circuitry 2241 may further be configured to control the antenna array 2220 and transceiver 2210 to generate a plurality of downlink transmit beams during a downlink beam sweep. The communication and processing circuitry 2241 may further be configured to receive a beam measurement report from the UE using the communication and processing circuitry 2144. The communication and processing circuitry 2241 may further be configured to identify one or more selected uplink beam(s) based on the beam measurements. In some examples, the communication and processing circuitry 2241 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 2241 may be configured to receive one or more uplink transmit beams in an uplink beam sweep. Each uplink transmit beam may carry an uplink reference signal (e.g., an SRS) for measurement by the communication and processing circuitry 2241. The communication and processing circuitry 2241 may further be configured to obtain a plurality of beam measurements on each of a plurality of uplink receive beams of the antenna array 2220 for each of the uplink transmit beams. The communication and processing circuitry 2241 may further be configured to select the selected uplink transmit beam(s) and corresponding uplink receive beams forming respective uplink BPLs based on the uplink beam measurements.

In some implementations wherein the communication involves receiving information, the communication and processing circuitry 2241 may obtain information from a component of the BS 2200 (e.g., from the transceiver 2210 that receives the information via radio frequency signaling or some other type of signaling suitable for the applicable communication medium), process (e.g., decode) the information, and output the processed information. For example, the communication and processing circuitry 2241 may output the information to another component of the processor 2204, to the memory 2205, or to the bus interface 2208. In some examples, the communication and processing circuitry 2241 may receive one or more of signals, messages, other information, or any combination thereof. In some examples, the communication and processing circuitry 2241 may receive information via one or more channels. In some examples, the communication and processing circuitry 2241 may include functionality for a means for receiving. In some examples, the communication and processing circuitry 2241 may include functionality for a means for decoding.

In some implementations wherein the communication involves sending (e.g., transmitting) information, the communication and processing circuitry 2241 may obtain information (e.g., from another component of the processor 2204, the memory 2205, or the bus interface 2208), process (e.g., encode) the information, and output the processed information. For example, the communication and processing circuitry 2241 may output the information to the transceiver 2210 (e.g., that transmits the information via radio frequency signaling or some other type of signaling suitable for the applicable communication medium). In some examples, the communication and processing circuitry 2241 may send one or more of signals, messages, other information, or any combination thereof. In some examples, the communication and processing circuitry 2241 may send information via one or more channels. In some examples, the communication and processing circuitry 2241 may include functionality for a means for sending (e.g., a means for transmitting). In some examples, the communication and processing circuitry 2241 may include functionality for a means for encoding.

The processor 2204 may include LBT configuration circuitry 2242 configured to perform LBT configuration-related operations as discussed herein (e.g., one or more of the operations described in conjunction with FIGS. 6-14). In some examples, the LBT configuration circuitry 2242 may include functionality for a means for specifying. The LBT configuration circuitry 2242 may further be configured to execute LBT configuration software 2252 included on the computer-readable medium 2206 to implement one or more functions described herein.

The processor 2204 may include LBT processing circuitry 2243 configured to perform LBT processing-related operations as discussed herein (e.g., one or more of the operations described in conjunction with FIGS. 6-14). In some examples, the LBT processing circuitry 2243 may include functionality for a means for transmitting. The LBT processing circuitry 2243 may further be configured to execute LBT processing software 2253 included on the computer-readable medium 2206 to implement one or more functions described herein.

Figure 23:
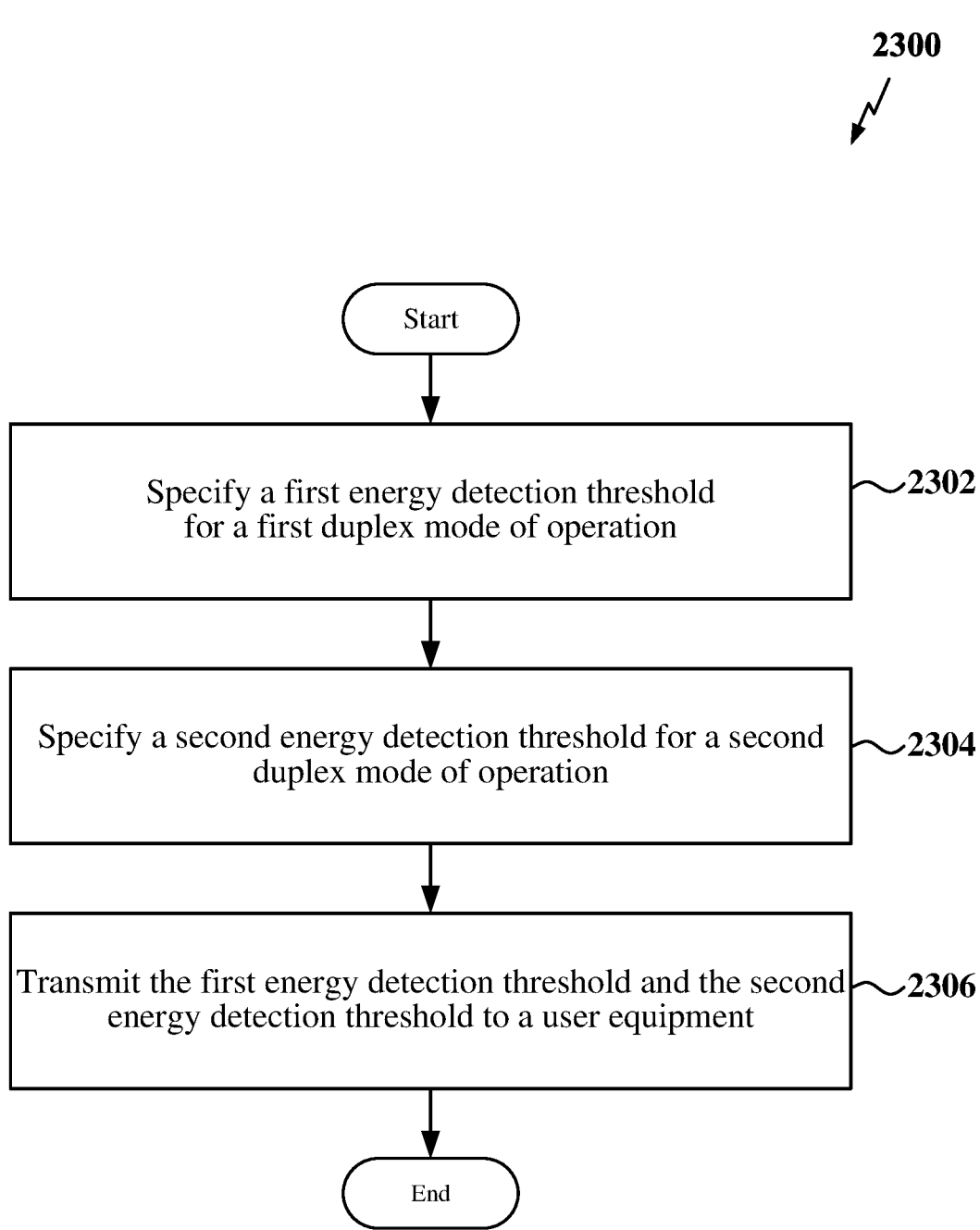
FIG. 23 is a flow chart of an example process for specifying LBT thresholds according to some aspects.

FIG. 23 is a flow chart illustrating an example process 2300 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 2300 may be carried out by the BS 2200 illustrated in FIG. 22. In some examples, the process 2300 may be carried out by any suitable apparatus or means for carrying out the functions or algorithm described below.

At block 2302, a BS may specify a first energy detection threshold for a first duplex mode of operation. For example, the LBT configuration circuitry 2242 together with the communication and processing circuitry 2241 and the transceiver 2210, shown and described above in connection with FIG. 22, may perform this operation.

At block 2304, the BS may specify a second energy detection threshold for a second duplex mode of operation. For example, the LBT configuration circuitry 2242 together with the communication and processing circuitry 2241 and the transceiver 2210, shown and described above in connection with FIG. 22, may perform this operation. For example, the LBT configuration circuitry 2242 together with the communication and processing circuitry 2241 and the transceiver 2210, shown and described above in connection with FIG. 22, may perform this operation.

At block 2306, the BS may transmit the first energy detection threshold and the second energy detection threshold to a user equipment. For example, the LBT processing circuitry 2243 together with the communication and processing circuitry 2241 and the transceiver 2210, shown and described above in connection with FIG. 22, may perform this operation.

In some examples, the first duplex mode of operation is a half-duplex mode of operation, and the second duplex mode of operation is a full-duplex mode of operation. In some examples, the first energy detection threshold is a first listen-before-talk (LBT) threshold for the half-duplex mode of operation, and the second energy detection threshold is a first LBT threshold for the full-duplex mode of operation. In some examples, the first energy detection threshold is a higher value than the second energy detection threshold.

In some examples, the process may further include calculating a transmit power for the user equipment for the second duplex mode of operation, wherein the specifying the second energy detection threshold is based on the transmit power. In some examples, the process may further include calculating a bandwidth for the user equipment for the second duplex mode of operation, wherein the specifying the second energy detection threshold is further based on the bandwidth.

In some examples, specifying the second energy detection threshold may include determining at least one of a quality of a channel used by the user equipment, a priority of traffic to be transmitted by the user equipment, a quality of service (QOS) of traffic to be transmitted by the user equipment, or a combination thereof, and determining the second energy detection threshold based on the at least one of the quality of the channel used by the user equipment, the priority of traffic to be transmitted by the user equipment, the quality of service (QOS) of traffic to be transmitted by the user equipment, or the combination thereof.

In some examples, the second duplex mode of operation is a full-duplex mode of operation, and the second energy detection threshold is one of a plurality of energy detection thresholds defined for the full-duplex mode of operation.

In some examples, the process may further include specifying a frequency gap threshold for the user equipment to determine whether to use the first energy detection threshold during a time slot designated for the second duplex mode of operation, and transmitting the frequency gap threshold to the user equipment.

In some examples, specifying a count threshold for the user equipment to determine whether to use the first energy detection threshold during a time slot designated for the second duplex mode of operation, and transmitting the count threshold to the user equipment.

In some examples, the process may further include specifying a resource block count threshold for the user equipment to determine whether to use the first energy detection threshold during a time slot designated for the second duplex mode of operation, and transmitting the resource block count threshold to the user equipment.

Figure 24:
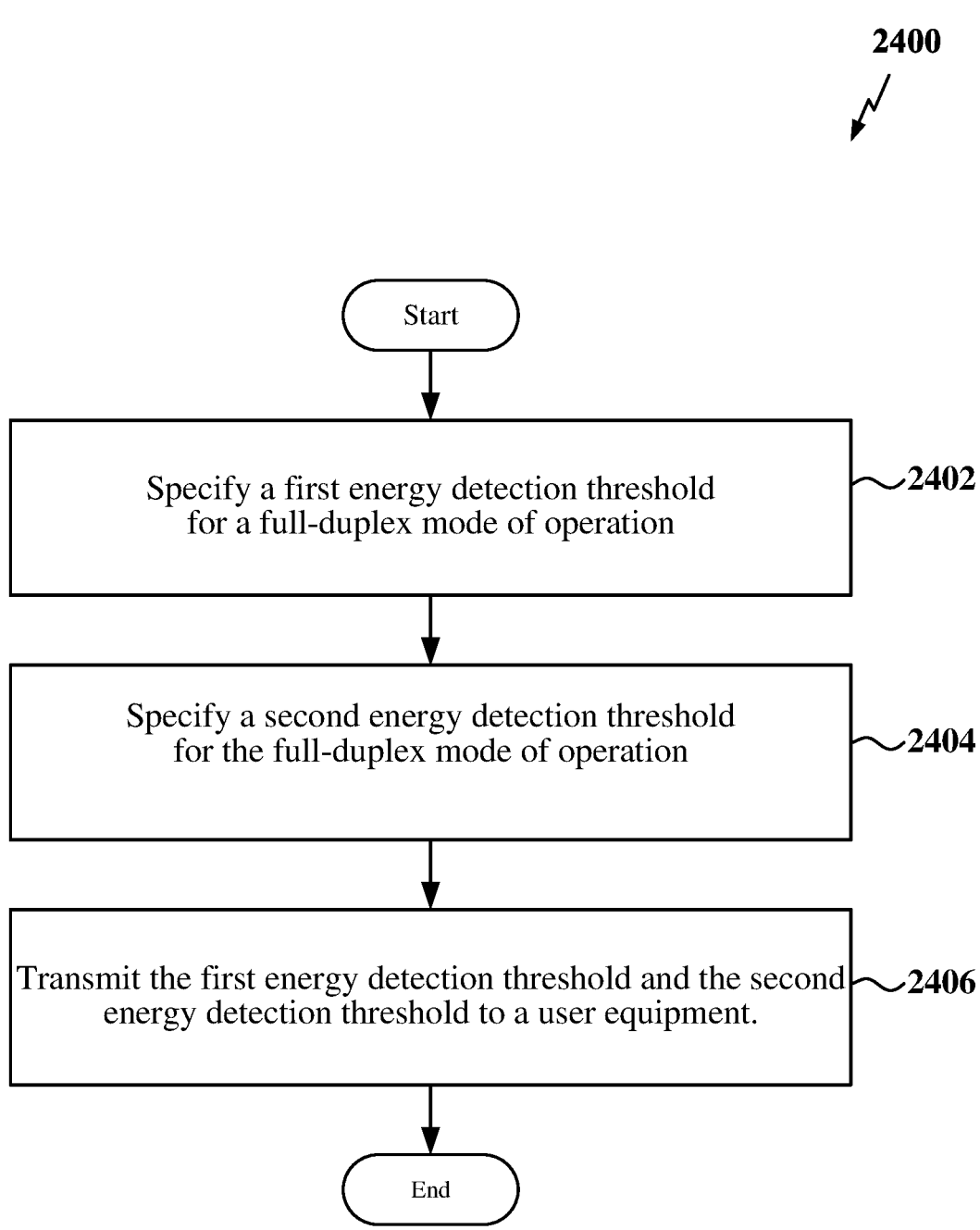
FIG. 24 is a flow chart of an example process for specifying full-duplex LBT thresholds according to some aspects.

FIG. 24 is a flow chart illustrating an example process 2400 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 2400 may be carried out by the BS 2200 illustrated in FIG. 22. In some examples, the process 2400 may be carried out by any suitable apparatus or means for carrying out the functions or algorithm described below.

At block 2402, a BS may specify a first energy detection threshold for a full-duplex mode of operation. For example, the LBT configuration circuitry 2242 together with the communication and processing circuitry 2241 and the transceiver 2210, shown and described above in connection with FIG. 22, may perform this operation.

At block 2404, the BS may specify a second energy detection threshold for the full-duplex mode of operation. For example, the LBT configuration circuitry 2242 together with the communication and processing circuitry 2241 and the transceiver 2210, shown and described above in connection with FIG. 22, may perform this operation.

In some examples, the first energy detection threshold is a first listen-before-talk (LBT) threshold, and the second energy detection threshold is a second LBT threshold that is different from the first LBT threshold.

At block 2406, the BS may transmit the first energy detection threshold and the second energy detection threshold to a user equipment. For example, the LBT processing circuitry 2243 together with the communication and processing circuitry 2241 and the transceiver 2210, shown and described above in connection with FIG. 22, may perform this operation.

In some examples, specifying the first energy detection threshold may include designating the first energy detection threshold for at least one first frequency domain allocation, and the specifying the second energy detection threshold may include designating the second energy detection threshold for at least one second frequency domain allocation.

In some examples, specifying the first energy detection threshold may include defining the first energy detection threshold based on at least one of an uplink bandwidth allocation for a time slot and a downlink bandwidth allocation for the time slot, an overlap of the uplink bandwidth allocation for the time slot and the downlink bandwidth allocation for the time slot, a guard band configuration for the time slot, or a combination thereof.

In some examples, the process may further include calculating at least one of a transmit power, a bandwidth, or a combination thereof for the user equipment for the full-duplex mode of operation, wherein the specifying the first energy detection threshold is based on the at least one of the transmit power, the bandwidth, or the combination thereof.

Figure 25:
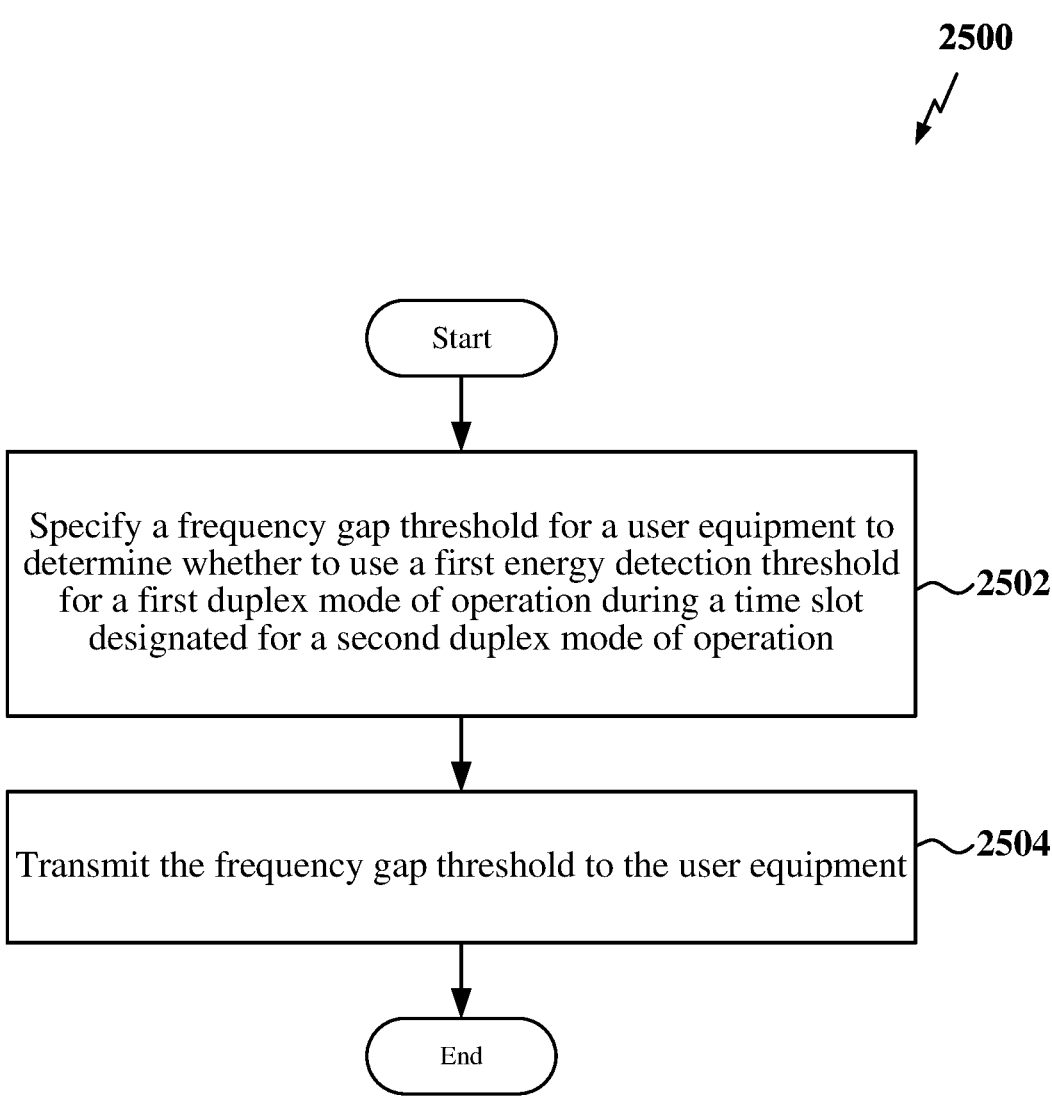
FIG. 25 is a flow chart of an example process for specifying a frequency gap threshold according to some aspects.

FIG. 25 is a flow chart illustrating an example process 2500 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 2500 may be carried out by the BS 2200 illustrated in FIG. 22. In some examples, the process 2500 may be carried out by any suitable apparatus or means for carrying out the functions or algorithm described below.

At block 2502, a BS may specify a frequency gap threshold for a user equipment to determine whether to use a first energy detection threshold for a first duplex mode of operation during a time slot designated for a second duplex mode of operation. For example, the LBT configuration circuitry 2242 together with the communication and processing circuitry 2241 and the transceiver 2210, shown and described above in connection with FIG. 22, may perform this operation.

In some examples, the first duplex mode of operation is a half-duplex mode of operation, and the second duplex mode of operation is a full-duplex mode of operation. In some examples, the first energy detection threshold is a listen-before-talk (LBT) threshold.

At block 2504, the BS may transmit the frequency gap threshold to the user equipment. For example, the LBT processing circuitry 2243 together with the communication and processing circuitry 2241 and the transceiver 2210, shown and described above in connection with FIG. 22, may perform this operation.

In some examples, specifying the frequency gap threshold may include receiving a message indicating at least one capability of the user equipment, and determining the frequency gap threshold based on the at least one capability of the user equipment. In some examples, the at least one capability of the user equipment may include at least one of an interference cancellation capability of the user equipment, a transmit power capability of the user equipment, a selectivity of a receiver of the user equipment, or a combination thereof.

In some examples, specifying the frequency gap threshold may include determining at least one of a quality of a channel used by the user equipment, a priority of traffic to be transmitted by the user equipment, a quality of service (QOS) of traffic to be transmitted by the user equipment, or a combination thereof, and determining the frequency gap threshold based on the at least one of the quality of the channel used by the user equipment, the priority of traffic to be transmitted by the user equipment, the quality of service (QOS) of traffic to be transmitted by the user equipment, or the combination thereof.

Figure 26:
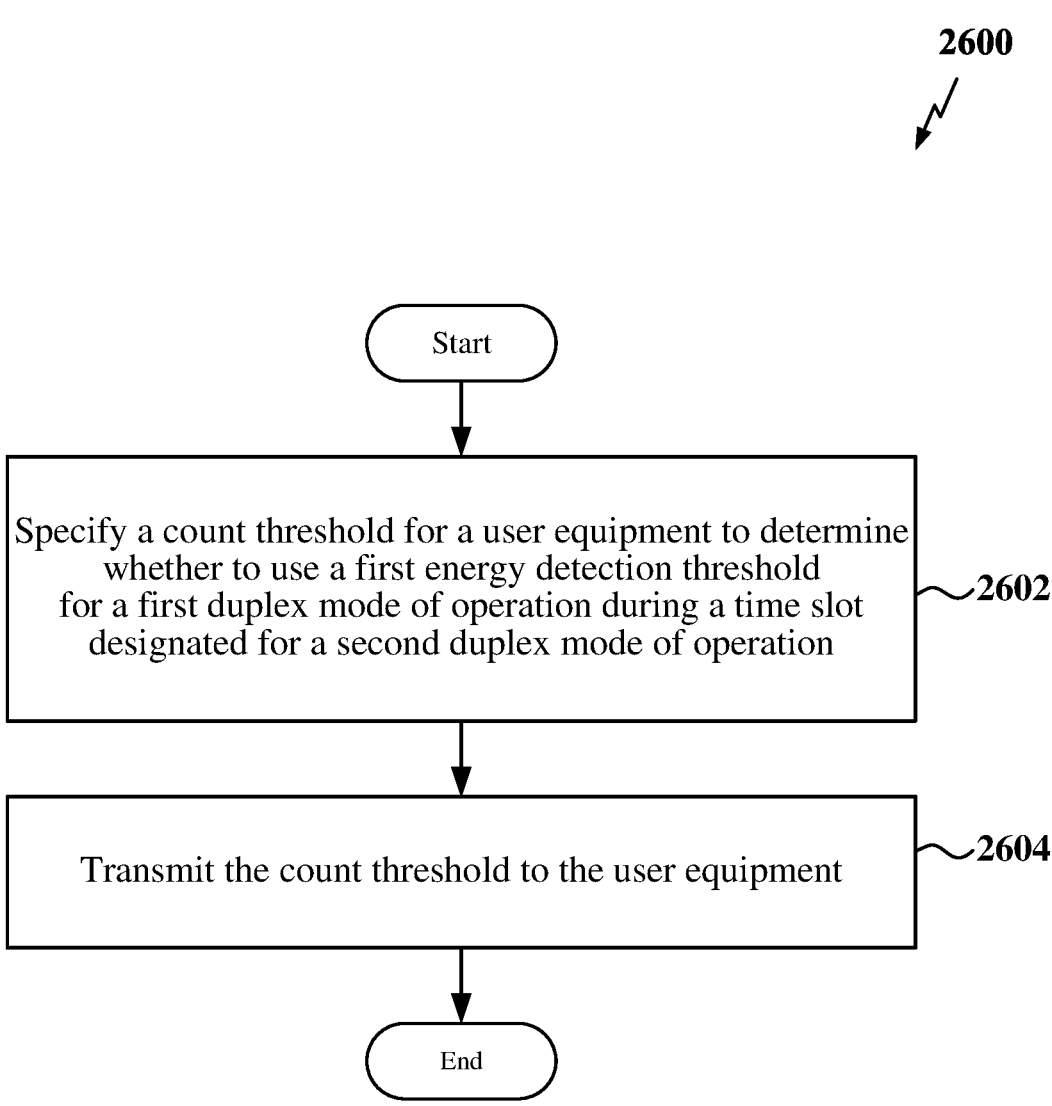
FIG. 26 is a flow chart of an example process for specifying an access failure count threshold according to some aspects.

FIG. 26 is a flow chart illustrating an example process 2600 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 2600 may be carried out by the BS 2200 illustrated in FIG. 22. In some examples, the process 2600 may be carried out by any suitable apparatus or means for carrying out the functions or algorithm described below.

At block 2602, a BS may specify a count threshold for a user equipment to determine whether to use a first energy detection threshold for a first duplex mode of operation during a time slot designated for a second duplex mode of operation. For example, the LBT configuration circuitry 2242 together with the communication and processing circuitry 2241 and the transceiver 2210, shown and described above in connection with FIG. 22, may perform this operation.

In some examples, the first duplex mode of operation is a half-duplex mode of operation, and the second duplex mode of operation is a full-duplex mode of operation. In some examples, the first energy detection threshold is a first listen-before-talk (LBT) threshold for the half-duplex mode of operation.

At block 2604, the BS may transmit the count threshold to the user equipment. For example, the LBT processing circuitry 2243 together with the communication and processing circuitry 2241 and the transceiver 2210, shown and described above in connection with FIG. 22, may perform this operation.

In some examples, specifying the count threshold may include determining at least one of a quality of a channel used by the user equipment, a priority of traffic to be transmitted by the user equipment, a quality of service (QOS) of traffic to be transmitted by the user equipment, or a combination thereof, and determining the count threshold based on the at least one of the quality of the channel used by the user equipment, the priority of traffic to be transmitted by the user equipment, the quality of service (QOS) of traffic to be transmitted by the user equipment, or the combination thereof.

In some examples, specifying the count threshold may include receiving a message indicating at least one capability of the user equipment, and determining the count threshold based on the at least one capability of the user equipment.

Figure 27:
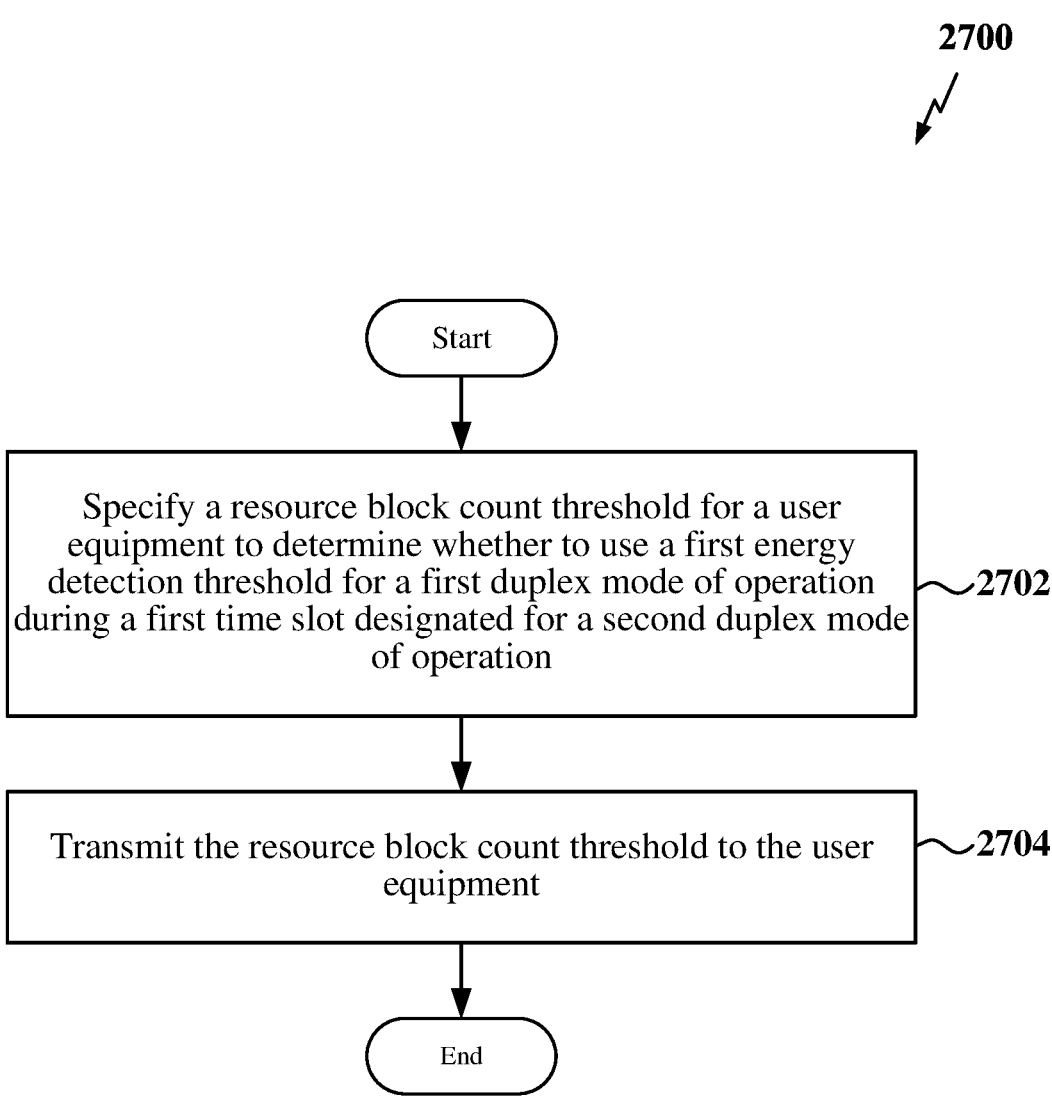
FIG. 27 is a flow chart of an example process for specifying an unavailable resource block count threshold according to some aspects.

FIG. 27 is a flow chart illustrating an example process 2700 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 2700 may be carried out by the BS 2200 illustrated in FIG. 22. In some examples, the process 2700 may be carried out by any suitable apparatus or means for carrying out the functions or algorithm described below.

At block 2702, a BS may specify a resource block count threshold for a user equipment to determine whether to use a first energy detection threshold for a first duplex mode of operation during a first time slot designated for a second duplex mode of operation. For example, the LBT configuration circuitry 2242 together with the communication and processing circuitry 2241 and the transceiver 2210, shown and described above in connection with FIG. 22, may perform this operation.

In some examples, the first duplex mode of operation is a half-duplex mode of operation, and the second duplex mode of operation is a full-duplex mode of operation. In some examples, the first energy detection threshold is a first listen-before-talk (LBT) threshold for the half-duplex mode of operation.

At block 2704, the BS may transmit the resource block count threshold to the user equipment. For example, the LBT processing circuitry 2243 together with the communication and processing circuitry 2241 and the transceiver 2210, shown and described above in connection with FIG. 22, may perform this operation.

In some examples, the specifying the resource block count threshold may include determining at least one of a quality of a channel used by the user equipment, a priority of traffic to be transmitted by the user equipment, a quality of service (QOS) of traffic to be transmitted by the user equipment, or a combination thereof, and determining the resource block count threshold based on the at least one of the quality of the channel used by the user equipment, the priority of traffic to be transmitted by the user equipment, the quality of service (QOS) of traffic to be transmitted by the user equipment, or the combination thereof.

In some examples, specifying the resource block count threshold may include receiving a message indicating at least one capability of the user equipment, and determining the resource block count threshold based on the at least one capability of the user equipment. In some examples, the at least one capability of the user equipment may include at least one of an interference cancellation capability of the user equipment, a transmit power capability of the user equipment, a selectivity of a receiver of the user equipment, or a combination thereof.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Implementation examples are described in the following numbered clauses:

1. A method for wireless communication at a user equipment, the method comprising:
selecting one of a first energy detection threshold and a second energy detection threshold;
detecting an energy level;
determining that the energy level is less than the selected one of the first energy detection threshold and the second energy detection threshold; and
transmitting data after determining that the energy level is less than the selected one of the first energy detection threshold and the second energy detection threshold.

2. The method of clause 1, wherein:
the first energy detection threshold is for a first duplex mode of operation; and
the second energy detection threshold is for a second duplex mode of operation.

3. The method of clause 2, wherein:
the first duplex mode of operation is a half-duplex mode of operation; and
the second duplex mode of operation is a full-duplex mode of operation.

4. The method of clause 3, wherein:
the first energy detection threshold is a first listen-before-talk (LBT) threshold for the half-duplex mode of operation; and
the second energy detection threshold is a second LBT threshold for the full-duplex mode of operation.

5. The method of any one of clauses 1 to 4, wherein the first energy detection threshold is greater than the second energy detection threshold.

6. The method of any one of clauses 1 to 5, wherein the second energy detection threshold is based on a transmit power for a time slot.

7. The method of any one of clauses 1 to 6, further comprising:
receiving the first energy detection threshold and the second energy detection threshold from a base station.

8. The method of any one of clauses 1 to 6, wherein the first energy detection threshold and the second energy detection threshold are specified by a communication standard.

9. The method of any one of clauses 1 to 8, wherein:
the second energy detection threshold is for a full-duplex mode of operation; and
the second energy detection threshold is one of a plurality of energy detection
thresholds defined for the full-duplex mode of operation.

10. The method of clause 9, wherein different energy detection thresholds of the plurality of energy detection thresholds are designated for different frequency domain allocations.

11. The method of any one of clauses 1 to 10, further comprising:
determining a frequency gap between an uplink bandwidth allocation for a time slot and a downlink bandwidth allocation for the time slot; and
determining that the frequency gap is greater than a frequency gap threshold;
wherein the selecting one of the first energy detection threshold and the second energy detection threshold comprises selecting the first energy detection threshold after determining that the frequency gap is greater than the frequency gap threshold.

12. The method of any one of clauses 1 to 10, further comprising:
determining a number of times the user equipment failed to gain access to a channel using the second energy detection threshold; and
determining that the number of times is equal to or greater than a count threshold;
wherein the selecting one of the first energy detection threshold and the second energy detection threshold comprises selecting the first energy detection threshold after determining that the number of times is equal to or greater than the count threshold.

13. The method of any one of clauses 1 to 10, further comprising:
identifying at least one resource block set that is not available for a transmission by the user equipment during a time slot, wherein the at least one resource block set is between a first resource block set allocated for an uplink transmission by the user equipment during the time slot and a second resource block set allocated for a downlink reception by the user equipment during the time slot;

wherein the selecting one of the first energy detection threshold and the second energy detection threshold comprises selecting the first energy detection threshold after identifying the at least one resource block set.

14. The method of any one of clauses 1 to 13, wherein:

detecting the energy level comprises detecting the energy level during a time slot; and transmitting the data after determining that the energy level is less than the selected one of the first energy detection threshold and the second energy detection threshold comprises transmitting the data during the time slot.

15. The method of any one of clauses 1 to 13, wherein:

transmitting the data after determining that the energy level is less than the selected one of the first energy detection threshold and the second energy detection threshold comprises transmitting the data within 25 microseconds or less from a time that the energy level is detected.

16. A user equipment, comprising:

a transceiver;

a memory; and a processor communicatively coupled to the transceiver and the memory, wherein the processor and the memory are configured to cause the user equipment to:

select one of a first energy detection threshold and a second energy detection threshold;

detect an energy level using the transceiver;

determine that the energy level is less than the selected one of the first energy detection threshold and the second energy detection threshold; and transmit data via the transceiver after determining that the energy level is less than the selected one of the first energy detection threshold and the second energy detection threshold.

17. The user equipment of clause 16, wherein:

the first energy detection threshold is for a first duplex mode of operation; and the second energy detection threshold is for a second duplex mode of operation.

18. The user equipment of clause 17, wherein:

the first duplex mode of operation is a half-duplex mode of operation; and the second duplex mode of operation is a full-duplex mode of operation.

19. The user equipment of clause 18, wherein:

the first energy detection threshold is a first listen-before-talk (LBT) threshold for the half-duplex mode of operation; and the second energy detection threshold is a second LBT threshold for the full-duplex mode of operation.

20. The user equipment of any one of clauses 16 to 19, wherein the first energy detection threshold is greater than the second energy detection threshold.

21. The user equipment of any one of clauses 16 to 20, wherein the second energy detection threshold is based on a transmit power for a time slot.

22. The user equipment of any one of clauses 16 to 21, wherein the processor and the memory are configured to cause the user equipment to:

receive, via the transceiver, the first energy detection threshold and the second energy detection threshold from a base station.

23. The user equipment of any one of clauses 16 to 21, wherein the first energy detection threshold and the second energy detection threshold are specified by a communication standard.

24. The user equipment of any one of clauses 16 to 23, wherein:

the second energy detection threshold is for a full-duplex mode of operation; and the second energy detection threshold is one of a plurality of energy detection thresholds defined for the full-duplex mode of operation.

25. The user equipment of clause 24, wherein different energy detection thresholds of the plurality of energy detection thresholds are designated for different frequency domain allocations.

26. The user equipment of any one of clauses 16 to 25, wherein the processor and the memory are configured to cause the user equipment to:

determine a frequency gap between an uplink bandwidth allocation for a time slot and a downlink bandwidth allocation for the time slot;

determine that the frequency gap is greater than a frequency gap threshold; and select the first energy detection threshold after determining that the frequency gap is greater than the frequency gap threshold.

27. The user equipment of any one of clauses 16 to 25, wherein the processor and the memory are configured to cause the user equipment to:

determine a number of times the user equipment failed to gain access to a channel using the second energy detection threshold;

determine that the number of times is equal to or greater than a count threshold; and select the first energy detection threshold after determining that the number of times is equal to or greater than the count threshold.

28. The user equipment of any one of clauses 16 to 25, wherein the processor and the memory are configured to cause the user equipment to:

identify at least one resource block set that is not available for a transmission by the user equipment during a time slot, wherein the at least one resource block set is between a first resource block set allocated for an uplink transmission by the user equipment during the time slot and a second resource block set allocated for a downlink reception by the user equipment during the time slot; and select the first energy detection threshold after identifying the at least one resource block set.

29. The user equipment of any one of clauses 16 to 28, the processor and the memory are configured to cause the user equipment to:

detect the energy level during a time slot; and transmit the data during the time slot after determining that the energy level is less than the selected one of the first energy detection threshold and the second energy detection threshold.

30. The user equipment of any one of clauses 16 to 28, the processor and the memory are configured to cause the user equipment to:

transmit the data within 25 microseconds or less from a time that the energy level is detected after determining that the energy level is less than the selected one of the first energy detection threshold and the second energy detection threshold.

31. A user equipment, comprising:

means for selecting one of a first energy detection threshold and a second energy detection threshold;

means for detecting an energy level;

means for determining that the energy level is less than the selected one of the first energy detection threshold and the second energy detection threshold; and means for transmitting data after determining that the energy level is less than the selected one of the first energy detection threshold and the second energy detection threshold.

32. A computer-readable medium including instructions stored therein, wherein the instructions are executable by a processor of a user equipment to:

select one of a first energy detection threshold and a second energy detection threshold;

detect an energy level;

determine that the energy level is less than the selected one of the first energy detection threshold and the second energy detection threshold; and transmit data after determining that the energy level is less than the selected one of the first energy detection threshold and the second energy detection threshold.

33. A method for wireless communication at a user equipment, the method comprising:

selecting one of a first energy detection threshold and a second energy detection threshold;

detecting an energy level;

comparing the energy level to the selected one of the first energy detection threshold and the second energy detection threshold; and transmitting data if the energy level is less than the selected one of the first energy detection threshold and the second energy detection threshold.

34. The method of clause 33, wherein:

the first energy detection threshold is for a first duplex mode of operation; and the second energy detection threshold is for a second duplex mode of operation.

35. The method of clause 34, wherein:

the first duplex mode of operation is a half-duplex mode of operation; and the second duplex mode of operation is a full-duplex mode of operation.

36. The method of any one of clauses 33 to 35, wherein the first energy detection threshold is greater than the second energy detection threshold.

37. The method of any one of clauses 33 to 36, further comprising backing off transmission of the data during a time slot if the energy level is above the selected one of the first energy detection threshold and the second energy detection threshold.

38. The method of any one of clauses 33 to 37, further comprising:

determining a frequency gap between an uplink bandwidth allocation for a time slot and a downlink bandwidth allocation for the time slot; and comparing the frequency gap to a frequency gap threshold;

wherein the selecting one of the first energy detection threshold and the second energy detection threshold comprises selecting the first energy detection threshold if the frequency gap is greater than the frequency gap threshold.

39. The method of clause 38, wherein the selecting one of the first energy detection threshold and the second energy detection threshold comprises selecting the second energy detection threshold if the frequency gap is less than the frequency gap threshold.

40. The method of any one of clauses 33 to 37, further comprising:

determining a number of times the user equipment failed to gain access to a channel using the second energy detection threshold; and comparing the number of times to a count threshold;

wherein the selecting one of the first energy detection threshold and the second energy detection threshold comprises selecting the first energy detection threshold if the number of times is equal to or greater than the count threshold.

41. The method of clause 40, wherein the selecting one of the first energy detection threshold and the second energy detection threshold comprises selecting the second energy detection threshold if the number of times is less than the count threshold.

42. The method of any one of clauses 33 to 37, further comprising:

identifying at least one resource block set that is not available for a transmission by the user equipment during a time slot, wherein the at least one resource block set is between a first resource block set allocated for an uplink transmission by the user equipment during the time slot and a second resource block set allocated for a downlink reception by the user equipment during the time slot; and wherein the selecting one of the first energy detection threshold and the second energy detection threshold comprises selecting the first energy detection threshold after identifying the at least one resource block set.

43. The method of any one of clauses 33 to 42, wherein:

detecting the energy level comprises detecting the energy level during a time slot; and transmitting the data if the energy level is less than the selected one of the first energy detection threshold and the second energy detection threshold comprises transmitting the data during the time slot if the energy level is less than the selected one of the first energy detection threshold and the second energy detection threshold.

44. The method of any one of clauses 33 to 42, wherein:

transmitting the data if the energy level is less than the selected one of the first energy detection threshold and the second energy detection threshold comprises transmitting the data within 25 microseconds or less from a time that the energy level is detected if the energy level is less than the selected one of the first energy detection threshold and the second energy detection threshold.

45. A user equipment, comprising:

a transceiver;

a memory; and a processor communicatively coupled to the transceiver and the memory, wherein the processor and the memory are configured to cause the user equipment to:

select one of a first energy detection threshold and a second energy detection threshold;

detect an energy level;

compare the energy level to the selected one of the first energy detection threshold and the second energy detection threshold; and transmit data via the transceiver if the energy level is less than the selected one of the first energy detection threshold and the second energy detection threshold.

46. The user equipment of clause 45, wherein:

the first energy detection threshold is for a first duplex mode of operation; and the second energy detection threshold is for a second duplex mode of operation.

47. The user equipment of clause 46, wherein:

the first duplex mode of operation is a half-duplex mode of operation; and the second duplex mode of operation is a full-duplex mode of operation.

48. The user equipment of any one of clauses 45 to 47, wherein the first energy detection threshold is greater than the second energy detection threshold.

49. The user equipment of any one of clauses 45 to 48, wherein the processor and the memory are configured to cause the user equipment to:

back off transmission of the data during a time slot if the energy level is above the selected one of the first energy detection threshold and the second energy detection threshold.

50. The user equipment of any one of clauses 45 to 49, wherein the processor and the memory are configured to cause the user equipment to:

determine a frequency gap between an uplink bandwidth allocation for a time slot and a downlink bandwidth allocation for the time slot;

compare the frequency gap to a frequency gap threshold; and select the first energy detection threshold if the frequency gap is greater than the frequency gap threshold.

51. The user equipment of clause 50, wherein the processor and the memory are configured to cause the user equipment to select the second energy detection threshold if the frequency gap is less than the frequency gap threshold.

52. The user equipment of any one of clauses 45 to 49, wherein the processor and the memory are configured to cause the user equipment to:

determine a number of times the user equipment failed to gain access to a channel using the second energy detection threshold;

compare the number of times to a count threshold; and select the first energy detection threshold if the number of times is equal to or greater than the count threshold.

53. The user equipment of clause 52, wherein the processor and the memory are configured to cause the user equipment to select the second energy detection threshold if the number of times is less than the count threshold.

54. The user equipment of any one of clauses 45 to 49, wherein the processor and the memory are configured to cause the user equipment to:

identify at least one resource block set that is not available for a transmission by the user equipment during a time slot, wherein the at least one resource block set is between a first resource block set allocated for an uplink transmission by the user equipment during the time slot and a second resource block set allocated for a downlink reception by the user equipment during the time slot; and select the first energy detection threshold after identifying the at least one resource block set.

55. The user equipment of any one of clauses 45 to 54, the processor and the memory are configured to cause the user equipment to:

detect the energy level during a time slot; and transmit the data during the time slot if the energy level is less than the selected one of the first energy detection threshold and the second energy detection threshold.

56. The user equipment of any one of clauses 45 to 54, the processor and the memory are configured to cause the user equipment to:

transmit the data within 25 microseconds or less from a time that the energy level is detected if the energy level is less than the selected one of the first energy detection threshold and the second energy detection threshold.

57. A user equipment, comprising:

means for selecting one of a first energy detection threshold and a second energy detection threshold;

means for detecting an energy level;

means for comparing the energy level to the selected one of the first energy detection threshold and the second energy detection threshold; and means for transmitting data if the energy level is less than the selected one of the first energy detection threshold and the second energy detection threshold.

58. A computer-readable medium including instructions stored therein, wherein the instructions are executable by a processor of a user equipment to:

select one of a first energy detection threshold and a second energy detection threshold;

detect an energy level;

compare the energy level to the selected one of the first energy detection threshold and the second energy detection threshold; and transmit data if the energy level is less than the selected one of the first energy detection threshold and the second energy detection threshold.

59. A method for wireless communication at a base station, the method comprising:

specifying a first energy detection threshold for a first duplex mode of operation;

specifying a second energy detection threshold for a second duplex mode of operation; and transmitting the first energy detection threshold and the second energy detection threshold to a user equipment.

60. The method of clause 59, wherein:

the first duplex mode of operation is a half-duplex mode of operation; and the second duplex mode of operation is a full-duplex mode of operation.

61. The method of clause 60, wherein:

the first energy detection threshold is a first listen-before-talk (LBT) threshold for the half-duplex mode of operation; and the second energy detection threshold is a second LBT threshold for the full-duplex mode of operation.

62. The method of any one of clauses 59 to 61, wherein the first energy detection threshold is greater than the second energy detection threshold.

63. The method of any one of clauses 59 to 62, wherein the transmitting the first energy detection threshold and the second energy detection threshold to the user equipment comprises transmitting a radio resource control (RRC) message including the first energy detection threshold and the second energy detection threshold.

64. The method of any one of clauses 59 to 63, further comprising:

calculating a bandwidth for the user equipment for the second duplex mode of operation;

wherein the specifying the second energy detection threshold is further based on the bandwidth.

65. The method of any one of clauses 59 to 64, wherein specifying the second energy detection threshold comprises:

determining at least one of: a quality of a channel used by the user equipment, a priority of traffic to be transmitted by the user equipment, a quality of service (QOS) of traffic to be transmitted by the user equipment, or a combination thereof; and determining the second energy detection threshold based on the at least one of: the quality of the channel used by the user equipment, the priority of traffic to be transmitted by the user equipment, the quality of service (QOS) of traffic to be transmitted by the user equipment, or the combination thereof.

66. The method of any one of clauses 59 to 65, wherein:

the second duplex mode of operation is a full-duplex mode of operation; and the second energy detection threshold is one of a plurality of energy detection thresholds defined for the full-duplex mode of operation.

67. The method of any one of clauses 59 to 66, further comprising:

specifying a frequency gap threshold for the user equipment to determine whether to use the first energy detection threshold during a time slot designated for the second duplex mode of operation; and transmitting the frequency gap threshold to the user equipment.

68. The method of any one of clauses 59 to 66, further comprising:

specifying a count threshold for the user equipment to determine whether to use the first energy detection threshold during a time slot designated for the second duplex mode of operation; and transmitting the count threshold to the user equipment.

69. The method of any one of clauses 59 to 66, further comprising:

specifying a resource block count threshold for the user equipment to determine whether to use the first energy detection threshold during a time slot designated for the second duplex mode of operation; and transmitting the resource block count threshold to the user equipment.

70. A base station, comprising:

a transceiver;

a memory; and a processor communicatively coupled to the transceiver and the memory, wherein the processor and the memory are configured to cause the base station to:

specify a first energy detection threshold for a first duplex mode of operation;

specify a second energy detection threshold for a second duplex mode of operation; and transmit the first energy detection threshold and the second energy detection threshold via the transceiver to a user equipment.

71. The base station of clause 70, wherein:

the first duplex mode of operation is a half-duplex mode of operation; and the second duplex mode of operation is a full-duplex mode of operation.

72. The base station of clause 71, wherein:

the first energy detection threshold is a first listen-before-talk (LBT) threshold for the half-duplex mode of operation; and the second energy detection threshold is a second LBT threshold for the full-duplex mode of operation.

73. The base station of any one of clauses 70 to 72, wherein the first energy detection threshold is greater than the second energy detection threshold.

74. The base station of any one of clauses 70 to 73, wherein the processor and the memory are configured to cause the user equipment to:

calculate a bandwidth for the user equipment for the second duplex mode of operation; and specify the second energy detection threshold based on the bandwidth.

75. The base station of any one of clauses 70 to 74, wherein the processor and the memory are configured to cause the user equipment to:

determine at least one of: a quality of a channel used by the user equipment, a priority of traffic to be transmitted by the user equipment, a quality of service (QOS) of traffic to be transmitted by the user equipment, or a combination thereof; and determine the second energy detection threshold based on the at least one of: the quality of the channel used by the user equipment, the priority of traffic to be transmitted by the user equipment, the quality of service (QOS) of traffic to be transmitted by the user equipment, or the combination thereof.

76. The base station of any one of clauses 70 to 75, wherein:

the second duplex mode of operation is a full-duplex mode of operation; and the second energy detection threshold is one of a plurality of energy detection thresholds defined for the full-duplex mode of operation.

77. The base station of any one of clauses 70 to 76, wherein the processor and the memory are configured to cause the user equipment to:

specify a frequency gap threshold for the user equipment to determine whether to use the first energy detection threshold during a time slot designated for the second duplex mode of operation; and transmit the frequency gap threshold to the user equipment.

78. The base station of any one of clauses 70 to 76, wherein the processor and the memory are configured to cause the user equipment to:

specify a count threshold for the user equipment to determine whether to use the first energy detection threshold during a time slot designated for the second duplex mode of operation; and transmit the count threshold to the user equipment.

79. The base station of any one of clauses 70 to 76, wherein the processor and the memory are configured to cause the user equipment to:

specify a resource block count threshold for the user equipment to determine whether to use the first energy detection threshold during a time slot designated for the second duplex mode of operation; and transmit the resource block count threshold to the user equipment.

80. A base station, comprising:

means for specifying a first energy detection threshold for a first duplex mode of operation;

means for specifying a second energy detection threshold for a second duplex mode of operation; and means for transmitting the first energy detection threshold and the second energy detection threshold to a user equipment.

81. A computer-readable medium including instructions stored therein, wherein the instructions are executable by a processor of a base station to:

specify a first energy detection threshold for a first duplex mode of operation;

specify a second energy detection threshold for a second duplex mode of operation; and transmit the first energy detection threshold and the second energy detection threshold to a user equipment.

82. A method for wireless communication at a user equipment, the method comprising:

selecting a full-duplex energy detection threshold from among a first energy detection threshold for a full-duplex mode of operation and a second energy detection threshold for the full-duplex mode of operation;

detecting a first energy level during a first time slot scheduled for the full-duplex mode of operation;

determining that the first energy level is less than the full-duplex energy detection threshold; and transmitting first data during the first time slot using the full-duplex mode of operation after determining that the first energy level is less than the full-duplex energy detection threshold.

83. The method of clause 82, wherein:

the first energy detection threshold is a first listen-before-talk (LBT) threshold; and the second energy detection threshold is a second LBT threshold that is different from the first LBT threshold.

84. The method of clause 82 or 83, further comprising:

identifying a frequency domain allocation designated for the first time slot;

wherein the selecting the full-duplex energy detection threshold is based on the frequency domain allocation designated for the first time slot.

85. The method of clause 84, wherein the frequency domain allocation for the first time slot is based on at least one of: an uplink bandwidth allocation for the first time slot and a downlink bandwidth allocation for the first time slot, an overlap of the uplink bandwidth allocation for the first time slot and the downlink bandwidth allocation for the first time slot, a guard band configuration for the first time slot, or a combination thereof.

86. The method of clause 84 or 85, further comprising:

receiving a slot format identifier;

wherein the identifying the frequency domain allocation is based on the slot format identifier.

87. The method of any one of clauses 82 to 86, wherein:

the first energy detection threshold is designated for at least one first frequency domain allocation; and the second energy detection threshold is designated for at least one second frequency domain allocation.

88. The method of any one of clauses 82 to 87, further comprising:

receiving the first energy detection threshold and the second energy detection threshold from a base station.

89. The method of any one of clauses 82 to 87, wherein the first energy detection threshold and the second energy detection threshold are specified by a communication standard.

90. The method of any one of clauses 82 to 89, further comprising:

detecting a second energy level during a second time slot scheduled for a half-duplex mode of operation;

determining that the second energy level is less than a half-duplex energy detection threshold for the half-duplex mode of operation; and transmitting second data during the second time slot using the half-duplex mode of operation after determining that the second energy level is less than the half-duplex energy detection threshold.

91. The method of clause 90, wherein the half-duplex energy detection threshold is greater than the full-duplex energy detection threshold.

92. A user equipment, comprising:

a transceiver;

a memory; and a processor communicatively coupled to the transceiver and the memory, wherein the processor and the memory are configured to cause the user equipment to:

select a full-duplex energy detection threshold from among a first energy detection threshold for a full-duplex mode of operation and a second energy detection threshold for the full-duplex mode of operation;

detect a first energy level during a first time slot scheduled for the full-duplex mode of operation;

determine that the first energy level is less than the full-duplex energy detection threshold; and transmit first data via the transceiver during the first time slot using the full-duplex mode of operation after determining that the first energy level is less than the full-duplex energy detection threshold.

93. The user equipment of clause 92, wherein:

the first energy detection threshold is a first listen-before-talk (LBT) threshold; and the second energy detection threshold is a second LBT threshold that is different from the first LBT threshold.

94. The user equipment of clause 92 or 93, wherein the processor and the memory are configured to cause the user equipment to:

identify a frequency domain allocation designated for the first time slot; and select the full-duplex energy detection threshold based on the frequency domain allocation designated for the first time slot.

95. The user equipment of clause 94, wherein the frequency domain allocation for the first time slot is based on at least one of: an uplink bandwidth allocation for the first time slot and a downlink bandwidth allocation for the first time slot, an overlap of the uplink bandwidth allocation for the first time slot and the downlink bandwidth allocation for the first time slot, a guard band configuration for the first time slot, or a combination thereof.

96. The user equipment of clause 94 or 95, wherein the processor and the memory are configured to cause the user equipment to:

receive a slot format identifier; and identify the frequency domain allocation based on the slot format identifier.

97. The user equipment of any one of clauses 92 to 96, wherein:

the first energy detection threshold is designated for at least one first frequency domain allocation; and the second energy detection threshold is designated for at least one second frequency domain allocation.

98. The user equipment of any one of clauses 92 to 97, wherein the processor and the memory are configured to cause the user equipment to:

receive the first energy detection threshold and the second energy detection threshold from a base station.

99. The user equipment of any one of clauses 92 to 97, wherein the first energy detection threshold and the second energy detection threshold are specified by a communication standard.

100. The user equipment of any one of clauses 92 to 99, wherein the processor and the memory are configured to cause the user equipment to:

detect a second energy level during a second time slot scheduled for a half-duplex mode of operation;

determine that the second energy level is less than a half-duplex energy detection threshold for the half-duplex mode of operation; and transmit second data during the second time slot using the half-duplex mode of operation after determining that the second energy level is less than the half-duplex energy detection threshold.

101. The user equipment of clause 100, wherein the half-duplex energy detection threshold is greater than the full-duplex energy detection threshold.

102. A user equipment, comprising:

means for selecting a full-duplex energy detection threshold from among a first energy detection threshold for a full-duplex mode of operation and a second energy detection threshold for the full-duplex mode of operation;

means for detecting an energy level during a time slot scheduled for the full-duplex mode of operation;

means for determining that the energy level is less than the full-duplex energy detection threshold; and means for transmitting data during the time slot using the full-duplex mode of operation after determining that the energy level is less than the full-duplex energy detection threshold.

103. A computer-readable medium including instructions stored therein, wherein the instructions are executable by a processor of a user equipment to:

select a full-duplex energy detection threshold from among a first energy detection threshold for a full-duplex mode of operation and a second energy detection threshold for the full-duplex mode of operation;

detect an energy level during a time slot scheduled for the full-duplex mode of operation;

determine that the energy level is less than the full-duplex energy detection threshold; and transmit data during the time slot using the full-duplex mode of operation after determining that the energy level is less than the full-duplex energy detection threshold.

104. A method for wireless communication at a base station, the method comprising:

specifying a first energy detection threshold for a full-duplex mode of operation;

specifying a second energy detection threshold for the full-duplex mode of operation; and transmitting the first energy detection threshold and the second energy detection threshold to a user equipment.

105. The method of clause 104, wherein:

the first energy detection threshold is a first listen-before-talk (LBT) threshold; and the second energy detection threshold is a second LBT threshold that is different from the first LBT threshold.

106. The method of clause 104 or 105, wherein:

the specifying the first energy detection threshold comprises designating the first energy detection threshold for at least one first frequency domain allocation; and the specifying the second energy detection threshold comprises designating the second energy detection threshold for at least one second frequency domain allocation.

107. The method of clause 106, wherein the specifying the first energy detection threshold comprises:

defining the first energy detection threshold based on at least one of: an uplink bandwidth allocation for a time slot and a downlink bandwidth allocation for the time slot, an overlap of the uplink bandwidth allocation for the time slot and the downlink bandwidth allocation for the time slot, a guard band configuration for the time slot, or a combination thereof.

108. The method of clause 106 or 107, further comprising:

transmitting a first slot format identifier and a second slot format identifier to the user equipment, wherein the first slot format identifier identifies a first slot format corresponding to the at least one first frequency domain allocation and the second slot format identifier identifies a second slot format corresponding to the at least one second frequency domain allocation.

109. The method of any one of clauses 104 to 108, further comprising:

calculating at least one of a transmit power, a bandwidth, or a combination thereof for the user equipment for the full-duplex mode of operation;

wherein the specifying the first energy detection threshold is based on the at least one of the transmit power, the bandwidth, or the combination thereof.

110. A base station, comprising:

a transceiver;

a memory; and a processor communicatively coupled to the transceiver and the memory, wherein the processor and the memory are configured to cause the base station to:

specify a first energy detection threshold for a full-duplex mode of operation;

specify a second energy detection threshold for the full-duplex mode of operation; and transmit the first energy detection threshold and the second energy detection threshold via the transceiver to a user equipment.

111. The base station of clause 110, wherein:

the first energy detection threshold is a first listen-before-talk (LBT) threshold; and the second energy detection threshold is a second LBT threshold that is different from the first LBT threshold.

112. The base station of clause 110 or 111, wherein the processor and the memory are configured to cause the base station to:

designate the first energy detection threshold for at least one first frequency domain allocation; and designate the second energy detection threshold for at least one second frequency domain allocation.

113. The base station of clause 112, wherein the processor and the memory are configured to cause the base station to:

define the first energy detection threshold based on at least one of: an uplink bandwidth allocation for a time slot and a downlink bandwidth allocation for the time slot, an overlap of the uplink bandwidth allocation for the time slot and the downlink bandwidth allocation for the time slot, a guard band configuration for the time slot, or a combination thereof.

114. The base station of clause 112 or 113, wherein the processor and the memory are configured to cause the base station to:

transmit a first slot format identifier and a second slot format identifier to the user equipment, wherein the first slot format identifier identifies a first slot format corresponding to the at least one first frequency domain allocation and the second slot format identifier identifies a second slot format corresponding to the at least one second frequency domain allocation.

115. The base station of any one of clauses 110 to 114, wherein the processor and the memory are configured to cause the base station to:

calculate at least one of a transmit power, a bandwidth, or a combination thereof for the user equipment for the full-duplex mode of operation; and specify the first energy detection threshold based on the at least one of the transmit power, the bandwidth, or the combination thereof.

116. A base station, comprising:

means for specifying a first energy detection threshold for a full-duplex mode of operation;

means for specifying a second energy detection threshold for the full-duplex mode of operation; and means for transmitting the first energy detection threshold and the second energy detection threshold to a user equipment.

117. A computer-readable medium including instructions stored therein, wherein the instructions are executable by a processor of a base station to:

specify a first energy detection threshold for a full-duplex mode of operation;

specify a second energy detection threshold for the full-duplex mode of operation; and transmit the first energy detection threshold and the second energy detection threshold to a user equipment.

118. A method for wireless communication at a user equipment, the method comprising:

determining a frequency gap between an uplink bandwidth allocation for a first time slot designated for a first duplex mode of operation and a downlink bandwidth allocation for the first time slot;

determining that the frequency gap is greater than a frequency gap threshold;

detecting a first energy level during the first time slot;

determining that the first energy level is less than a first energy detection threshold for a second duplex mode of operation after determining that the frequency gap is greater than the frequency gap threshold; and transmitting first data after determining that the first energy level is less than the first energy detection threshold.

119. The method of clause 118, wherein:

the first duplex mode of operation is a full-duplex mode of operation; and the second duplex mode of operation is a half-duplex mode of operation.

120. The method of clause 118 or 119, wherein:

the first energy detection threshold is a listen-before-talk (LBT) threshold.

121. The method of any one of clauses 118 to 120, further comprising:

receiving an indication of the frequency gap threshold from a base station.

122. The method of any one of clauses 118 to 120, wherein the frequency gap threshold is specified by a communication standard.

123. The method of any one of clauses 118 to 122, further comprising:

detecting a second energy level during a second time slot scheduled for the first duplex mode of operation, wherein the first duplex mode of operation is a full-duplex mode of operation;

determining that the second energy level is less than a second energy detection threshold for the first duplex mode of operation; and transmitting second data during the second time slot using the first duplex mode of operation after determining that the second energy level is less than the second energy detection threshold, 124. The method of clause 123, wherein the second energy detection threshold is one of a plurality of energy detection thresholds defined for the first duplex mode of operation.

125. The method of clause 124, wherein different energy detection thresholds of the plurality of energy detection thresholds are designated for different frequency domain allocations.

126. A user equipment, comprising:

a transceiver;

a memory; and a processor communicatively coupled to the transceiver and the memory, wherein the processor and the memory are configured to cause the user equipment to:

determine a frequency gap between an uplink bandwidth allocation for a first time slot designated for a first duplex mode of operation and a downlink bandwidth allocation for the first time slot;

determine that the frequency gap is greater than a frequency gap threshold;

detect a first energy level during the first time slot;

determine that the first energy level is less than a first energy detection threshold for a second duplex mode of operation after determining that the frequency gap is greater than the frequency gap threshold; and transmit first data after determining that the first energy level is less than the first energy detection threshold.

127. The user equipment of clause 126, wherein:

the first duplex mode of operation is a full-duplex mode of operation; and the second duplex mode of operation is a half-duplex mode of operation.

128. The user equipment of clause 126 or 127, wherein:

the first energy detection threshold is a listen-before-talk (LBT) threshold.

129. The user equipment of any one of clauses 126 to 128, wherein the processor and the memory are configured to cause the user equipment to:

receive an indication of the frequency gap threshold from a base station.

130. The user equipment of any one of clauses 126 to 128, wherein the frequency gap threshold is specified by a communication standard.

131. The user equipment of any one of clauses 126 to 130, wherein the processor and the memory are configured to cause the user equipment to:

detect a second energy level during a second time slot scheduled for the first duplex mode of operation, wherein the first duplex mode of operation is a full-duplex mode of operation;

determine that the second energy level is less than a second energy detection threshold for the first duplex mode of operation; and transmit second data during the second time slot using the first duplex mode of operation after determining that the second energy level is less than the second energy detection threshold.

132. The user equipment of clause 131, wherein the second energy detection threshold is one of a plurality of energy detection thresholds defined for the first duplex mode of operation.

133. The user equipment of clause 132, wherein different energy detection thresholds of the plurality of energy detection thresholds are designated for different frequency domain allocations.

134. A user equipment, comprising:

means for determining a frequency gap between an uplink bandwidth allocation for a time slot designated for a first duplex mode of operation and a downlink bandwidth allocation for the time slot;

means for determining that the frequency gap is greater than a frequency gap threshold;

means for detecting an energy level during the time slot;

means for determining that the energy level is less than an energy detection threshold for a second duplex mode of operation after determining that the frequency gap is greater than the frequency gap threshold; and means for transmitting data after determining that the energy level is less than the energy detection threshold.

135. A computer-readable medium including instructions stored therein, wherein the instructions are executable by a processor of a user equipment to:

determine a frequency gap between an uplink bandwidth allocation for a time slot designated for a first duplex mode of operation and a downlink bandwidth allocation for the time slot;

determine that the frequency gap is greater than a frequency gap threshold;

detect an energy level during the time slot;

determine that the energy level is less than an energy detection threshold for a second duplex mode of operation after determining that the frequency gap is greater than the frequency gap threshold; and transmit data after determining that the energy level is less than the energy detection threshold.

136. A method for wireless communication at a user equipment, the method comprising:

comparing a frequency gap to a frequency gap threshold, wherein the frequency gap is between an uplink bandwidth allocation for a time slot and a downlink bandwidth allocation for the time slot;

detecting an energy level;

if the frequency gap is greater than the frequency gap threshold, comparing the energy level to a first energy detection threshold; and transmitting data during the time slot if the energy level is less than the first energy detection threshold; and if the frequency gap is less than the frequency gap threshold, comparing the energy level to a second energy detection threshold; and transmitting the data during the time slot if the energy level is less than the second energy detection threshold.

137. The method of clause 136, wherein the first energy detection threshold is greater than the second energy detection threshold.

138. A user equipment, comprising:

a transceiver;

a memory; and a processor communicatively coupled to the transceiver and the memory, wherein the processor and the memory are configured to cause the user equipment to:

compare a frequency gap to a frequency gap threshold, wherein the frequency gap is between an uplink bandwidth allocation for a time slot and a downlink bandwidth allocation for the time slot;

detect an energy level;

if the frequency gap is greater than the frequency gap threshold, compare the energy level to a first energy detection threshold; and transmit data during the time slot if the energy level is less than the first energy detection threshold; and if the frequency gap is less than the frequency gap threshold, compare the energy level to a second energy detection threshold; and transmit the data during the time slot if the energy level is less than the second energy detection threshold.

139. The user equipment of clause 138, wherein the first energy detection threshold is greater than the second energy detection threshold.

140. A method for wireless communication at a base station, the method comprising:

specifying a frequency gap threshold for a user equipment to determine whether to use a first energy detection threshold for a first duplex mode of operation during a time slot designated for a second duplex mode of operation; and transmitting the frequency gap threshold to the user equipment.

141. The method of clause 140, wherein:

the first duplex mode of operation is a half-duplex mode of operation; and the second duplex mode of operation is a full-duplex mode of operation.

142. The method of clause 140 or 141, wherein:

the first energy detection threshold is a listen-before-talk (LBT) threshold.

143. The method of any one of clauses 140 to 142, wherein the specifying the frequency gap threshold comprises:

receiving a message indicating at least one capability of the user equipment; and determining the frequency gap threshold based on the at least one capability of the user equipment.

144. The method of clause 143, wherein the at least one capability of the user equipment comprises at least one of: an interference cancellation capability of the user equipment, a transmit power capability of the user equipment, a selectivity of a receiver of the user equipment, or a combination thereof.

145. The method of any one of clauses 140 to 142, wherein the specifying the frequency gap threshold comprises:

determining at least one of: a quality of a channel used by the user equipment, a priority of traffic to be transmitted by the user equipment, a quality of service (QOS) of traffic to be transmitted by the user equipment, or a combination thereof; and determining the frequency gap threshold based on the at least one of: the quality of the channel used by the user equipment, the priority of traffic to be transmitted by the user equipment, the quality of service (QOS) of traffic to be transmitted by the user equipment, or the combination thereof.

146. A base station, comprising:

a transceiver;

a memory; and a processor communicatively coupled to the transceiver and the memory, wherein the processor and the memory are configured to cause the base station to:

specify a frequency gap threshold for a user equipment to determine whether to use a first energy detection threshold for a first duplex mode of operation during a time slot designated for a second duplex mode of operation; and transmit the frequency gap threshold via the transceiver to the user equipment.

147. The base station of clause 146, wherein:

the first duplex mode of operation is a half-duplex mode of operation; and the second duplex mode of operation is a full-duplex mode of operation.

148. The base station of clause 146 or 147, wherein:

the first energy detection threshold is a listen-before-talk (LBT) threshold.

149. The base station of any one of clauses 146 to 148, wherein the processor and the memory are configured to cause the base station to:

receive a message indicating at least one capability of the user equipment; and determine the frequency gap threshold based on the at least one capability of the user equipment.

150. The base station of clause 149, wherein the at least one capability of the user equipment comprises at least one of: an interference cancellation capability of the user equipment, a transmit power capability of the user equipment, a selectivity of a receiver of the user equipment, or a combination thereof.

151. The base station of any one of clauses 146 to 148, wherein the processor and the memory are configured to cause the base station to:

determine at least one of: a quality of a channel used by the user equipment, a priority of traffic to be transmitted by the user equipment, a quality of service (QOS) of traffic to be transmitted by the user equipment, or a combination thereof; and determine the frequency gap threshold based on the at least one of: the quality of the channel used by the user equipment, the priority of traffic to be transmitted by the user equipment, the quality of service (QOS) of traffic to be transmitted by the user equipment, or the combination thereof.

152. A base station, comprising:

means for specifying a frequency gap threshold for a user equipment to determine whether to use a first energy detection threshold for a first duplex mode of operation during a time slot designated for a second duplex mode of operation; and means for transmitting the frequency gap threshold to the user equipment.

153. A computer-readable medium including instructions stored therein, wherein the instructions are executable by a processor of a base station to:

specify a frequency gap threshold for a user equipment to determine whether to use a first energy detection threshold for a first duplex mode of operation during a time slot designated for a second duplex mode of operation; and transmit the frequency gap threshold to the user equipment.

154. A method for wireless communication at a user equipment, the method comprising:

determining a number of times the user equipment failed to gain access to a channel designated for a first duplex mode of operation using a first energy detection threshold for the first duplex mode of operation;

determining that the number of times is equal to or greater than a count threshold;

detecting an energy level;

determining that the energy level is less than a second energy detection threshold for a second duplex mode of operation after determining that the number of times is equal to or greater than the count threshold; and transmitting data after determining that the energy level is less than the second energy detection threshold.

155. The method of clause 154, wherein:

the first duplex mode of operation is a full-duplex mode of operation; and the second duplex mode of operation is a half-duplex mode of operation.

156. The method of clause 155, wherein:

the first energy detection threshold is a first listen-before-talk (LBT) threshold for the full-duplex mode of operation; and the second energy detection threshold is a second LBT threshold for the half-duplex mode of operation.

157. The method of any one of clauses 154 to 156, further comprising:

receiving an indication of the count threshold from a base station.

158. The method of any one of clauses 154 to 156, wherein the count threshold is specified by a communication standard.

159. The method of any one of clauses 154 to 158, wherein the second energy detection threshold is greater than the first energy detection threshold.

160. The method of any one of clauses 154 to 159, wherein:

the first duplex mode of operation is a full-duplex mode of operation; and the first energy detection threshold is one of a plurality of energy detection thresholds defined for the full-duplex mode of operation.

161. The method of clause 160, wherein different energy detection thresholds of the plurality of energy detection thresholds are designated for different frequency domain allocations.

162. A user equipment, comprising:

a transceiver;

a memory; and a processor communicatively coupled to the transceiver and the memory, wherein the processor and the memory are configured to cause the user equipment to:

determine a number of times the user equipment failed to gain access to a channel designated for a first duplex mode of operation using a first energy detection threshold for the first duplex mode of operation;

determine that the number of times is equal to or greater than a count threshold;

detect an energy level;

determine that the energy level is less than a second energy detection threshold for a second duplex mode of operation after determining that the number of times is equal to or greater than the count threshold; and transmit data after determining that the energy level is less than the second energy detection threshold.

163. The user equipment of clause 162, wherein:

the first duplex mode of operation is a full-duplex mode of operation; and the second duplex mode of operation is a half-duplex mode of operation.

164. The user equipment of clause 163, wherein:

the first energy detection threshold is a first listen-before-talk (LBT) threshold for the full-duplex mode of operation; and the second energy detection threshold is a second LBT threshold for the half-duplex mode of operation.

165. The user equipment of any one of clauses 162 to 164, wherein the processor and the memory are configured to cause the user equipment to:

receive an indication of the count threshold from a base station.

166. The user equipment of any one of clauses 162 to 164, wherein the count threshold is specified by a communication standard.

167. The user equipment of any one of clauses 162 to 166, wherein the second energy detection threshold is greater than the first energy detection threshold.

168. The user equipment of any one of clauses 162 to 167, wherein:

the first duplex mode of operation is a full-duplex mode of operation; and the first energy detection threshold is one of a plurality of energy detection thresholds defined for the full-duplex mode of operation.

169. The user equipment of clause 168, wherein different energy detection thresholds of the plurality of energy detection thresholds are designated for different frequency domain allocations.

170. A user equipment, comprising:

means for determining a number of times the user equipment failed to gain access to a channel during a time slot designated for a first duplex mode of operation using a first energy detection threshold for the first duplex mode of operation;

means for determining that the number of times is equal to or greater than a count threshold;

means for detecting an energy level;

means for determining that the energy level is less than a second energy detection threshold for a second duplex mode of operation after determining that the number of times is equal to or greater than the count threshold; and means for transmitting data after determining that the energy level is less than the second energy detection threshold.

171. A computer-readable medium including instructions stored therein, wherein the instructions are executable by a processor of a user equipment to:

determine a number of times the user equipment failed to gain access to a channel during a time slot designated for a first duplex mode of operation using a first energy detection threshold for the first duplex mode of operation;

determine that the number of times is equal to or greater than a count threshold;

detect an energy level;

determine that the energy level is less than a second energy detection threshold for a second duplex mode of operation after determining that the number of times is equal to or greater than the count threshold; and transmit data after determining that the energy level is less than the second energy detection threshold.

172. A method for wireless communication at a base station, the method comprising:

specifying a count threshold for a user equipment to determine whether to use an energy detection threshold for a first duplex mode of operation during a time slot designated for a second duplex mode of operation; and transmitting the count threshold to the user equipment.

173. The method of clause 172, wherein:

the first duplex mode of operation is a half-duplex mode of operation; and the second duplex mode of operation is a full-duplex mode of operation.

174. The method of clause 173, wherein:

the energy detection threshold is a first listen-before-talk (LBT) threshold for the half-duplex mode of operation.

175. The method of any one of clauses 172 to 174, wherein the specifying the count threshold comprises:

determining at least one of: a quality of a channel used by the user equipment, a priority of traffic to be transmitted by the user equipment, a quality of service (QOS) of traffic to be transmitted by the user equipment, or a combination thereof; and determining the count threshold based on the at least one of: the quality of the channel used by the user equipment, the priority of traffic to be transmitted by the user equipment, the quality of service (QOS) of traffic to be transmitted by the user equipment, or the combination thereof.

176. The method of any one of clauses 172 to 174, wherein the specifying the count threshold comprises:

receiving a message indicating at least one capability of the user equipment; and determining the count threshold based on the at least one capability of the user equipment.

177. A base station, comprising:

a transceiver;

a memory; and a processor communicatively coupled to the transceiver and the memory, wherein the processor and the memory are configured to cause the base station to:

specify a count threshold for a user equipment to determine whether to use an energy detection threshold for a first duplex mode of operation during a time slot designated for a second duplex mode of operation; and transmit the count threshold via the transceiver to the user equipment.

178. The base station of clause 177, wherein:

the first duplex mode of operation is a half-duplex mode of operation; and the second duplex mode of operation is a full-duplex mode of operation.

179. The base station of clause 178, wherein:

the energy detection threshold is a first listen-before-talk (LBT) threshold for the half-duplex mode of operation.

180. The base station of any one of clauses 177 to 179, wherein the processor and the memory are configured to cause the base station to:

determine at least one of: a quality of a channel used by the user equipment, a priority of traffic to be transmitted by the user equipment, a quality of service (QOS) of traffic to be transmitted by the user equipment, or a combination thereof; and determine the count threshold based on the at least one of: the quality of the channel used by the user equipment, the priority of traffic to be transmitted by the user equipment, the quality of service (QOS) of traffic to be transmitted by the user equipment, or the combination thereof.

181. The base station of any one of clauses 177 to 179, wherein the processor and the memory are configured to cause the base station to:

receive a message indicating at least one capability of the user equipment; and determine the count threshold based on the at least one capability of the user equipment.

182. A base station, comprising:

means for specifying a count threshold for a user equipment to determine whether to use an energy detection threshold for a first duplex mode of operation during a time slot designated for a second duplex mode of operation; and means for transmitting the count threshold to the user equipment.

183. A computer-readable medium including instructions stored therein, wherein the instructions are executable by a processor of a base station to:

specify a count threshold for a user equipment to determine whether to use an energy detection threshold for a first duplex mode of operation during a time slot designated for a second duplex mode of operation; and transmit the count threshold to the user equipment.

184. A method for wireless communication at a user equipment, the method comprising:

identifying at least one resource block set that is not available for a transmission by the user equipment during a time slot designated for a first duplex mode of operation, wherein the at least one resource block set is between a first resource block set allocated for an uplink transmission by the user equipment during the time slot and a second resource block allocated for a downlink reception by the user equipment during the time slot;

detecting an energy level;

determining that the energy level is less than a first energy detection threshold for a second duplex mode of operation after identifying the at least one resource block set; and transmitting data after determining that the energy level is less than the first energy detection threshold.

185. The method of clause 184, wherein:

the first duplex mode of operation is a full-duplex mode of operation; and the second duplex mode of operation is a half-duplex mode of operation.

186. The method of clause 185, wherein:

the first energy detection threshold is a first listen-before-talk (LBT) threshold for the half-duplex mode of operation.

187. The method of any one of clauses 184 to 186, wherein the identifying the at least one resource block set comprises receiving an indication from a base station that the at least one resource block set is not available for the transmission by the user equipment during the time slot.

188. The method of any one of clauses 184 to 187, wherein the first energy detection threshold is different from a second energy detection threshold for the first duplex mode of operation.

189. The method of clause 188, wherein:

the first duplex mode of operation is a full-duplex mode of operation; and the second energy detection threshold is one of a plurality of energy detection thresholds defined for the full-duplex mode of operation.

190. The method of clause 189, wherein different energy detection thresholds of the plurality of energy detection thresholds are designated for different frequency domain allocations.

191. A method for wireless communication at a user equipment, the method comprising:

determining a number of resource blocks that are not available for a transmission by the user equipment during a time slot designated for a first duplex mode of operation, wherein the resource blocks are between a first resource block set allocated for an uplink transmission by the user equipment during the time slot and a second resource block allocated for a downlink reception by the user equipment during the time slot;

determining the number of resource blocks is greater than a threshold quantity;

detecting an energy level;

determining that the energy level is less than an energy detection threshold for a second duplex mode of operation after determining the number of resource blocks is greater than the threshold quantity; and transmitting data after determining that the energy level is less than the energy detection threshold.

192. The method of clause 191, further comprising:

receiving an indication of the threshold quantity from a base station.

193. The method of clause 191, wherein the threshold quantity is specified by a communication standard.

194. A user equipment, comprising:

a transceiver;

a memory; and a processor communicatively coupled to the transceiver and the memory, wherein the processor and the memory are configured to cause the user equipment to:

identify at least one resource block set that is not available for a transmission by the user equipment during a time slot designated for a first duplex mode of operation, wherein the at least one resource block set is between a first resource block set allocated for an uplink transmission by the user equipment during the time slot and a second resource block set allocated for a downlink reception by the user equipment during the time slot;

detect an energy level;

determine that the energy level is less than a first energy detection threshold for a second duplex mode of operation after identifying the at least one resource block set; and transmit data after determining that the energy level is less than the first energy detection threshold.

195. The user equipment of clause 194, wherein:

the first duplex mode of operation is a full-duplex mode of operation; and the second duplex mode of operation is a half-duplex mode of operation.

196. The user equipment of clause 195, wherein:

the first energy detection threshold is a first listen-before-talk (LBT) threshold for the half-duplex mode of operation.

197. The user equipment of any one of clauses 194 to 196, wherein the processor and the memory are configured to cause the user equipment to:

receive an indication from a base station that the at least one resource block set is not available for the transmission by the user equipment during the time slot; and identify the at least one resource block set that is not available for the transmission by the user equipment during the time slot based on the received indication.

198. The user equipment of any one of clauses 194 to 197, wherein the first energy detection threshold is different from a second energy detection threshold for the first duplex mode of operation.

199. The user equipment of clause 198, wherein:

the second energy detection threshold is one of a plurality of energy detection thresholds defined for the full-duplex mode of operation.

200. The user equipment of clause 199, wherein different energy detection thresholds of the plurality of energy detection thresholds are designated for different frequency domain allocations.

201. A user equipment, comprising:

a transceiver;

a memory; and a processor communicatively coupled to the transceiver and the memory, wherein the processor and the memory are configured to cause the user equipment to:

determine a number of resource blocks that are not available for a transmission by the user equipment during a time slot designated for a first duplex mode of operation, wherein the resource blocks are between a first resource block set allocated for an uplink transmission by the user equipment during the time slot and a second resource block allocated for a downlink reception by the user equipment during the time slot;

determine the number of resource blocks is greater than a threshold quantity;

detect an energy level;

determine that the energy level is less than a first energy detection threshold for a second duplex mode of operation after determining the number of resource blocks is greater than the threshold quantity; and transmit data after determining that the energy level is less than the first energy detection threshold.

202. A user equipment, comprising:

means for identifying at least one resource block set that is not available for a transmission by the user equipment during a time slot designated for a first duplex mode of operation, wherein the at least one resource block set is between a first resource block set allocated for an uplink transmission by the user equipment during the time slot and a second resource block set allocated for a downlink reception by the user equipment during the time slot;

means for detecting an energy level;

means for determining that the energy level is less than an energy detection threshold for a second duplex mode of operation after identifying the at least one resource block set; and means for transmitting data after determining that the energy level is less than the energy detection threshold.

203. A computer-readable medium including instructions stored therein, wherein the instructions are executable by a processor of a user equipment to:

identify at least one resource block set that is not available for a transmission by the user equipment during a time slot designated for a first duplex mode of operation, wherein the at least one resource block set is between a first resource block set allocated for an uplink transmission by the user equipment during the time slot and a second resource block set allocated for a downlink reception by the user equipment during the time slot;

detect an energy level;

determine that the energy level is less than an energy detection threshold for a second duplex mode of operation after identifying the at least one resource block set; and transmit data after determining that the energy level is less than the energy detection threshold.

204. A method for wireless communication at a base station, the method comprising:

specifying a resource block count threshold for a user equipment to determine whether to use an energy detection threshold for a first duplex mode of operation during a time slot designated for a second duplex mode of operation; and transmitting the resource block count threshold to the user equipment.

205. The method of clause 204, wherein:

the first duplex mode of operation is a half-duplex mode of operation; and the second duplex mode of operation is a full-duplex mode of operation.

206. The method of clause 205, wherein:

the energy detection threshold is a first listen-before-talk (LBT) threshold for the half-duplex mode of operation.

207. The method of any one of clauses 204 to 206, wherein the specifying the resource block count threshold comprises:

determining at least one of: a quality of a channel used by the user equipment, a priority of traffic to be transmitted by the user equipment, a quality of service (QOS) of traffic to be transmitted by the user equipment, or a combination thereof; and determining the resource block count threshold based on the at least one of: the quality of the channel used by the user equipment, the priority of traffic to be transmitted by the user equipment, the quality of service (QOS) of traffic to be transmitted by the user equipment, or the combination thereof.

208. The method of any one of clauses 204 to 206, wherein the specifying the resource block count threshold comprises:

receiving a message indicating at least one capability of the user equipment; and determining the resource block count threshold based on the at least one capability of the user equipment.

209. The method of clause 208, wherein the at least one capability of the user equipment comprises at least one of: an interference cancellation capability of the user equipment, a transmit power capability of the user equipment, a selectivity of a receiver of the user equipment, or a combination thereof.

210. A base station, comprising:

a transceiver;

a memory; and a processor communicatively coupled to the transceiver and the memory, wherein the processor and the memory are configured to cause the base station to:

specify a resource block count threshold for a user equipment to determine whether to use an energy detection threshold for a first duplex mode of operation during a time slot designated for a second duplex mode of operation; and transmit the resource block count threshold via the transceiver to the user equipment.

211. The base station of clause 210, wherein:

the first duplex mode of operation is a half-duplex mode of operation; and the second duplex mode of operation is a full-duplex mode of operation.

212. The base station of clause 211, wherein:

the detection threshold is a first listen-before-talk (LBT) threshold for the half-duplex mode of operation.

213. The base station of any one of clauses 210 to 212, wherein the processor and the memory are configured to cause the base station to:

determine at least one of: a quality of a channel used by the user equipment, a priority of traffic to be transmitted by the user equipment, a quality of service (QOS) of traffic to be transmitted by the user equipment, or a combination thereof; and determine the resource block count threshold based on the at least one of: the quality of the channel used by the user equipment, the priority of traffic to be transmitted by the user equipment, the quality of service (QOS) of traffic to be transmitted by the user equipment, or the combination thereof.

214. The base station of any one of clauses 210 to 212, wherein the processor and the memory are configured to cause the base station to:

receive a message indicating at least one capability of the user equipment; and determine the resource block count threshold based on the at least one capability of the user equipment.

215. The base station of clause 214, wherein the at least one capability of the user equipment comprises at least one of: an interference cancellation capability of the user equipment, a transmit power capability of the user equipment, a selectivity of a receiver of the user equipment, or a combination thereof.

216. A base station, comprising:

means for specifying a resource block count threshold for a user equipment to determine whether to use an energy detection threshold for a first duplex mode of operation during a time slot designated for a second duplex mode of operation; and means for transmitting the resource block count threshold to the user equipment.

217. A computer-readable medium including instructions stored therein, wherein the instructions are executable by a processor of a base station to:

specify a resource block count threshold for a user equipment to determine whether to use an energy detection threshold for a first duplex mode of operation during a time slot designated for a second duplex mode of operation; and transmit the resource block count threshold to the user equipment.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-27 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1-27 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment, the method comprising:

receiving slot format information associated with a slot including an indication of whether the slot is a full-duplex slot or a half-duplex slot;

selecting one of a duplex-specific first energy detection threshold associated with a half-duplex mode and a duplex-specific second energy detection threshold associated with a full-duplex mode based on the slot format information;

performing a listen-before-talk (LBT) procedure comprising detecting a received energy level at the user equipment; and transmitting data from the user equipment in response to the received energy level being less than the selected one of the duplex-specific first energy detection threshold and the duplex-specific second energy detection threshold.

2. The method of claim 1, wherein the duplex-specific first energy detection threshold is greater than the duplex-specific second energy detection threshold.

3. The method of claim 1, wherein the selecting one of the duplex-specific first energy detection threshold and the duplex-specific second energy detection threshold further comprises:

selecting the duplex-specific first energy detection threshold in response to a frequency gap between an uplink bandwidth allocation of the slot and a downlink bandwidth allocation of the slot being greater than a frequency gap threshold, or selecting the duplex-specific second energy detection threshold in response to the frequency gap being less than the frequency gap threshold.

4. The method of claim 1, wherein the selecting one of the duplex-specific first energy detection threshold and the duplex-specific second energy detection threshold further comprises;

selecting the duplex-specific first energy detection threshold in response to a number of times the user equipment failed to gain access to a channel using the duplex-specific second energy detection threshold being equal to or greater than a count threshold, or selecting the duplex-specific second energy detection threshold in response to the number of times the user equipment failed to gain access to the channel using the duplex-specific second energy detection threshold being less than the count threshold.

5. The method of claim 1, wherein the selecting one of the duplex-specific first energy detection threshold and the duplex-specific second energy detection threshold further comprises:

identifying at least one resource block set that is not available for a transmission by the user equipment during a time slot, wherein the at least one resource block set is between a first resource block set allocated for an uplink transmission by the user equipment during the time slot and a second resource block set allocated for a downlink reception by the user equipment during the time slot; and selecting the duplex-specific first energy detection threshold in response to identifying the at least one resource block set.

6. The method of claim 1, wherein:

detecting the received energy level comprises detecting the received energy level during a time slot; and transmitting the data comprises transmitting the data during the time slot.

7. The method of claim 1, further comprising transmitting the data within 25 microseconds or less from a time that the received energy level is detected.

8. A user equipment, comprising:

one or more memories; and one or more processors coupled to the one or more memories, wherein the one or more processors and the one or more memories are configured to cause the user equipment to:

receive slot format information associated with a slot including an indication of whether the slot is a full-duplex slot or a half-duplex slot;

select one of a duplex-specific first energy detection threshold associated with a half-duplex mode and a duplex-specific second energy detection threshold associated with a full-duplex mode based on the slot format information;

perform a listen-before-talk (LBT) procedure comprising configuring the one or more processors and the one or more memories to cause the user equipment to detect a received energy level at the user equipment; and transmit data from the user equipment in response to the received energy level being less than the selected one of the duplex-specific first energy detection threshold and the duplex-specific second energy detection threshold.

9. The user equipment of claim 8, wherein select one of the duplex-specific first energy detection threshold and the duplex-specific second energy detection threshold causes the one or more processors and the one or more memories to be configured to cause the user equipment to:

select the duplex-specific first energy detection threshold in response to a frequency gap between an uplink bandwidth allocation of the slot and a downlink bandwidth allocation of the slot being greater than a frequency gap threshold, or select the duplex-specific second energy detection threshold in response to the frequency gap being less than the frequency gap threshold.

10. The user equipment of claim 8, wherein the select one of the duplex-specific first energy detection threshold and the duplex-specific second energy detection threshold causes the one or more processors and the one or more memories to be configured to cause the user equipment to:

select the duplex-specific first energy detection threshold in response to a number of times the user equipment failed to gain access to a channel using the duplex-specific second energy detection threshold being equal to or greater than a count threshold, or select the duplex-specific second energy detection threshold in response to the number of times the user equipment failed to gain access to the channel using the duplex-specific second energy detection threshold being less than the count threshold.

11. The user equipment of claim 8, wherein the select one of the duplex-specific first energy detection threshold and the duplex-specific second energy detection threshold causes the one or more processors and the one or more memories to be further configured to cause the user equipment to:

identify at least one resource block set that is not available for a transmission by the user equipment during a time slot, wherein the at least one resource block set is between a first resource block set allocated for an uplink transmission by the user equipment during the time slot and a second resource block set allocated for a downlink reception by the user equipment during the time slot; and select the duplex-specific first energy detection threshold in response to identifying the at least one resource block set.

12. A method for wireless communication at a user equipment, the method comprising:

receiving slot format information associated with a slot including an indication of whether the slot is a full-duplex slot or a half-duplex slot;

selecting one of a duplex-specific first energy detection threshold associated with a half-duplex mode and a duplex-specific second energy detection threshold associated with a full-duplex mode based on the slot format information;

performing a listen-before-talk (LBT) procedure comprising:

detecting a received energy level at the user equipment, and comparing the received energy level to the selected one of the duplex-specific first energy detection threshold and the duplex-specific second energy detection threshold; and transmitting data from the user equipment in response to the comparing indicating that the received energy level is less than the selected one of the duplex-specific first energy detection threshold and the duplex-specific second energy detection threshold.

13. The method of claim 12, wherein the duplex-specific first energy detection threshold is greater than the duplex-specific second energy detection threshold.

14. The method of claim 12, further comprising backing off, for a back-off time period, the transmitting the data in response to the received energy level being above the selected one of the duplex-specific first energy detection threshold and the duplex-specific second energy detection threshold.

15. The method of claim 12, wherein the selecting one of the duplex-specific first energy detection threshold and the duplex-specific second energy detection threshold further comprises:

selecting the duplex-specific first energy detection threshold in response to a frequency gap between an uplink bandwidth allocation of the slot and a downlink bandwidth allocation of the slot being greater than a frequency gap threshold, or selecting the duplex-specific second energy detection threshold in response to the frequency gap being less than the frequency gap threshold.

16. The method of claim 12, wherein the selecting one of the duplex-specific first energy detection threshold and the duplex-specific second energy detection threshold further comprises:

selecting the duplex-specific first energy detection threshold in response to a number of times the user equipment failed to gain access to a channel using the duplex-specific second energy detection threshold being equal to or greater than a count threshold, or selecting the duplex-specific second energy detection threshold in response to the number of times the user equipment failed to gain access to the channel using the duplex-specific second energy detection threshold being less than the count threshold.

17. The method of claim 12, wherein the selecting one of the duplex-specific first energy detection threshold and the duplex-specific second energy detection threshold further comprises:

identifying at least one resource block set that is not available for a transmission by the user equipment during a time slot, wherein the at least one resource block set is between a first resource block set allocated for an uplink transmission by the user equipment during the time slot and a second resource block set allocated for a downlink reception by the user equipment during the time slot; and selecting the duplex-specific first energy detection threshold in response to identifying the at least one resource block set.

18. The method of claim 12, wherein:

detecting the received energy level comprises detecting the received energy level during a time slot; and transmitting the data comprises transmitting the data during the time slot.

19. The method of claim 12, further comprising transmitting the data within 25 microseconds or less from a time that the received energy level is detected.

20. A user equipment, comprising:

one or more memories; and one or more processors coupled to the one or more memories, wherein the one or more processors and the one or more memories are configured to cause the user equipment to:

receive slot format information associated with a slot including an indication of whether the slot is a full-duplex slot or a half-duplex slot;

select one of a duplex-specific first energy detection threshold associated with a half-duplex mode and a duplex-specific second energy detection threshold associated with a full-duplex mode based on the slot format information;

perform a listen-before-talk (LBT) procedure comprising configuring the one or more processors and the one or more memories to cause the user equipment to:

detect a received energy level at the user equipment, and compare the received energy level to the selected one of the duplex-specific first energy detection threshold and the duplex-specific second energy detection threshold; and transmit data from the user equipment in response to the comparing indicating that the received energy level is less than the selected one of the duplex-specific first energy detection threshold and the duplex-specific second energy detection threshold.

* * * * *